United States Patent
Hu et al.

(10) Patent No.: US 10,188,247 B2
(45) Date of Patent: Jan. 29, 2019

(54) UPRIGHT VACUUM CLEANER

(71) Applicant: JIANGSU MIDEA CLEANING APPLIANCES CO., LTD., Suzhou (CN)

(72) Inventors: Wei Hu, Suzhou (CN); Hui Zou, Suzhou (CN); Xiahu Xiao, Suzhou (CN)

(73) Assignee: JIANGSU MIDEA CLEANING APPLIANCES CO., LTD., Suzhou (CN)

( * ) Notice: Subject to any disclaimer, the term of this patent is extended or adjusted under 35 U.S.C. 154(b) by 0 days.

(21) Appl. No.: 15/539,154

(22) PCT Filed: Mar. 4, 2016

(86) PCT No.: PCT/CN2016/075604
§ 371 (c)(1),
(2) Date: Jun. 23, 2017

(87) PCT Pub. No.: WO2017/096717
PCT Pub. Date: Jun. 15, 2017

(65) Prior Publication Data
US 2018/0263448 A1  Sep. 20, 2018

(30) Foreign Application Priority Data

Dec. 10, 2015  (CN) .......................... 2015 1 0917466
Dec. 10, 2015  (CN) .......................... 2015 1 0917497
(Continued)

(51) Int. Cl.
*A47L 9/28*  (2006.01)
*A47L 5/30*  (2006.01)
(Continued)

(52) U.S. Cl.
CPC .............. *A47L 9/0411* (2013.01); *A47L 5/22* (2013.01); *A47L 5/28* (2013.01); *A47L 5/30* (2013.01);
(Continued)

(58) Field of Classification Search
CPC ..... A47L 5/22; A47L 5/28; A47L 5/30; A47L 9/00; A47L 9/04; A47L 9/0411;
(Continued)

(56) References Cited

U.S. PATENT DOCUMENTS 2,037,648 A * 4/1936 Bergstrom ............ A47L 9/0411
15/179
2,221,745 A * 11/1940 Kirby ........................ A47L 5/10
15/324
(Continued)

FOREIGN PATENT DOCUMENTS

CN  1163740 A  11/1997
CN  1368030 A   9/2002
(Continued)

*Primary Examiner* — Marc Carlson
(74) *Attorney, Agent, or Firm* — Kilpatrick Townsend & Stockton LLP

(57) ABSTRACT

An upright vacuum cleaner (1) includes a brushroll (11); a motor assembly (200) including a motor housing (21) and a motor (22), in which a rotating axis of the motor (22) and a rotating axis of the brushroll (11) are disposed in a non-parallel manner, and the motor (22) drives the brushroll (11) rolling by a drive belt (13) and is rotatable between a first upright position of tensioning the drive belt (13) and a first oblique position of loosening the drive belt (13); a body assembly (300) including a body (31), a bridging member (32) and a dirt cup (37) mounted on the body (31), in which the bridging member (32) is rotatably connected with the motor housing (21) to make the body (31) rotatable between a second upright position and a second oblique position, and the motor (22) is moved by the bridging member (32) from
(Continued)

the first oblique position to the first upright position when the body (31) moves from the second upright position to the second oblique position.

20 Claims, 13 Drawing Sheets

(30) Foreign Application Priority Data

| Dec. 10, 2015 | (CN) | ............................ 2015 1 0917498 |
|---|---|---|
| Dec. 10, 2015 | (CN) | ............................ 2015 1 0917499 |
| Dec. 10, 2015 | (CN) | ............................ 2015 1 0917528 |
| Dec. 10, 2015 | (CN) | ............................ 2015 1 0917653 |
| Dec. 10, 2015 | (CN) | ............................ 2015 1 0918541 |
| Dec. 10, 2015 | (CN) | ............................ 2015 1 0918544 |
| Dec. 10, 2015 | (CN) | ............................ 2015 1 0918580 |
| Dec. 10, 2015 | (CN) | ............................ 2015 1 0918662 |
| Dec. 10, 2015 | (CN) | ........................ 2015 2 1027156 U |
| Dec. 10, 2015 | (CN) | ........................ 2015 2 1027158 U |
| Dec. 10, 2015 | (CN) | ........................ 2015 2 1027550 U |
| Dec. 10, 2015 | (CN) | ........................ 2015 2 1028726 U |
| Dec. 10, 2015 | (CN) | ........................ 2015 2 1028730 U |
| Dec. 10, 2015 | (CN) | ........................ 2015 2 1028739 U |
| Dec. 10, 2015 | (CN) | ........................ 2015 2 1028779 U |
| Dec. 10, 2015 | (CN) | ........................ 2015 2 1028784 U |
| Dec. 10, 2015 | (CN) | ........................ 2015 2 1028812 U |
| Dec. 10, 2015 | (CN) | ........................ 2015 2 1028814 U |
| Dec. 10, 2015 | (CN) | ........................ 2015 2 1028913 U |
| Dec. 10, 2015 | (CN) | ........................ 2015 2 1029002 U |
| Dec. 10, 2015 | (CN) | ........................ 2015 2 1029087 U |
| Dec. 10, 2015 | (CN) | ........................ 2015 2 1029798 U |
| Dec. 10, 2015 | (CN) | ........................ 2015 2 1030034 U |
| Mar. 1, 2016 | (CN) | ............................ 2016 1 0114861 |
| Mar. 1, 2016 | (CN) | ........................ 2016 2 0155481 U |

(51) Int. Cl.
| *A47L 9/04* | (2006.01) |
|---|---|
| *A47L 9/10* | (2006.01) |
| *A47L 9/14* | (2006.01) |
| *A47L 9/16* | (2006.01) |
| *F16H 7/08* | (2006.01) |
| *A47L 5/22* | (2006.01) |
| *A47L 9/00* | (2006.01) |
| *A47L 5/28* | (2006.01) |
| *A47L 9/24* | (2006.01) |
| *F16D 23/12* | (2006.01) |

(52) U.S. Cl.
CPC .................. *A47L 9/00* (2013.01); *A47L 9/04* (2013.01); *A47L 9/0444* (2013.01); *A47L 9/0477* (2013.01); *A47L 9/102* (2013.01); *A47L 9/1409* (2013.01); *A47L 9/16* (2013.01); *A47L 9/1683* (2013.01); *A47L 9/248* (2013.01); *A47L 9/28* (2013.01); *A47L 9/2852* (2013.01); *A47L 9/2857* (2013.01); *F16H 7/0827* (2013.01); *F16D 2023/126* (2013.01)

(58) Field of Classification Search
CPC ...... A47L 9/0444; A47L 9/0477; A47L 9/102; A47L 9/1409; A47L 9/16; A47L 9/1683; A47L 9/248; A47L 9/28; A47L 9/2852; A47L 9/2857; F16D 2023/126; F16H 7/0827

See application file for complete search history.

(56) References Cited

U.S. PATENT DOCUMENTS

| 2,343,732 | A | * | 3/1944 | Baird | ........................ A47L 5/30 |
|---|---|---|---|---|---|
| | | | | | 15/319 |
| 2,627,623 | A | * | 2/1953 | Humphrey | ................ A47L 5/32 |
| | | | | | 15/372 |
| 2,637,874 | A | * | 5/1953 | White | ........................ A47L 5/32 |
| | | | | | 15/332 |
| 4,249,281 | A | * | 2/1981 | Meyer | ........................ A47L 5/30 |
| | | | | | 15/340.2 |
| 4,419,784 | A | * | 12/1983 | Lex | ........................... A47L 5/26 |
| | | | | | 15/344 |
| 5,537,712 | A | * | 7/1996 | Weber | ........................ A47L 5/26 |
| | | | | | 15/332 |
| 5,901,411 | A | * | 5/1999 | Hato | ...................... A47L 9/0411 |
| | | | | | 15/377 |
| 6,067,689 | A | * | 5/2000 | Roney | ........................ A47L 5/30 |
| | | | | | 15/332 |
| 6,098,243 | A | * | 8/2000 | Kim | ........................... A47L 5/30 |
| | | | | | 15/332 |
| 2004/0074044 | A1 | * | 4/2004 | Diehl | ........................ A47L 5/22 |
| | | | | | 15/412 |
| 2006/0277713 | A1 | * | 12/2006 | Sandlin | ..................... A47L 9/04 |
| | | | | | 15/387 |
| 2006/0288521 | A1 | * | 12/2006 | Ogawa | ...................... A47L 5/30 |
| | | | | | 15/390 |
| 2008/0078041 | A1 | * | 4/2008 | Mitchel | ................. A47L 11/305 |
| | | | | | 15/50.3 |
| 2011/0179596 | A1 | * | 7/2011 | Krebs | ........................ A47L 5/30 |
| | | | | | 15/389 |
| 2012/0005857 | A1 | * | 1/2012 | Tran | ........................ A47L 9/045 |
| | | | | | 15/390 |

FOREIGN PATENT DOCUMENTS

| CN | 1398570 | A | 2/2003 |
|---|---|---|---|
| CN | 1494392 | A | 5/2004 |
| CN | 102217913 | A | 10/2011 |
| EP | 1736088 | A2 | 12/2006 |
| GB | 2426919 | A | 12/2006 |
| JP | S5248277 | A | 4/1977 |
| JP | 2005102892 | A | 4/2005 |

* cited by examiner

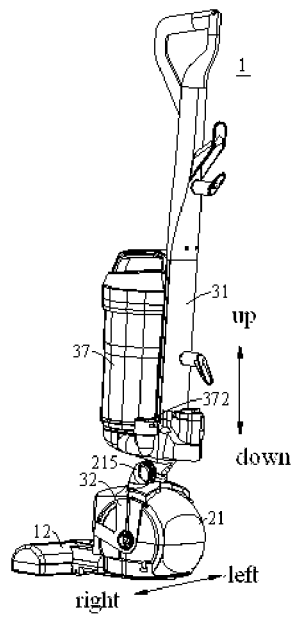
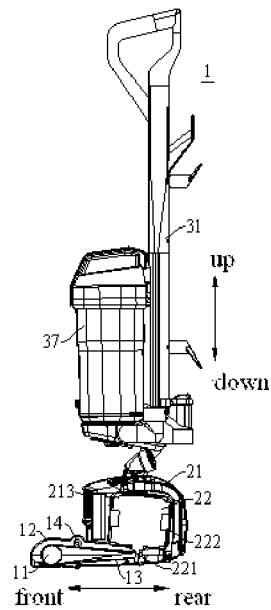
Fig. 1
Fig. 2
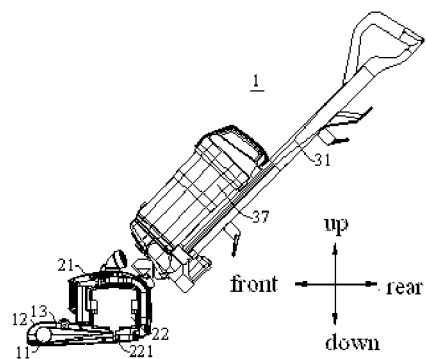
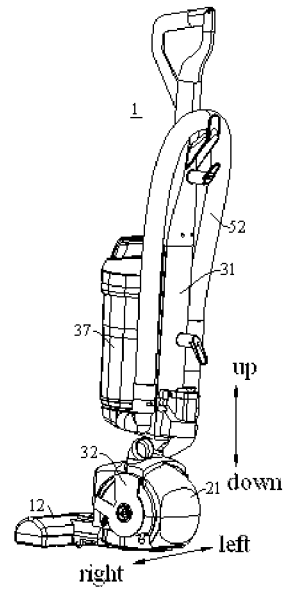
Fig. 3
Fig. 4

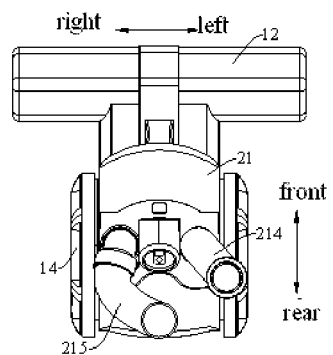
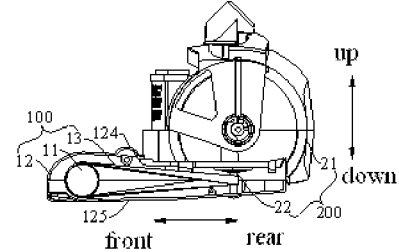
Fig. 9
Fig. 10
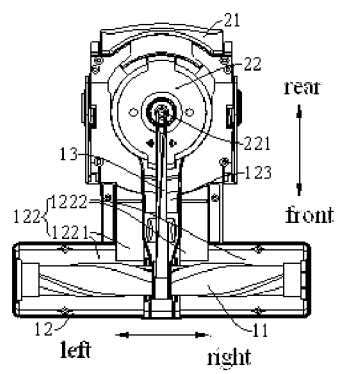
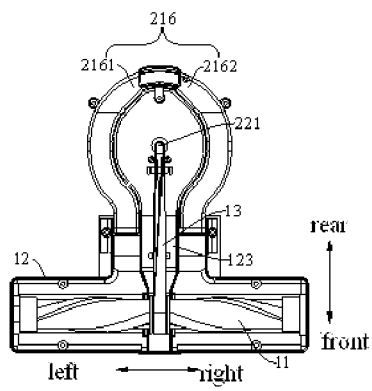
Fig. 11
Fig. 12
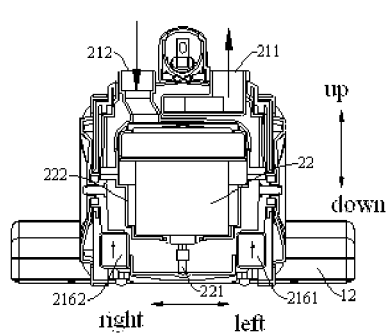
Fig. 13

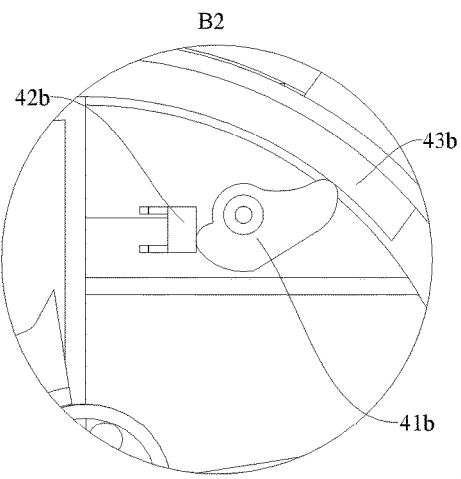
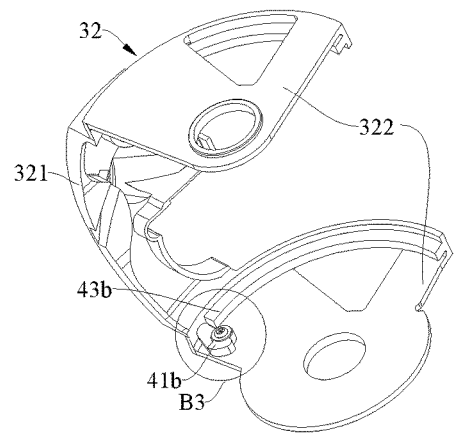
Fig. 24  Fig. 25
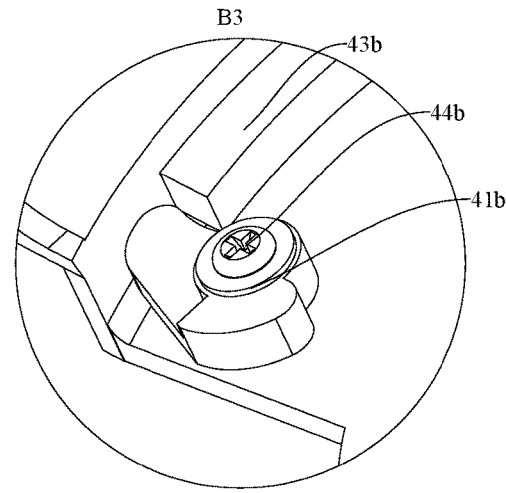
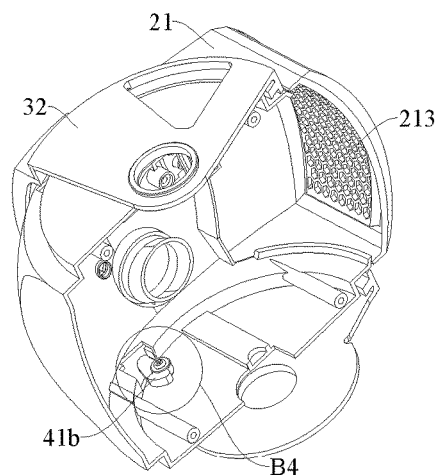
Fig. 26  Fig. 27
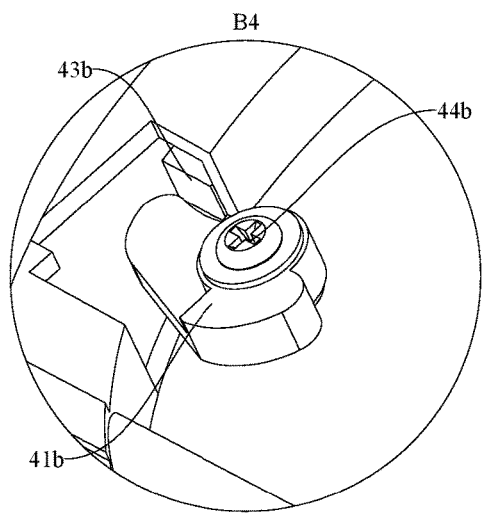
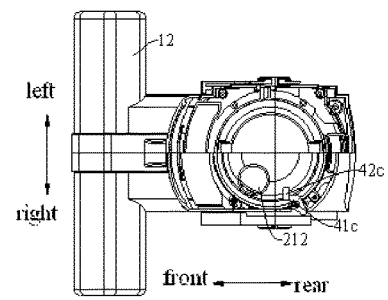
Fig. 28  Fig. 29

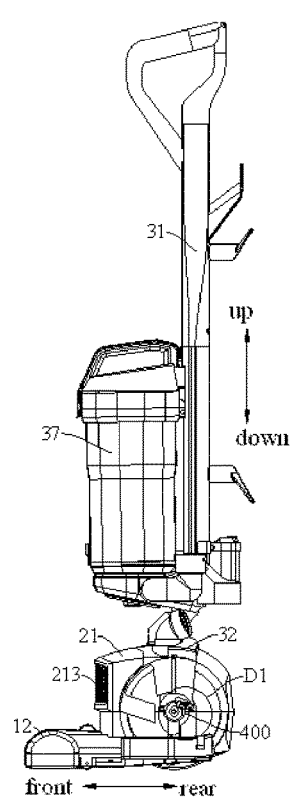
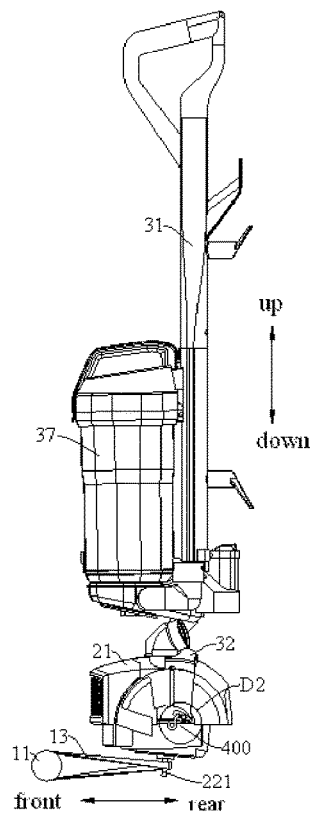
Fig. 36
Fig. 38
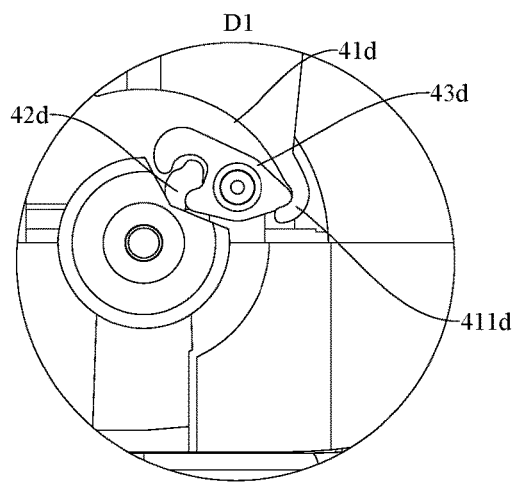
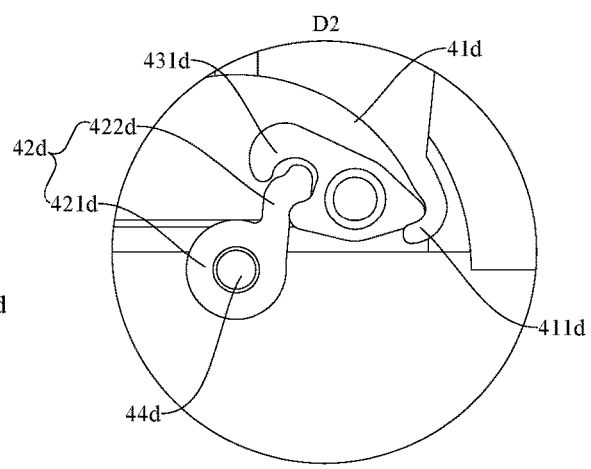
Fig. 37
Fig. 39

UPRIGHT VACUUM CLEANER

CROSS REFERENCE TO RELATED APPLICATION

The present application is a National Stage of International Application No. PCT/CN2016/075604, filed Mar. 4, 2016, which claims the priority and benefit of Chinese Patent Application No. 201510917499.7, 201521029002.X, 201510917466.2, 201521028726.2, 201510917497.8, 201521028730.9, 201521029087.1, 201510918662.1, 201521028812.3, 201510918544.0, 201521028739.X, 201510918580.7, 201521027156.5, 201510917498.2, 201521027158.4, 201521028814.2, 201521028779.4, 201521029798.9, 201510918541.7, 201521027550.9, 201510917653.0, 201521028784.5, 201510917528.X, 201521028913.0, and 201521030034.1, all filed on Dec. 10, 2015, and 201610114861.1 and 201620155481.8, both filed on Mar. 1, 2016, the contents of which are incorporated herein by reference in their entirety.

FIELD

The present disclosure relates to a field of cleaning machines, and more particularly to an upright vacuum cleaner.

BACKGROUND

A vacuum cleaner in the related art includes two motors to drive a brushroll and a fan respectively, and the motor for driving the fan is usually disposed horizontally. That is, a motor shaft of the motor is parallel to a mounting platform of the motor, such that a motor housing may have a huge volume and the motor may occupy a large area. Moreover, the motor disposed horizontally will limit the arrangement of other parts of the vacuum cleaner to a great extent.

SUMMARY

The present disclosure aims to solve at least one of the problems existing in the related art. Thus, embodiments of the present disclosure provide an upright vacuum cleaner with a simple and compact structure that occupies small space, convenient to operate and running in a stable and reliable manner.

According to the embodiments of the present disclosure, the upright vacuum cleaner includes: a brushroll; a motor assembly including a motor housing and a motor disposed within the motor housing, in which a rotating axis of the motor and a rotating axis of the brushroll are disposed in a non-parallel manner, and the motor drives the brushroll rolling by a drive belt and is rotatable between a first upright position of tensioning the drive belt and a first oblique position of loosening the drive belt; a body assembly including a body, a bridging member and a dirt cup mounted on the body, in which the bridging member is rotatably connected with the motor housing to make the body rotatable between a second upright position and a second oblique position. The motor is moved from the first oblique position to the first upright position by the bridging member when the body moves from the second upright position to the second oblique position.

In the upright vacuum cleaner according to the embodiments of the present disclosure, the rotating axis of the motor and the rotating axis of the brushroll are disposed in the non-parallel manner, so as to reduce the volume of the motor and hence the occupation space of the upright vacuum cleaner. Further, the upright vacuum cleaner controls the rotation of the brushroll and generation of a dust suction flow simultaneously by one motor, which occupies smaller space with fewer parts and realizes synchronous control over dust sweep and dust suction. Additionally, the motor of the upright vacuum cleaner is disposed vertically to reduce the occupation space of the upright vacuum cleaner and facilitate diverse arrangements of various parts of the upright vacuum cleaner.

According to an example of the present disclosure, the upright vacuum cleaner further includes a clutching device disposed between the bridging member and the motor, in which the motor is moved from the first oblique position to the first upright position by the bridging member via the clutching device, when the body moves from the second upright position to the second oblique position.

According to an example of the present disclosure, the clutching device includes: a first toggling block fixed on the motor; a second toggling block disposed on the bridging member; and a lever cam member rotatably disposed on the motor housing and defining two ends cooperating with the first toggling block and the second toggling block respectively.

According to an example of the present disclosure, the lever cam member includes: a rotary joint rotatably connected to the motor housing; a first toggling part and a second toggling part fixed on two sides of a same axial section of the rotary joint respectively and extending towards a first direction and a second direction away from each other, the first toggling part in cooperation with the first toggling block, and the second toggling part in cooperation with the second toggling block.

According to an example of the present disclosure, a maximum distance between the second toggling part and a center of the rotary joint is greater than a maximum distance between the first toggling part and the center of the rotary joint, and widths of the first toggling part and the second toggling part are both decreased gradually along a first direction and a second direction away from the rotary joint.

According to an example of the present disclosure, the lever cam member is provided with a retaining groove, and the first toggling block is fitted in the retaining groove when the motor moves to the first upright position.

According to an example of the present disclosure, the clutching device includes: a first sliding rail formed in the bridging member and defining a tail end having a first sliding rail tail groove formed by a recess in a surface of the tail end of the first sliding rail; and a lever rotating member rotatably disposed on the motor housing and defining two ends cooperating with the first sliding rail and the motor respectively, in which when the body moves from the second upright position to the second oblique position, a first end of the lever rotating member slides from the first sliding rail tail groove to the first sliding rail, and the motor is moved by a second end of the lever rotating member from the first oblique position to the first upright position.

According to an example of the present disclosure, the first sliding rail is configured as an arc first sliding rail with a rotating axis of the bridging member as a central axis.

According to an example of the present disclosure, the first sliding rail and the first sliding rail tail groove are connected smoothly via a guide surface.

According to an example of the present disclosure, the first sliding rail is formed in an inner top wall of the bridging member, and one lever rotating member is opposite to a top center of a side of the motor away from the brushroll.

According to an example of the present disclosure, the clutching device includes: a second sliding rail disposed on the bridging member; a toggling tongue fixed on the motor and rotatable relative to the motor housing; and a lever member defining a first end slidably cooperating with the second sliding rail and a second end cooperating with an end of the toggling tongue.

According to an example of the present disclosure, a stopping block is disposed at a lower end of the second sliding rail to prevent the first end of the lever member from slipping off from the lower end of the second sliding rail.

According to an example of the present disclosure, the second end of the lever member is configured as a hook, and the end of the toggling tongue is engaged in the hook.

According to an example of the present disclosure, the toggling tongue includes: a rotational part, in which one of the rotational part and the motor housing is provided with a rotational shaft, and the other thereof is provided with a rotational axle hole; and a tongue part defining a first end connected with the rotational part and a second end extending along a curve in a direction away from the rotational part, the second end of the tongue part cooperating with the second end of the lever member.

According to an example of the present disclosure, the sliding rail extends along an arc with the rotating axis of the bridging member as a central axis.

According to an example of the present disclosure, the clutching device includes: a slide chute formed on the bridging member; a triggering member rotatably supported on the motor housing and defining a first end with a sliding column slidably cooperating with the slide chute and a second end having a toggling rod adapted for stirring the movement of the motor. The sliding column slides along the slide chute to make the triggering member rotate when the bridging member drives the movement of the slide chute, and the toggling rod stirs the rotation of the motor relative to the motor housing when the triggering member rotates.

According to an example of the present disclosure, the triggering member includes: a first triggering part on which the sliding column is formed; a second triggering part on which the toggling rod is formed; and a pivot section connected between the first triggering part and the second triggering part and rotatably passing through the motor housing.

According to an example of the present disclosure, the pivot section is disposed vertically; the first triggering part is disposed in perpendicular to the pivot section; along a direction from a first end of the first triggering part adjacent to the sliding column to a second end of the first triggering part adjacent to the pivot section, a vertical height of the first triggering part is decreased gradually and an upper surface of the first triggering part is configured as an arc surface corresponding to a shape of the bridging member.

According to an example of the present disclosure, the motor housing is provided with an accommodating space for accommodating the first triggering part and for rotation of the first triggering part.

According to an example of the present disclosure, the pivot section is disposed vertically; the first triggering part and the toggling rod are disposed in perpendicular to the pivot section respectively; an angle between an extension direction of length of the toggling rod and an extension direction of length of the first triggering part ranges from 0° to 90°.

According to an example of the present disclosure, the toggling rod includes an oblique surface for pushing the motor housing at an end of the toggling rod.

According to an example of the present disclosure, the slide chute is linear and extends obliquely with respect to a front-and-rear direction.

According to an example of the present disclosure, an elastic member is disposed between the motor and the motor housing and is configured to push the motor moving from the first upright position to the first oblique position when the body moves from the second oblique position to the second upright position.

According to an example of the present disclosure, the motor includes a first column and the motor housing includes a second column; the elastic member is a spring and defines two ends fitted over the first column and the second column respectively to push the motor to the first oblique position.

According to an example of the present disclosure, the drive belt is winded upon a central part in a direction of the axis of the brushroll.

According to an example of the present disclosure, the upright vacuum cleaner further includes a brushroll casing disposed outside the brushroll and including a brushroll air-suction channel and a drive-belt mounting chamber for amounting the drive belt, in which the brushroll air-suction channel includes a first air-suction channel and a second air-suction channel located at both sides of the drive-belt mounting chamber.

According to an example of the present disclosure, the first air-suction channel and the second air-suction channel are disposed symmetrically with respect to the drive belt.

According to an example of the present disclosure, the motor housing includes an air exhaust hole, a dirty air outlet and a clean air inlet, and defines a motor air-suction channel and a motor air-exhaust channel therein, the motor air-suction channel communicated between the brushroll air-suction channel and the dirty air outlet, and the motor air-exhaust channel communicated between the clean air inlet and the air exhaust hole.

According to an example of the present disclosure, the motor air-suction channel includes a first branch channel communicated to the first air-suction channel and a second branch channel communicated to the second air-suction channel.

According to an example of the present disclosure, the first branch channel and the second branch channel are defined by a motor casing of the motor and the motor housing, and constitute a stereoscopic space with a substantially annular cross section.

According to an example of the present disclosure, the dirty air outlet is connected to an air inlet of the dirt cup via an air-inlet pipe assembly, in which the air-inlet pipe assembly includes: an air-inlet pipe disposed on the motor housing and defining a first end connected to the dirty air outlet, and a hose connected between a second end of the air-inlet pipe and the air inlet of the dirt cup.

According to an example of the present disclosure, the dirty air outlet is connected to the air inlet of the dirt cup via a directional control valve that includes a first air hole, a second air hole and a third air hole, in which the first air hole is connected to the brushroll air-suction channel, the second air hole to the air inlet of the dirt cup, the third air hole to the outside, and the directional control valve is configured to switch between a first state of communicating the first air hole and the second air hole and a second state of communicating the third air hole and the second air hole.

According to an example of the present disclosure, the directional control valve includes: a three-way pipe including a first pipe section, a second pipe section and a third pipe section communicated with each other, the first air hole defined by a free end of the first pipe section and the second air hole defined by a free end of the second pipe section; and a two-way pipe including a fourth pipe section and a fifth pipe section communicated with each other, the third air hole defined by a free end of the fourth pipe section and a fourth air hole defined by a free end of the fifth pipe section, in which at least a part of the fifth pipe section is inserted into the third pipe section and is movable between a first position where the first air hole is communicated with the second air hole and a second position where the fourth air hole is communicated with the second air hole.

According to an example of the present disclosure, the body defines a body air-exhaust channel therein, a first end of the body air-exhaust channel connected to an air outlet of the dirt cup and a second end thereof communicated with the clean air inlet.

According to an example of the present disclosure, the upright vacuum cleaner further includes two wheels disposed at two sides of the motor housing respectively and rotatably connected with the motor housing, in which the bridging member includes a top plate and two side plates connected at both sides of the top plate, the two side plates clamped between two side walls of the motor housing and the corresponding wheels respectively and rotatably connected with the motor housing.

According to an example of the present disclosure, the top plate of the bridging member is provided with a first connecting pipe that defines a positioning column therein; the body is provided with a second connecting pipe at a lower end; and a baffle is provided with a positioning cartridge that is fitted over the positioning column after the second connecting pipe is inserted into the first connecting pipe.

According to an example of the present disclosure, a rotating axis of the wheel is parallel to the rotating axis of the brushroll.

According to an example of the present disclosure, the upright vacuum cleaner further includes a tensioning wheel opposite to a part of the drive belt adjacent to the brushroll to tension the drive belt.

According to an example of the present disclosure, the motor rotates from the first oblique position to the first upright position at an angle of 0° to 10°.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

FIG. 1 is a schematic view of an upright vacuum cleaner according to an embodiment of the present disclosure;

FIG. 2 is a side view in which a motor of the upright vacuum cleaner of FIG. 1 at a first oblique position;

FIG. 3 is a side view in which the motor of the upright vacuum cleaner of FIG. 1 at a first upright position;

FIG. 4 is a schematic view of the upright vacuum cleaner of FIG. 1 in a direction;

FIG. 9 is a top view of a structure shown in FIG. 8;

FIG. 10 is a side view of a structure shown in FIG. 7;

FIG. 11 is a bottom view of the structure shown in FIG. 7;

FIG. 12 is a schematic view of an internal channel of the structure shown in FIG. 11;

FIG. 13 is a rear view of an internal channel of the structure shown in FIG. 8;

FIG. 24 is an enlarged view of part B2 of FIG. 23;

FIG. 25 is an assembly drawing of a bridging member and a lever cam member of the upright vacuum cleaner of FIG. 21;

FIG. 26 is an enlarged view of part B3 of FIG. 25;

FIG. 27 is an assembly drawing of a motor housing and a lever cam member of the upright vacuum cleaner of FIG. 21;

FIG. 28 is an enlarged view of part B4 of FIG. 27;

FIG. 29 is a partial assembly drawing of an upright vacuum cleaner according to another embodiment of the present disclosure;

FIG. 36 is a schematic view of an upright vacuum cleaner when a body is located at a second upright position according to an embodiment of the present disclosure;

FIG. 37 is an enlarged view of part D1 of FIG. 36;

FIG. 38 is a partial assembly drawing of the upright vacuum cleaner of FIG. 36;

FIG. 39 is an enlarged view of part D2 of FIG. 38;

REFERENCE NUMERALS

Figure 5:
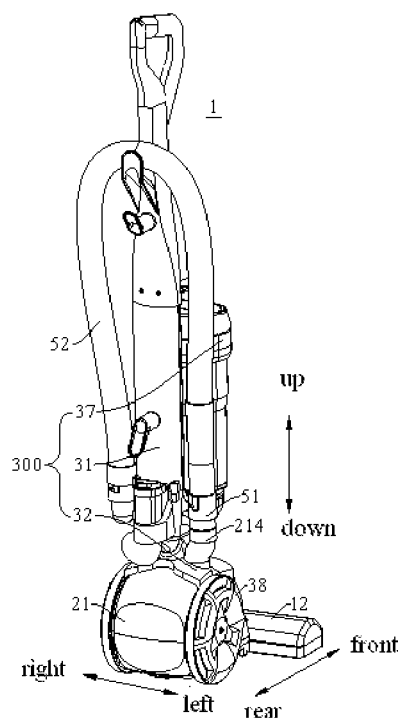
FIG. 5 is a schematic view of an upright vacuum cleaner according to another embodiment of the present disclosure.

1 upright vacuum cleaner
100 brushroll assembly
11 brushroll
111 first brushroll section
1111 first body
1112 first bristle
112 second brushroll section
1121 second body
1122 second bristle
113 connecting-shaft section
114 first baffle
115 second baffle
12 brushroll casing
122 brushroll air-suction channel
1221 first air-suction channel
1222 second air-suction channel
123 drive-belt mounting chamber
124 upper casing
125 lower casing
13 drive belt
14 tensioning wheel
200 motor assembly
21 motor housing
211 dirty air outlet
212 clean air inlet
213 air exhaust hole
214 dirty air output pipe
215 clean air input pipe
216 motor air-suction channel
2161 first branch channel
2162 second branch channel
217 second column
22 motor
221 motor shaft
222 motor casing
223 first column
224 spring
300 body assembly
31 body
311 body air-exhaust channel
32 bridging member
321 top plate
3211 first clearance groove
3212 second clearance groove
3213 first sliding rail
3214 first sliding rail tail groove
322 side plate
33 connecting pipe assembly
331 first connecting pipe
332 second connecting pipe
34 positioning assembly
341 first positioning piece
342 second positioning piece
35 limiting column
36 elastic member
37 dirt cup
371 separating chamber
372 air inlet
373 air outlet
38 wheel
39 air exhaust pipe
400 clutching device
41a slide chute
42a triggering member
421a first triggering part
4211a sliding column
422a second triggering part
4221a toggling rod
4222a oblique surface
423a pivot section
41b (41c) lever cam member
411b (411c) rotary joint
412b (412c) first toggling part
413b (413c) second toggling part
414b (414c) retaining groove
42b (42c) first toggling block
43b (43c) second toggling block
44b (44c) first rotating shaft
41d second sliding rail
411d stopping block
42d toggling tongue
421d rotational part
422d tongue part
43d lever member
431d hook
44d second rotating shaft
41e lever rotating member
411e rotating mounting part
412e third toggling part
413e fourth toggling part
air-inlet pipe
hose
600 directional control valve 61 three-way pipe
611 first pipe section
612 second pipe section
613 third pipe section
62 two-way pipe
621 fourth pipe section
622 fifth pipe section
631 first air hole
632 second air hole
633 third air hole
634 fourth air hole

DETAILED DESCRIPTION

Embodiments of the present disclosure will be described in detail below and examples of the embodiments will be illustrated in the drawings, where same or similar reference numerals are used to indicate same or similar members or members with same or similar functions. The embodiments described herein with reference to drawings are explanatory, which are used to illustrate the present disclosure, but shall not be construed to limit the present disclosure.

The following description provides a plurality of different embodiments or examples to realize different structures of the present disclosure. To simplify the description of the present disclosure, components and configurations in specific examples are elaborated below. Of course, they are only explanatory, and are not intended to limit the present disclosure. Moreover, reference numbers and/or letters may be repeated in different examples of the present disclosure for the purpose of simplicity and clarity, which shall not be constructed to indicate the relationships among various embodiments and/or configurations. In addition, the present disclosure provides examples of various specific processes and materials, but applicability of other processes and/or utilization of other materials are conceivable for those skilled in the art.

An upright vacuum cleaner 1 according to embodiments of the present disclosure will be described with reference to FIGS. 1 to 55.

The upright vacuum cleaner 1 according to embodiments of the present disclosure includes a brushroll 11, a motor assembly 200 and a body assembly 300. Referring to FIG. 1, the brushroll 11 extends along a horizontal direction (i.e. a left-and-right direction as shown in FIG. 1); the motor assembly 200 is disposed in rear of the brushroll 11 and is connected with the brushroll 11 to drive the rotation of the brushroll 11 around its own center of rotation, so as to achieve a purpose of sweeping the floor; dusts, debris and dirty air swept by the brushroll 11 are sucked into a brushroll air-suction channel 122 via a dust suction port of a brushroll casing 12 and are processed in the body assembly 300.

Further, the motor assembly 200 includes a motor housing 21 and a motor 22 disposed within the motor housing 21, in which a rotating axis of the motor 22 and a rotating axis of the brushroll 11 are disposed in a non-parallel manner, and the motor 22 drives the brushroll 11 rolling by a drive belt 13 and is rotatable between a first upright position of tensioning the drive belt 13 and a first oblique position of loosening the drive belt 13. Specifically, as shown in FIG. 1, the rotating axis of the brushroll 11 extends along the horizontal direction (i.e. the left-and-right direction as shown in FIG. 1); the rotating axis of the motor 22 and the rotating axis of the brushroll 11 are disposed in the non-parallel manner. For example, the rotating axis of the motor 22 may extend along a vertical direction (i.e. an up-and-down direction as shown in FIG. 2) or be disposed obliquely with respect to the vertical direction; the drive belt 13 is disposed between the motor 22 and the brushroll 11 and is connected with the motor 22 and the brushroll 11 respectively, such that the motor 22 may drive the brushroll 11 via the drive belt 13.

The body assembly 300 includes a body 31, a bridging member 32 and a dirt cup 37 mounted on the body 31, in which the bridging member 32 is rotatably connected with the motor housing 21 to make the body 31 rotatable between a second upright position and a second oblique position. Alternatively, the dirt cup 37 is detachably disposed on the body 31 and defines a separating chamber 371 therein, and the separating chamber 371 is communicated with a dirty air outlet 211 and a clean air inlet 212 on the motor housing 21 respectively. Specifically, dirty air and dust are introduced into the brushroll air-suction channel 122 via the dust suction port of the brushroll casing 12, then into a motor air-suction channel 216 in the motor housing 21, and discharged into the separating chamber 371 of the dirt cup 37 via the dirty air outlet 211 on the motor housing 21; clean air obtained through filtration and processing of the dirt cup 37 enters a motor air-exhaust channel within the motor housing 21 via the clean air inlet 212 on the motor housing 21 and is discharged to the outside via an air exhaust hole 213 on the motor housing 21.

The motor 22 is moved from the first oblique position to the first upright position by the bridging member 32 when the body 31 moves from the second upright position to the second oblique position.

Thus, in the upright vacuum cleaner 1 according to the embodiments of the present disclosure, the rotating axis of the motor 22 and the rotating axis of the brushroll 11 are disposed in the non-parallel manner, so as to reduce a volume of the motor 22 and hence the occupation space of the upright vacuum cleaner 1. Further, the upright vacuum cleaner 1 controls the rotation of the brushroll 11 and generation of the dust suction flow simultaneously by one motor 22, which occupies smaller space with fewer parts, and can realize synchronous control over dust sweep and dust suction. Additionally, the motor of the upright vacuum cleaner 1 is disposed vertically to reduce the occupation space of the upright vacuum cleaner 1 and facilitate diverse arrangements of various parts of the upright vacuum cleaner 1.

The upright vacuum cleaner 1 further includes a clutching device 400 disposed between the bridging member 32 and the motor 22, in which the motor 22 is moved from the first oblique position to the first upright position by the bridging member 32 via the clutching device 400, when the body 31 moves from the second upright position to the second oblique position. Specifically, when the body 31 is located at the second upright position, an axis of a motor shaft 221 of the motor 22 is disposed obliquely backwards with respect to an axis of the motor housing 21. That is, the motor 22 is at the first oblique position. In such a case, two ends of the drive belt 13 are fitted over the brushroll 11 and the motor shaft 221 respectively, but the drive belt 13 is in a loosening state. When the body 31 is located at the second oblique position, the axis of the motor 22 extends along the vertical direction. That is, the motor 22 is at the first upright position, in which case the drive belt 13 is tensioned. When the body 31 is turned manually from the second upright position to the second oblique position, the bridging member 32 on the motor housing 21 rotates relative to the motor housing 21 and the motor 22 is moved from the first oblique position to the first upright position by the bridging member 32 via the clutching device 400. In this process, a lower end of the motor shaft 221 is moved backwards gradually, to increase the distance between the lower end of the motor shaft 221 and the brushroll 11, so as to tension the drive belt 13 to implement the operations of dust sweep and dust suction.

Referring FIG. 1 to FIG. 3, the motor 22 is disposed in the motor housing 21 and is connected with a fan and the brushroll 11 respectively. The motor 22 may drive the rotation of the fan to generate an air flow so as to provide a vacuuming power; and the motor 22 may also drive the rotation of the brushroll 11 around its own axis so as to realize the purpose of cleaning the ground.

Further, the rotating axis of the motor 22 and the rotating axis of the brushroll 11 are disposed in the non-parallel manner, and the motor 22 drives the brushroll 11 rolling by the drive belt 13. Specifically, as shown in FIG. 1, the rotating axis of the brushroll 11 extends along the horizontal direction (i.e. the left-and-right direction as shown in FIG. 1); the rotating axis of the motor 22 and the rotating axis of the brushroll 11 are disposed in the non-parallel manner. For example, the rotating axis of the motor 22 may extend along the vertical direction (i.e. the up-and-down direction as shown in FIG. 2) or be disposed obliquely with respect to the vertical direction; the drive belt 13 is disposed between the motor 22 and the brushroll 11 and is connected with the motor 22 and the brushroll 11 respectively, such that the motor 22 may drive the brushroll 11 via the drive belt 13.

Alternatively, the motor 22 may be disposed near the ground. That is, the gravity of the motor 22 is lower than that of the motor 22 of the vacuum cleaner in the related art, such that for the vacuum cleaners having the body 31 of the same length, the upright vacuum cleaner in the present disclosure is convenient to operate and with less effort for the users. A switch on the body 31 of the upright vacuum cleaner 1 is controlled manually to start or stop the upright vacuum cleaner 1. When the upright vacuum cleaner 1 is started, the motor 22 drives the rotation of the fan and the brushroll 11 simultaneously to provide the vacuuming power. That is, various operations may be completed simply and conveniently by one button.

In the upright vacuum cleaner 1 according to the embodiments of the present disclosure, the rotating axis of the motor 22 and the rotating axis of the brushroll 11 are disposed in the non-parallel manner, so as to reduce the volume of the motor 22 and hence the occupation space of the upright vacuum cleaner 1, thereby facilitating diverse arrangements of various parts of the upright vacuum cleaner 1. Further, the upright vacuum cleaner 1 controls the rotation of the brushroll 11 and the fan simultaneously by one motor 22, which occupies smaller space with fewer parts, and can realize synchronous control over dust sweep and dust suction. The upright vacuum cleaner 1 has a simple and compact structure, so it occupies a small space and is convenient to operate.

In some specific embodiments of the present disclosure, the drive belt 13 is winded upon the motor shaft 221 of the motor 22 and the brushroll 11. The drive belt 13 is configured to be annular, in which a first end of the drive belt 13 is winded upon the motor shaft 221 of the motor 22 while a second end of the drive belt 13 is winded upon the brushroll 11. Since the rotating axis of the motor 22 (i.e. the rotating axis of the motor shaft 221 of the motor 22) and that of the brushroll 11 are disposed in the non-parallel manner, two ends of the drive belt 13 are twisted.

Referring to FIG. 2 and FIG. 3, the brushroll 11 and the motor 22 are spaced apart in a front-and-rear direction, and the brushroll 11 is located at a front side of the motor 22. The first end of the drive belt 13 is fitted over the motor shaft 221 of the motor 22 while the second end of the drive belt 13 is fitted over the brushroll 11. When the motor shaft 221 of the motor 22 rotates, the motor shaft 221 drives the rotation of the drive belt 13 due to a frictional resistance between the motor shaft 221 and a surface of the drive belt 13. Similarly, the drive belt 13 drives the rotation of the brushroll 11 around its own axis due to a frictional resistance between the brushroll 11 and the surface of the drive belt 13, thus realizing the rotation of the brushroll 11 driven by the motor 22. By disposing the drive belt 13 between the motor 22 and the brushroll 11, the motor 22 may drive the rotation of the fan and the brushroll 11 simultaneously. Compared with the vacuum cleaner in the related art that realizes control over the rotation of the fan and the brushroll 11 by two motors 22 respectively, the upright vacuum cleaner 1 has the simple structure and fewer parts, so it occupies the small space and is convenient to assemble and disassemble, which improves the assembling efficiency, and may realize synchronous control over dust sweep and dust suction as well.

A contact point of the drive belt 13 and the part winded up by the drive belt 13 is alterable, and a twist angle of the drive belt 13 between two adjacent alterable contact points ranges from 30° to 90°.

Specifically, the first end of the annular drive belt 13 wraps at least a part of a side wall of the brushroll 11, and the second end of the annular drive belt 13 wraps at least a part of a side wall of the motor shaft 221 of the motor 22. A surface of the drive belt 13 connected with the brushroll 11 extends axially along the brushroll 11, while a surface of the drive belt 13 connected with the motor shaft 221 of the motor 22 extends axially along the motor shaft 221. Since the axis of the motor shaft 221 of the motor 22 and that of the brushroll 11 are disposed in the non-parallel manner, the drive belt 13 between the brushroll 11 and the motor shaft 221 is twisted for one time with an angle of 30° to 90°. It shall be noted that when the drive belt 13 is annular, an upper half of the drive belt 13 and a lower half of the drive belt 13 are both twisted with the same twist angle between the brushroll 11 and the motor shaft 221 for one time.

In some other specific embodiments of the present disclosure, the drive belt 13 is winded upon the motor shaft 221 of the motor 22, the brushroll 11 and at least one guide pulley. The drive belt 13 is configured to be annular, and the surface thereof is winded upon the motor shaft 221 of the motor 22, the brushroll 11 and the at least one guide pulley. For example, if there is one guide pulley, the first end of the drive belt 13 is winded upon the motor shaft 221 of the motor 22 while the second end of the drive belt 13 is winded upon the brushroll 11, and the guide pulley is disposed between the motor 22 and the brushroll 11 and abuts against a surface of the drive belt 13 located above the guide pulley, so as to make the upper half of the drive belt 13 twist twice. Of course, the present disclosure is not limited thereby. There may be a plurality of guide pulleys to make the drive belt 13 twist a plurality of times.

Further, in this embodiment, the contact points of the drive belt 13 with the motor shaft 221 of the motor 22, the brushroll 11 and the at least one guide pulley are alterable, and the twist angle of the drive belt 13 between two adjacent alterable contact points ranges from 30° to 90°. For example, one guide pulley is disposed between the motor shaft 221 and the brushroll 11, in which the twist angle of the drive belt 13 between the alterable contact point of the drive belt 13 and the motor shaft 221 of the motor 22 and the alterable contact point of the drive belt 13 and the guide pulley is 30°, while the angle of the drive belt 13 between the alterable contact point of the drive belt 13 and the guide pulley and the alterable contact point of the drive belt 13 and the brushroll 11 is 60°.

Consequently, a direction changing motion may be realized by disposing the drive belt 13 twisted between the motor shaft 221 and the brushroll 11, to transfer the rotation of the motor shaft 221 to the rotation of the brushroll 11, so as to facilitate the transmission of motion and power; the drive belt 13 may operate more stably and reliably by winding the drive belt 13 upon the motor shaft 221, the brushroll 11 and the at least one guide pulley, to guarantee that the dust sweep and dust suction of the upright vacuum cleaner 1 are conducted synchronously.

In an example of the present disclosure, the rotating axis of the motor 22 is disposed in perpendicular to that of the brushroll 11, and the drive belt 13 is disposed at the twist angle of 90°. Referring to FIG. 1, the brushroll 11 is disposed in a horizontal plane and the rotating axis of the brushroll 11 extends along the horizontal direction; the motor 22 is disposed vertically within the motor housing 21 and the motor shaft 221 of the motor 22 is located in a vertical plane perpendicular to the rotating axis of the brushroll 11. That is, the rotating axis of the motor shaft 221 of the motor 22 and the rotating axis of the brushroll 11 are disposed in perpendicular to each other, so the upper half of the drive belt 13 and the lower half thereof are both twisted between the brushroll 11 and the motor shaft 221 for one time, and the twist angle of two ends of each section of the drive belt 13 is 90°.

Alternatively, according to an embodiment of the present disclosure, the motor shaft 221 of the motor 22 is disposed vertically. Specifically, the motor 22 mainly includes a motor body and a motor casing 222. The motor body is disposed within the motor casing 222 and is mainly constituted by a core and the motor shaft 221. The motor shaft 221 of the motor 22 is connected with the core of the motor 22, and the motor 22 is arranged vertically. When the upright vacuum cleaner 1 is in a non-working state, an upper end of the motor shaft 221 is disposed obliquely backwards relative to the vertical direction (i.e. the up-and-down direction shown in FIG. 3). During the dust suction of the upright vacuum cleaner 1, a central axis of the motor shaft 221 extends along the vertical direction. That is, the first end of the motor shaft 221 of the upright vacuum cleaner 1 may extend downwards relative to the core along the vertical direction (i.e. the up-and-down direction shown in FIG. 3). The first end of the drive belt 13 is fitted over the lower end of the motor shaft 221 and the second end of the drive belt 13 is fitted over the brushroll 11. Because the rotating axis of the brushroll 11 is disposed in the horizontal plane, the drive belt 13 is twisted at least one time between the brushroll 11 and the motor shaft 221. That is, the twist angle of the drive belt 13 between the alterable contact point of the drive belt 13 and the motor shaft 221 and the alterable contact point of the drive belt 13 and the brushroll 11 is 90°.

When the body 31 is at the upright position, the axis of the motor shaft 221 of the motor 22 is disposed obliquely backwards relative to the axis of the motor housing 21, in which case the two ends of the drive belt 13 are fitted over the motor shaft 221 and the brushroll 11 respectively, but the drive belt 13 is loosened. When the body 31 is at the oblique position, the axis of the motor 22 extends along the vertical direction. That is, the motor 22 is in an upright state, such that the drive belt 13 is tensioned. Specifically, when the body 31 is manipulated from the upright position to the oblique position, the lower end of the motor shaft 221 moves backwards gradually, to increase the distance between the lower end of the motor shaft 221 and the brushroll 11 and thus to tension the drive belt 13.

The upright vacuum cleaner 1 further includes a stopping piece (not shown) disposed below the drive belt 13 and adjacent to the motor 22 to prevent the drive belt 13 from falling off from the motor shaft 221. For example, the stopping piece may be a snap spring disposed on the motor shaft 221, and the snap spring may be disposed at a free end of the motor shaft 221 to locate an end of the drive belt 13 connected with the motor shaft 221 above the snap spring, so as to avoid the drive belt 13 from sliding off from the motor shaft 221. The stopping piece may also be constituted by a structure of the free end of the motor shaft 221. Of course, the present disclosure is not limited thereby—the stopping piece may also be disposed on another part below the drive belt 13 to prevent the drive belt 13 from sliding off from the motor shaft 221. Thus, by disposing the stopping piece below the drive belt 13, it is possible to prevent the drive belt 13 from sliding off from the motor shaft 221 and guarantee a reliability of the operation of the drive belt 13, further to ensure a normal operation of the upright vacuum cleaner 1.

In some examples of the present disclosure, the second end of the drive belt 13 is fitted over the brushroll 11 and located in a middle part of the brushroll 11. The brushrolles 11 at both sides of the drive belt 13 sweeps dust respectively, and the dust and dirty air are sucked into the brushroll casing 12 from the dust suction port and then enter the dirt cup 37 for filtration. Finally, clean air is discharged from the air exhaust hole 213 of the motor housing 21. It shall be noted herein that the middle part is a relative term, and may refer to a part between the left and right ends of the brushroll 11 rather than be limited to the very central part of the brushroll 11. Specifically, the middle part may refer to a part between the very central part and the left end, or a part between the very central part and the right end.

Preferably, according to an embodiment of the present disclosure, the drive belt 13 is winded upon a very central part in a direction of the axis of the brushroll 11. Referring to FIG. 9 to FIG. 11, the second end of the drive belt 13 is fitted over the very central part in the direction of the axis of the brushroll 11. That is, the drive belt 13 divides the brushroll 11 into symmetrical left and right parts.

According to an embodiment of the present disclosure, the upright vacuum cleaner 1 further includes the brushroll casing 12 that has the brushroll air-suction channel 122 and a drive-belt mounting chamber 123 for mounting the drive belt 13. Referring to FIG. 9, the brushroll casing 12 is formed as a T shape. That is, the brushroll casing 12 includes a brush casing extending along the horizontal direction (i.e. the left-and-right direction shown in FIG. 11) and a belt casing extending along the vertical direction (i.e. the front-and-rear direction shown in FIG. 11). The brushroll casing 12 defines the drive-belt mounting chamber 123 and the brushroll air-suction channel 122 located at both sides of the drive-belt mounting chamber 123; the brushroll 11 is rotatably disposed in the brushroll air-suction channel 122 and the rotating axis of the brushroll 11 extends along a length direction of the brush casing; the drive belt 13 is rotatably disposed within the drive-belt mounting chamber 123. Further, the brushroll air-suction channel 122 and the drive belt 13 are separated. The second end of the drive belt 13 is fitted over the brushroll 11 and the first end thereof is fitted over the motor shaft 221; the drive-belt mounting chamber 123 and the brushroll air-suction channel 122 are separated to prevent the dust and debris in the brushroll air-suction channel 122 from winding upon the drive belt 13 and the motor shaft 221 and to guarantee the stability and reliability of the operation of the drive belt 13 and the motor 22, so as to ensure the normal working of the upright vacuum cleaner 1.

The brushroll air-suction channel 122 includes a first air-suction channel 1221 and a second air-suction channel 1222 located at both sides of the drive-belt mounting chamber 123. Referring to FIG. 11 and FIG. 12, the first air-suction channel 1221 and the second air-suction channel 1222 are located at left and right sides of the drive belt 13 respectively, and the dirty air and dust sucked through the brushroll casing 12 are delivered to the dirt cup 37 through the first air-suction channel 1221 and the second air-suction channel 1222 respectively. The first air-suction channel 1221 and the second air-suction channel 1222 may be spaced apart and disposed at the left and right sides of the drive belt 13, such that the dirty air and dust sucked through the dust suction port of the brushroll casing 12 are delivered into the first air-suction channel 1221 and the second air-suction channel 1222 respectively, and then mixed together to flow into the dirt cup 37.

Alternatively, the first air-suction channel 1221 and the second air-suction channel 1222 may be defined by a part within the brushroll casing 12 or by an inner wall of the brushroll casing 12. Of course, the present disclosure is not limited thereby—the first air-suction channel 1221 and the second air-suction channel 1222 may be communicated with each other. That is, the space in the brushroll casing 12 belongs to the first air-suction channel 1221 and the second air-suction channel 1222, except the drive-belt mounting chamber 123, and the dirty air and dust sucked through the dust suction port of the brushroll casing 12 are delivered into the dirt cup 37 via the drive-belt mounting chamber 123. Hence, by disposing the first air-suction channel 1221 and the second air-suction channel 1222 at both sides of the drive belt 13, it is possible to achieve the effect of dust suction at both sides of the drive belt 13, so as to expand the range of dust suction and improve the working efficiency of the upright vacuum cleaner 1.

The first air-suction channel 1221 and the second air-suction channel 1222 each include a lateral air-suction channel section and a longitudinal air-suction channel section. The lateral air-suction channel section extends axially along the brushroll 11, and the longitudinal air-suction channel section extends in a direction axially perpendicular to the brushroll 11 and is communicated with the corresponding lateral air-suction channel section.

Figure 14:
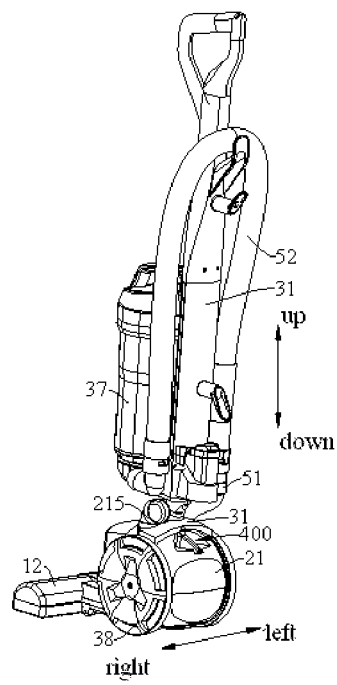
FIG. 14 is a schematic view of an upright vacuum cleaner according to another embodiment of the present disclosure.

Referring to FIG. 14, the brushroll 11 includes a first brushroll section 111 provided with bristle, a second brushroll section 112 provided with bristle, and a connecting-shaft section 113 connected between the first brushroll section 111 and the second brushroll section 112. The drive belt 13 is winded upon the motor shaft 221 of the motor 22 and the connecting-shaft section 113 to make the motor 22 drive the brushroll 11 rolling. The first air-suction channel 1221 mainly includes the lateral air-suction channel section located at a left side of the connecting-shaft section 113 and the longitudinal air-suction channel section located at a left side of the connecting-shaft section 113. The second air-suction channel 1222 mainly includes the lateral air-suction channel section located at a right side of the connecting-shaft section 113 and the longitudinal air-suction channel section located at a right side of the connecting-shaft section 113. A central line of each lateral air-suction channel section is perpendicular to a central line of each longitudinal air-suction channel section at a corresponding position.

Alternatively, the first air-suction channel 1221 and the second air-suction channel 1222 are formed as an L shape respectively and disposed in a back-to-back manner. The drive-belt mounting chamber 123 is located between the first air-suction channel 1221 and the second air-suction channel 1222. When the brushroll 11 is mounted within the brushroll casing 12, the motor 22 drives the brushroll 11 rolling by the drive belt 13 to realize the purpose of cleaning the ground. By disposing the first air-suction channel 1221 and the second air-suction channel 1222 at both sides of the drive belt 13, it is possible to achieve the effect of dust suction at both sides of the drive belt 13, so as to expand the range of dust suction and improve the working efficiency of the upright vacuum cleaner 1.

Referring to FIG. 1, the brushroll casing 12 is formed as a T shape. That is, the brushroll casing 12 includes a brush casing extending along the horizontal direction (i.e. the left-and-right direction shown in FIG. 1) and a belt casing extending along the vertical direction (i.e. the front-and-rear direction shown in FIG. 2 and FIG. 3). The brushroll casing 12 defines the drive-belt mounting chamber 123 and the brushroll air-suction channel 122 located at both sides of the drive-belt mounting chamber 123; the brushroll 11 is rotatably disposed in the brushroll air-suction channel 122 and the rotating axis of the brushroll 11 extends along a length direction of the brush casing; the drive belt 13 is rotatably disposed within the drive-belt mounting chamber 123.

The second end of the drive belt 13 is fitted over the brushroll 11 and located in the middle part of the brushroll 11. The brushrolles 11 at both sides of the drive belt 13 sweep dust respectively, and the dust and dirty air are sucked into the brushroll casing 12 from the dust suction port and then enter the dirt cup 37 for filtration. Finally, clean air is discharged from the air exhaust hole 213 of the motor housing 21. It shall be noted herein that the middle part is a relative term, and may refer to a part between the left and right ends of the brushroll 11 rather than be limited to the very central part. Specifically, the middle part may refer to a part between the very central part and the left end, or a part between the very central part and the right end.

Further, the brushroll air-suction channel 122 includes a first air-suction channel 1221 and a second air-suction channel 1222 located at both sides of the drive-belt mounting chamber 123. Referring to FIG. 11, the first air-suction channel 1221 and the second air-suction channel 1222 are located at left and right sides of the drive belt 13 respectively, and the dirty air and dust sucked through the brushroll casing 12 are delivered to the dirt cup 37 through the first air-suction channel 1221 and the second air-suction channel 1222 respectively. The first air-suction channel 1221 and the second air-suction channel 1222 may be spaced apart and disposed at the left and right sides of the drive belt 13, such that the dirty air and dust sucked through the brushroll casing 12 are delivered into the first air-suction channel 1221 and the second air-suction channel 1222 respectively, and then mixed together to flow into the dirt cup 37. Specifically, the first air-suction channel 1221 and the second air-suction channel 1222 may be defined by a part within the brushroll casing 12 or by an inner wall of the brushroll casing 12. Of course, the present disclosure is not limited thereby—the first air-suction channel 1221 and the second air-suction channel 1222 may also be communicated with each other. That is, the space in the brushroll casing 12 belongs to the first air-suction channel 1221 and the second air-suction channel 1222, except the space occupied by the drive-belt mounting chamber 123, and the dirty air and dust sucked through the dust suction port of the brushroll casing 12 are delivered into the dirt cup 37 via the drive-belt mounting chamber 123.

Therefore, by disposing the drive belt 13 between the motor 22 and the brushroll 11, the motor 22 may control the rotation of the brushroll 11 and the fan simultaneously, which utilizes fewer parts and occupies smaller space, and can realize synchronous control over dust sweep and dust suction. In addition, by disposing the first air-suction channel 1221 and the second air-suction channel 1222 at both sides of the drive belt 13 (i.e. disposing the drive belt 13 in the middle part of the brushroll 11), it is possible to achieve the effect of dust suction at both sides of the drive belt 13, so as to expand the range of dust suction and improve the working efficiency of the upright vacuum cleaner 1. The upright vacuum cleaner 1 has a simple and compact structure, so it occupies a small space and is convenient to operate, resulting in a high working efficiency.

Specifically, the first air-suction channel 1221 and the second air-suction channel 1222 are located at both sides of the drive-belt mounting chamber 123 respectively and spaced apart from the drive-belt mounting chamber 123. That is, the brushroll air-suction channel 122 is separated from the drive belt 13. The first end of the drive belt 13 is fitted over the motor shaft 221 and the second end of the drive belt 13 is fitted over the brushroll 11; the first air-suction channel 1221 and the second air-suction channel 1222 are spaced apart and disposed at the left and right sides of the drive belt 13, such that the dirty air and dust sucked through the dust suction port of the brushroll casing 12 are delivered into the first air-suction channel 1221 and the second air-suction channel 1222 respectively, and then mixed together to flow into the dirt cup 37. The drive-belt mounting chamber 123 and the brushroll air-suction channel 122 are separated to prevent the dust and debris in the brushroll air-suction channel 122 from winding upon the drive belt 13 and the motor shaft 221 and to guarantee the stability and reliability of the operation of the drive belt 13 and the motor 22, so as to ensure the normal working of the upright vacuum cleaner 1.

Preferably, an end of the drive-belt mounting chamber 123 is just opposite to the very central part in the direction of the axis of the brushroll 11. Referring to FIG. 12, the end of the drive belt 13 is fitted over the very middle part of the brushroll 11 to make two ends of the brush roller 11 be under balanced forces and ensure that the motor 22 may drive the brush roller 11 operating stably. The first air-suction channel 1221 and the second air-suction channel 1222 each include the lateral air-suction channel section and the longitudinal air-suction channel section. The lateral air-suction channel section extends axially along the brushroll 11, and the longitudinal air-suction channel section extends in the direction axially perpendicular to the brushroll 11 and is communicated with the corresponding lateral air-suction channel section.

Alternatively, the first air-suction channel 1221 and the second air-suction channel 1222 are formed as the L shape respectively and disposed in the back-to-back manner. The axis of the drive-belt mounting chamber 123 is connected to the very center of the brushroll casing 12. That is, the end of the drive belt 13 is connected with the very center of the brushroll 11. The drive-belt mounting chamber 123 is located between the first air-suction channel 1221 and the second air-suction channel 1222. When the brushroll 11 is mounted within the brushroll casing 12, the motor 22 drives the brushroll 11 rolling by the drive belt 13 to realize the purpose of cleaning the ground.

Preferably, according to an embodiment of the present disclosure, the first air-suction channel 1221 and the second air-suction channel 1222 are disposed symmetrically at both sides of the drive belt 13. That is, the first air-suction channel 1221 has the same length and the same sectional area as the second air-suction channel 1222. That is, the air suction capacities of the first air-suction channel 1221 and the second air-suction channel 1222 are equal, such that the dirty air and dust sucked via the air suction inlet enter the dirt cup 37 evenly through the first air-suction channel 1221 and the second air-suction channel 1222 to guarantee the uniformity of dust suction at both sides of the drive belt 13.

According to an embodiment of the present disclosure, the upright vacuum cleaner 1 further includes the motor housing 21 for accommodating the motor 22, and the motor housing 21 has a first branch channel 2161 communicated with the first air-suction channel 1221 and a second branch channel 2162 communicated with the second air-suction channel 1222.

In other words, the upright vacuum cleaner 1 mainly includes the brushroll 11, the motor 22, the brushroll casing 12, the dirt cup 37 and the motor housing 21. The motor housing 21 defines an accommodating chamber for mounting the motor 22 that is movably disposed in the accommodating chamber of the motor housing 21. Referring to FIG. 12, the motor housing 21 is configured as a hollow column and defines the first branch channel 2161 and the second branch channel 2162 therein that are spaced apart from each other. The motor 22 is located between the first branch channel 2161 and the second branch channel 2162, in which a first end of the first branch channel 2161 is communicated with the first air-suction channel 1221 and a first end of the second branch channel 2162 is communicated with the second air-suction channel 1222, while a second end of the first branch channel 2161 and a second end of the second branch channel 2162 are communicated with the dirt cup 37 respectively.

Alternatively, the first branch channel 2161 and the second branch channel 2162 are disposed oppositely and located at left and right sides of the drive belt 13. That is, the first air-suction channel 1221 is communicated with the first branch channel 2161 and disposed at the left side of the drive belt 13, while the second air-suction channel 1222 is communicated with the second branch channel 2162 and disposed at the right side of the drive belt 13, such that a part of dirty air and dust sucked into the brushroll casing 12 enters the dirt cup 37 sequentially through the first air-suction channel 1221 and the first branch channel 2161, while another part of the dirty air and dust enters the dirt cup 37 sequentially through the second air-suction channel 1222 and the second branch channel 2162.

Therefore, by disposing the first branch channel 2161 and the second branch channel 2162 symmetrically at both sides of the motor 22, it is possible to utilize the space between the motor housing 21 and the motor casing 222 effectively to make the internal structure compact and improve the space utilization rate; it is also possible to reduce the number of pipes to lower the cost and improve the assembling or disassembling efficiency; it is further possible to avoid the influence of external pipes during the dust suction and improve an aesthetic outlook of the upright vacuum cleaner 1.

According to an embodiment of the present disclosure, the first branch channel 2161 and the second branch channel 2162 are defined by the motor casing 222 of the motor 22 and the motor housing 21.

That is, the motor 22 is mainly constituted by the motor casing 222, the core and the motor shaft 221. The core is disposed within the motor casing 222; the first end of the motor shaft 221 is connected with the core and the second end of the motor shaft 221 is protruded beyond the motor casing 222; the motor 22 is movably disposed within the motor housing 21; an external wall of the motor casing 222 of the motor 22 is separated apart from an inner wall of the motor housing 21 to define the first branch channel 2161 and the second branch channel 2162 therebetween. That is, the first branch channel 2161 and the second branch channel 2162 are defined by the motor casing 222 of the motor 22 and the motor housing 21. Of course, the present disclosure is not limited thereby. The first branch channel 2161 and the second branch channel 2162 may also be defined by other parts (like pipes) in the motor housing 21, or by a structure of the motor housing 21.

It shall be noted that the first branch channel 2161 and the second branch channel 2162 may be configured as a space in the motor housing 21, except the motor 22. That is, the first branch channel 2161 and the second branch channel 2162 surround the circumference of the motor 22 and are communicated with each other. The first branch channel 2161 and the second branch channel 2162 may also be individual passages that are not communicated with the accommodating chamber of the motor housing 21. Of course, the present disclosure is not limited thereby. One of the first branch channel 2161 and the second branch channel 2162 may be configured to be an individual passage not in communication with the accommodating chamber of the motor housing 21, but the other of the first branch channel 2161 and the second branch channel 2162 may be configured to be the space of the accommodating chamber except the motor 22 and the other individual passage.

Preferably, according to an embodiment of the present disclosure, the first branch channel 2161 and the second branch channel 2162 together make up a stereoscopic space with a substantially annular cross section. Referring to FIG. 12, the first branch channel 2161 and the second branch channel 2162 are configured to be semi-annular and disposed in an opposite manner to define a cylindrical stereoscopic space in the motor housing 21 for mounting the motor 22. In other words, the first branch channel 2161 and the second branch channel 2162 surround the two sides of the motor 22 to utilize the space effectively and improve the space utilization rate.

According to an embodiment of the present disclosure, the motor housing 21 has the dirty air outlet 211 and the clean air inlet 212 communicated with the dirt cup 37; the first branch channel 2161 and the second branch channel 2162 are converged and then communicated to the dirty air outlet 211. Referring to FIG. 14, the dirt cup 37 is disposed above the motor housing 21. The motor housing 21 has the dirty air outlet 211 and the clean air inlet 212 spaced apart from each other. The dirty air outlet 211 is communicated with the dust suction port of the brushroll casing 12, the first air-suction channel 1221, the second air-suction channel 1222, the first branch channel 2161 and the second branch channel 2162, and may be communicated with the dirt cup 37 via a hose 52. The dirty air and dust sucked via the dust suction port enter the motor housing 21 respectively through the first air-suction channel 1221 and the second air-suction channel 1222 at two sides of the drive belt 13, then are delivered to the dirty air outlet 211 respectively through the first branch channel 2161 and the second branch channel 2162, and finally are delivered to the dirt cup 37 for filtration.

Figure 6:
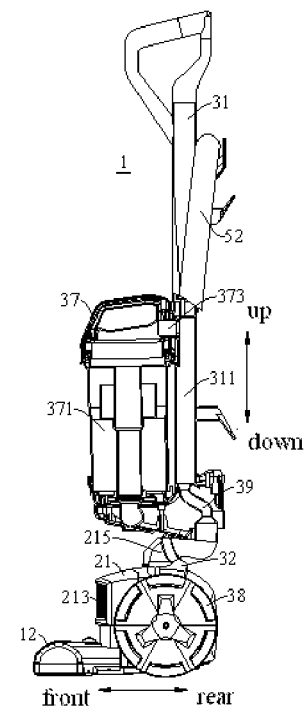
FIG. 6 is a side view of the upright vacuum cleaner of FIG. 5.

Alternatively, the dirty air outlet 211 is connected to the dirt cup 37 by an air-inlet pipe assembly to be communicated with the separating chamber 371. Specifically, as shown in FIG. 5 and FIG. 6, two ends of the air-inlet pipeair-inlet pipe assembly are communicated with the separating chamber 371 of the dirt cup 37 and the dirty air outlet 211 on the motor housing 21 respectively, such that the dirty air and dust are sucked into the brushroll air-suction channel 122 via the dust suction port of the brushroll casing 12, then into the motor air-suction channel 216 in the motor housing 21, and discharged from the dirty air outlet 211 on the motor housing 21, then discharged into the separating chamber 371 of the dirt cup 37 through the dirty air outlet 211 on the motor housing 21 for filtration. The clean air obtained enters the motor air-exhaust channel in the motor housing 21 sequentially through the air-inlet pipe assembly and the clean air inlet 212 of the motor housing 21, and finally is charged to the outside through the air exhaust hole 213 of the motor housing 21. Thus, the air-inlet pipe assembly disposed between the dirt cup 37 and the dirty air outlet 211 may serve to transmit dirty air and dust and to guarantee the communication of the air flow channels.

Alternatively, according to an embodiment of the present disclosure, the air-inlet pipe assembly includes an air-inlet pipe 51 and the hose 52. Specifically, the air-inlet pipe 51 is disposed on the motor housing 21 and defines a first end communicated with the dirty air outlet 211, and the hose 52 is connected between a second end of the air-inlet pipe 51 and an air inlet 372 of the dirt cup 37.

Referring to FIG. 5 and FIG. 6, the air-inlet pipe assembly mainly includes the air-inlet pipe 51 and the hose 52. The air-inlet pipe 51 is fixed on the motor housing 21 and the first end of the air-inlet pipe 51 is communicated with the dirty air outlet 211 on the motor housing 21 and the second end thereof is communicated with a first end of the hose 52; a second end of the hose 52 is communicated with the separating chamber 371 of the dirt cup 37. Advantageously, the length of the hose 52 may be greater than that of the body 31 to prolong the transmission time and the filtration time of the dirty air and increase the dust suction capacity, so as to improve the working efficiency of the upright vacuum cleaner 1. Further, a middle part of the hose 52 may be hanged on the body 31 to make the structure compact. Alternatively, the hose 52 may be a plastic hose 52 or a rubber hose 52, so as to facilitate coiling up the hose 52 to save space and improve the space utilization rate.

In some other specific embodiments of the present disclosure, the hose 52 is detachably connected between the second end of the air-inlet pipe 51 and the air inlet 372 of the dirt cup 37. That is, the first end of the hose 52 may be detached from the second end of the air-inlet pipe 51 according to practical requirements. In this embodiment, the upright vacuum cleaner 1 may suck dust directly through the hose 52 without using the brushroll 11. Thus, the upright vacuum cleaner 1 has a simple and compact structure and is convenient to assemble or disassemble. It is possible to choose an appropriate vacuuming mode according to practical working conditions, which is easy to operate.

According to an embodiment of the present disclosure, the body 31 defines a body air-exhaust channel 311 therein. A first end of the body air-exhaust channel 311 is connected to an air outlet 373 of the dirt cup 37 and communicated to the separating chamber 371, and a second end of the body air-exhaust channel 311 is communicated with the clean air inlet 212.

Referring to FIG. 6, the dirt cup 37 has the air outlet 373 communicated with the separating chamber 371, and the body 31 defines the body air-exhaust channel 311 extending along a length direction of the body 31. An upper end of the body air-exhaust channel 311 is communicated with the air outlet 373 of the dirt cup 37 and a lower end thereof is communicated with the motor air-exhaust channel in the motor housing 21. The clean air obtained after filtration and processing of the dirt cup 37 is discharged from the air outlet 373 of the dirt cup 37, transmitted to the motor air-exhaust channel in the motor housing 21 sequentially through the body air-exhaust channel 311 and the clean air inlet 212 of the motor housing 21, and finally discharged to the outside from the air exhaust hole 213 of the motor housing 21.

Accordingly, by disposing the body air-exhaust channel 311 communicated with the air outlet 373 of the dirt cup 37 and the clean air inlet 212 respectively in the body 31, it is possible to omit the arrangement of redundant pipes, which not only reduces the parts of the upright vacuum cleaner 1 to save the cost and improve the efficiency of assembling or disassembling the upright vacuum cleaner 1, but also makes the structure of the upright vacuum cleaner 1 simple and compact to avoid the influence of external pipes and create an aesthetic outlook.

Further, the second end (i.e. the lower end shown in FIG. 6) of the body air-exhaust channel 311 is communicated with the clean air inlet 212 through an air exhaust pipe 39. Specifically, the motor 22 is disposed below the body 31; the air exhaust pipe 39 is disposed between the body 31 and the motor housing 21; two ends of the air exhaust pipe 39 are communicated with the body air-exhaust channel 311 of the body 31 and the clean air inlet 212 of the motor housing 21 respectively. The clean air obtained after filtration of the dirt cup 37 is introduced into the motor air-exhaust channel in the motor housing 21 sequentially through the body air-exhaust channel 311, the air exhaust pipe 39 and the clean air inlet 212, and finally discharged to the outside from the air exhaust hole 213 of the motor housing 21. Alternatively, the air exhaust pipe 39 may be configured as a straight pipe or a curve pipe extending from an outlet of the body air-exhaust channel 311 to the clean air inlet 212.

Figure 16:
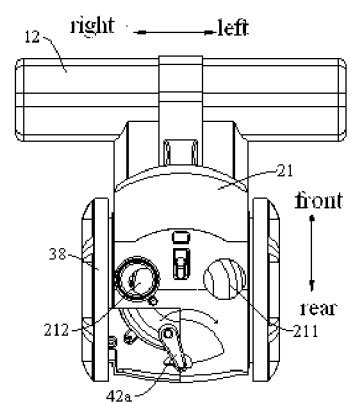
FIG. 16 is a partial assembly drawing of the upright vacuum cleaner of FIG. 14 in a working state.
Figure 17:
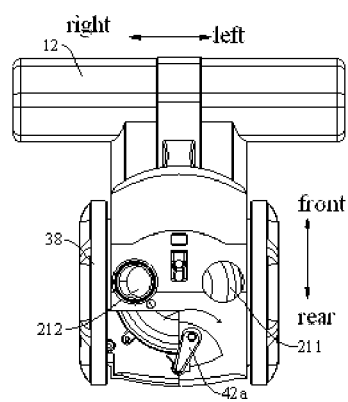
FIG. 17 is a partial assembly drawing of the upright vacuum cleaner of FIG. 14 in another working state.

Preferably, according to an embodiment of the present disclosure, the dirty air outlet 211 and the clean air inlet 212 are disposed symmetrically with respect to a central axis of the motor housing 21. Referring to FIG. 16, the dirty air outlet 211 and the clean air inlet 212 are spaced apart and disposed at left and right sides of the central axis of the motor housing 21, to make good use of the external wall of the motor housing 21 and facilitate the connection with external pipes, which forms a reasonable and compact layout.

According to an embodiment of the present disclosure, the dirty air outlet 211 is connected to the dirt cup 37 by an air-inlet pipe assembly to be communicated with the separating chamber 371. Specifically, as shown in FIG. 6, two ends of the air-inlet pipe assembly are communicated with the separating chamber 371 of the dirt cup 37 and the dirty air outlet 211 on the motor housing 21 respectively, such that the dirty air and dust are sucked into the brushroll air-suction channel 122 via the dust suction port of the brushroll casing 12, then into the motor air-suction channel 216 in the motor housing 21, and discharged from the dirty air outlet 211 on the motor housing 21, then discharged into the separating chamber 371 of the dirt cup 37 through the dirty air outlet 211 on the motor housing 21 for filtration. The clean air obtained enters the motor air-exhaust channel in the motor housing 21 sequentially through the body air-exhaust channel 311, the air exhaust pipe 39 and the clean air inlet 212, and finally is charged to the outside through the air exhaust hole 213 of the motor housing 21. Thus, the air-inlet pipe assembly disposed between the dirt cup 37 and the dirty air outlet 211 may not only serve to transmit dirty air and dust to guarantee the communication of the air flow channels, but also prolong the separation time of the dust to improve the dust suction effect of the upright vacuum cleaner 1.

Alternatively, according to an embodiment of the present disclosure, the air-inlet pipe assembly includes the air-inlet pipe 51 and the hose 52. Specifically, the air-inlet pipe 51 is disposed on the motor housing 21 and defines the first end communicated with the dirty air outlet 211, and the hose 52 is connected between the second end of the air-inlet pipe 51 and the air inlet 372 of the dirt cup 37.

Referring to FIG. 5, the air-inlet pipe assembly mainly includes the air-inlet pipe 51 and the hose 52. The air-inlet pipe 51 is fixed on the motor housing 21 and the first end of the air-inlet pipe 51 is communicated with the dirty air outlet 211 on the motor housing 21 and the second end thereof is communicated with the first end of the hose 52; the second end of the hose 52 is communicated with the separating chamber 371 of the dirt cup 37. Advantageously, the length of the hose 52 may be greater than that of the body 31 to prolong the separation time and the filtration time of the dust and dirty air and increase the dust suction capacity, so as to improve the working efficiency of the upright vacuum cleaner 1. Further, the middle part of the hose 52 may be hanged on the body 31 to make the structure compact. Alternatively, the hose 52 may be the plastic hose 52 or the rubber hose 52, so as to facilitate coiling up the hose 52 to save space and improve the space utilization rate.

In some other specific embodiments of the present disclosure, the hose 52 is detachably connected between the second end of the air-inlet pipe 51 and the air inlet 372 of the dirt cup 37. That is, the first end of the hose 52 may be detached from the second end of the air-inlet pipe 51 according to practical requirements. In other words, the upright vacuum cleaner 1 may suck dust directly through the hose 52 without using the brushroll 11. Thus, the upright vacuum cleaner 1 has a simple and compact structure and is convenient to assemble or disassemble. It is possible for users to choose an appropriate vacuuming mode according to practical working conditions, which provides good user experience and a high working efficiency with easy operations.

According to an embodiment of the present disclosure, the body 31 defines a body air-exhaust channel 311 therein. The first end of the body air-exhaust channel 311 is connected to an air outlet 373 of the dirt cup 37 and communicated to the separating chamber 371, and the second end of the body air-exhaust channel 311 is communicated with the clean air inlet 212.

Referring to FIG. 6, the dirt cup 37 has the air outlet 373 communicated with the separating chamber 371, and the body 31 defines the body air-exhaust channel 311 extending along the length direction of the body 31. The upper end of the body air-exhaust channel 311 is communicated with the air outlet 373 of the dirt cup 37 and the lower end thereof is communicated with the motor air-exhaust channel in the motor housing 21. The clean air obtained after filtration and processing of the dirt cup 37 is discharged from the air outlet 373 of the dirt cup 37, transmitted to the motor air-exhaust channel in the motor housing 21 sequentially through the body air-exhaust channel 311 and the clean air inlet 212 of the motor housing 21, and finally discharged to the outside from the air exhaust hole 213 of the motor housing 21.

Accordingly, by disposing the body air-exhaust channel 311 communicated with the air outlet 373 of the dirt cup 37 and the clean air inlet 212 respectively in the body 31, it is possible to omit the arrangement of redundant pipes, which not only reduces the parts of the upright vacuum cleaner 1 to save the cost and improve the efficiency of assembling or disassembling the upright vacuum cleaner 1, but also makes the structure of the upright vacuum cleaner 1 simple and compact to avoid the influence of external pipes and create the aesthetic outlook.

Alternatively, the motor 22 drives the brushroll 11 rolling by the drive belt 13, and the brushroll air-suction channel 122 includes the first air-suction channel 1221 and the second air-suction channel 1222 located at both sides of the drive belt 13. Referring to FIG. 11, the brushroll casing 12 defines the brushroll air-suction channel 122 and the drive-belt mounting chamber 123 for mounting the drive belt 13; the brushroll air-suction channel 122 mainly includes the first air-suction channel 1221 and the second air-suction channel 1222 located at left and right sides of the drive belt 13. The dirty air sucked through the brushroll casing 12 is transmitted to the motor air-suction channel 216 in the motor housing 21 through the first air-suction channel 1221 and the second air-suction channel 1222, and then to the dirt cup 37 by the air-inlet pipe assembly for filtration.

The first air-suction channel 1221 and the second air-suction channel 1222 may be spaced apart and disposed at the left and right sides of the drive-belt mounting chamber 123, such that the dirty air and dust sucked through the dust suction port of the brushroll casing 12 are delivered into the first air-suction channel 1221 and the second air-suction channel 1222 respectively, and then mixed together to flow into the dirt cup 37. Alternatively, the first air-suction channel 1221 and the second air-suction channel 1222 may be defined by the part disposed in the brushroll casing 12 or by the inner wall of the brushroll casing 12. Of course, the present disclosure is not limited thereby—the first air-suction channel 1221 and the second air-suction channel 1222 may also be communicated with each other. That is, the first air-suction channel 1221 and the second air-suction channel 1222 surround the drive belt 13, the space in the brushroll casing 12 belongs to the first air-suction channel 1221 and the second air-suction channel 1222, except the drive-belt mounting chamber 123, and the dirty air and dust sucked through the brushroll casing 12 are delivered into the dirt cup 37 via the drive-belt mounting chamber 123. Hence, by disposing the first air-suction channel 1221 and the second air-suction channel 1222 at both sides of the drive belt 13, it is possible to achieve the effect of dust suction at both sides of the drive belt 13, so as to expand the range of dust suction and improve the working efficiency of the upright vacuum cleaner 1.

Preferably, according to an embodiment of the present disclosure, the first air-suction channel 1221 and the second air-suction channel 1222 are disposed symmetrically with respect to the drive belt 13. That is, the first air-suction channel 1221 has the same length and the same sectional area as the second air-suction channel 1222. That is, the air suction capacities of the first air-suction channel 1221 and the second air-suction channel 1222 are equal, such that the dirty air and dust sucked via the air suction inlet enter the dirt cup 37 evenly through the first air-suction channel 1221 and the second air-suction channel 1222 to guarantee the uniformity of dust suction at both sides of the drive belt 13.

According to an embodiment of the present disclosure, the motor air-suction channel 216 includes the first branch channel 2161 communicated with the first air-suction channel 1221 and the second branch channel 2162 communicated with the second air-suction channel 1222. Referring to FIG. 12, the motor housing 21 is configured as the hollow column and defines the first branch channel 2161 and the second branch channel 2162 therein that are spaced apart from each other. The motor 22 is located between the first branch channel 2161 and the second branch channel 2162, in which the first end of the first branch channel 2161 is communicated with the first air-suction channel 1221 and the first end of the second branch channel 2162 is communicated with the second air-suction channel 1222, while the second end of the first branch channel 2161 and the second end of the second branch channel 2162 are communicated with the dirt cup 37 respectively.

Alternatively, the first branch channel 2161 and the second branch channel 2162 are disposed oppositely and located at left and right sides of the drive belt 13. That is, the first air-suction channel 1221 is communicated with the first branch channel 2161 and disposed at the left side of the drive belt 13, while the second air-suction channel 1222 is communicated with the second branch channel 2162 and disposed at the right side of the drive belt 13, such that a part of dirty air and dust sucked into the mounting chamber of the brushroll 11 from the dust suction port enters the dirt cup 37 sequentially through the first air-suction channel 1221 and the first branch channel 2161, while another part of the dirty air and dust enters the dirt cup 37 sequentially through the second air-suction channel 1222 and the second branch channel 2162.

Therefore, by disposing the first branch channel 2161 and the second branch channel 2162 at both sides of the motor 22, it is possible to utilize the space between the motor housing 21 and the motor casing 222 effectively to make the internal structure compact and improve the space utilization rate; it is also possible to reduce the number of pipes to lower the cost and improve the assembling or disassembling efficiency; it is further possible to avoid the influence of external pipes during the dust suction and create the aesthetic outlook of the upright vacuum cleaner 1.

The first branch channel 2161 and the second branch channel 2162 are defined by the motor casing 222 of the motor 22 and the motor housing 21, and together make up the stereoscopic space with the substantially annular cross section. That is, the motor 22 is mainly constituted by the motor casing 222 and the motor body. The body of the motor 22 is disposed within the motor casing 222 and is mainly constituted by the core and the motor shaft 221; the first end of the motor shaft 221 is connected with the core and the second end of the motor shaft 221 is protruded beyond the motor casing 222; the motor 22 is movably disposed within the motor housing 21; the external wall of the motor casing 222 of the motor 22 is separated apart from the inner wall of the motor housing 21 to define the first branch channel 2161 and the second branch channel 2162 therebetween. That is, the first branch channel 2161 and the second branch channel 2162 are defined by the motor casing 222 of the motor 22 and the motor housing 21. Of course, the present disclosure is not limited thereby. The first branch channel 2161 and the second branch channel 2162 may also be defined by other parts (like pipes) in the motor housing 21, or by the structure of the motor housing 21.

It shall be noted that the first branch channel 2161 and the second branch channel 2162 may be configured to be the space in the motor housing 21, except the motor 22 and the motor air-exhaust channel. That is, the first branch channel 2161 and the second branch channel 2162 surround the circumference of the motor 22 and are communicated with each other. The first branch channel 2161 and the second branch channel 2162 may also be individual passages that are not communicated with the accommodating chamber of the motor housing 21. Of course, the present disclosure is not limited thereby. One of the first branch channel 2161 and the second branch channel 2162 may be configured to be the individual passage not in communication with the accommodating chamber of the motor housing 21, but the other of the first branch channel 2161 and the second branch channel 2162 may be configured to be the space of the accommodating chamber except the motor 22 and the other individual passage. Preferably, the first branch channel 2161 and the second branch channel 2162 are configured to be semi-annular and disposed in the opposite manner to define the cylindrical stereoscopic space in the motor housing 21 for mounting the motor 22. In other words, the first branch channel 2161 and the second branch channel 2162 surround the two sides of the motor 22 to utilize the space effectively and improve the space utilization rate.

According to an embodiment of the present disclosure, the angle that the motor 22 turns from the first oblique position to the first upright position ranges from 1° to 10°. Referring to FIG. 2, when the body 31 is located at the second upright position, the axis of a motor shaft 221 of the motor 22 is disposed obliquely backwards with respect to the axis of the motor housing 21. That is, the motor 22 is at the first oblique position with an angle of 1° to 10° (such as 1°, 6° or 10°). In such a case, two ends of the drive belt 13 are fitted over the brushroll 11 and the motor shaft 221 respectively, but the drive belt 13 is in a loosening state. Referring to FIG. 3, when the body 31 is located at the second oblique position, the axis of the motor 22 extends along the vertical direction. That is, the motor 22 is at the first upright position, in which case the drive belt 13 is tensioned.

When the body 31 is manipulated from the second upright position to the second oblique position at a predetermined angle, the motor 22 may rotate synchronously along with the body 31. When the body 31 rotates to the predetermined angle, the motor 22 rotates from the first oblique position to the first upright position, and the drive belt 13 is tensioned. Afterwards, the body 31 is manipulated freely and the drive belt 13 keeps in the tensioned state to guarantee the normal working of dust sweep and dust suction of the upright vacuum cleaner 1. When the body 31 is manipulated to rotate from the second oblique position to the second upright position, the drive belt 13 is loosened to stop dust sweep and dust suction of the upright vacuum cleaner 1.

Alternatively, according to an embodiment of the present disclosure, the angle that the motor 22 turns from the first oblique position to the first upright position ranges from 3° to 8°. For example, when the upright vacuum cleaner 1 is in an initial state (i.e. the body 31 is at the second upright position), the central axis of the motor 22 inclines backwards by 3° to 8° with respect to the vertical direction (i.e. the up-and-down direction shown in FIG. 2). When the body 31 is pulled backwards manually, within the initial angle range of 3° to 8°, the motor 22 rotates synchronously along with the body 31. When the motor 22 rotates to the first upright position, the body 31 may swing freely within a given angle range to adjust the motion direction of the upright vacuum cleaner 1, and at this moment, the upright vacuum cleaner 1 starts vacuuming. When the body 31 is pulled forwards manually, rotating from the second oblique position with a predetermined angle relative to the vertical direction to the second upright position, the motor 22 rotates from the first upright position to the first oblique position with a predetermined angle, and the drive belt 13 changes from the tensioned state to the loosening state, and at this moment, the upright vacuum cleaner 1 stops vacuuming.

Preferably, according to an embodiment of the present disclosure, the angle that the motor 22 turns from the first oblique position to the first upright position is 5°. Thus, the drive belt 13 is tensioned to a suitable extend, which can guarantee the reliable and stable operation of the system, and avoid accelerating the failure of the drive belt 13 due to excessive tension, so as to extend the service life of the drive belt 13.

The upright vacuum cleaner 1 further includes a tensioning wheel 14 or an elastic member for adjusting the degree of tensioning the drive belt 13. Referring to FIG. 2, the tensioning wheel 14 is disposed at a top wall of the brushroll casing 12 of the upright vacuum cleaner 1, located above the drive belt 13 and disposed adjacent to the brushroll 11 to adjust the degree of tensioning the drive belt 13. Further, the elastic member is disposed on an inner top wall of the brushroll casing 12 and defines two ends connected with the brushroll casing 12 and the tensioning wheel 14 to tension the drive belt 13 by the elastic member and the tensioning wheel 14 according to the practical working conditions, so as to guarantee the reliability of the operation of the system.

Consequently, by disposing the tensioning wheel 14 or the elastic member in the brushroll casing 12, it is possible to adjust the degree of tightness of the drive belt 13 to make the system operate reliably and further stabilize the operation of the drive belt 13 to prevent the drive belt 13 from slipping to guarantee the normal working of the upright vacuum cleaner 1.

In some specific embodiments of the present disclosure, the bridging member 32 and the body 31 are processed individually and connected by assembling. Referring to FIG. 1, a sleeve is disposed in the middle of the bridging member 32, and hence the bridging member 32 is fitted over the body 31 by the sleeve, such that the user may change the direction of the upright vacuum cleaner 1 with easy operations when manipulating the body 31.

In some other specific embodiments of the present disclosure, the bridging member 32 and the body 31 are processed and molded integrally. Thus, the structure formed integrally cannot only guarantee the stability of the structure and performance of the upright vacuum cleaner 1, but also save redundant parts and connecting procedures due to simple molding and manufacturing, so as to improve the assembling efficiency of the upright vacuum cleaner 1 considerably and guarantee the reliability of connecting the bridging member 32 and the body 31. Moreover, this structure has high overall strength and stability and long service life, and is easy to assemble.

The brushroll 11 further includes a first baffle 114 and a second baffle 115. Specifically, the first baffle 114 is disposed between the connecting-shaft section 113 and the first brushroll section 111 to separate the connecting-shaft section 113 from the first brushroll section 111; the second baffle 115 is disposed between the connecting-shaft section 113 and the second brushroll section 112 to separate the connecting-shaft section 113 from the second brushroll section 112.

Figure 49:
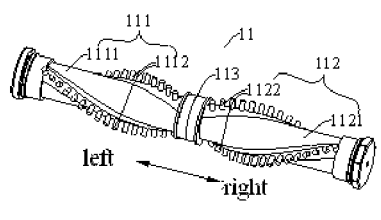
FIG. 49 is a schematic view of a brushroll of an upright vacuum cleaner according to an embodiment of the present disclosure.
Figure 50:
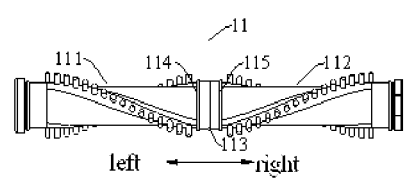
FIG. 50 is a front view of the brushroll of the upright vacuum cleaner of FIG. 49.

Referring to FIG. 49 and FIG. 50, the brushroll 11 mainly includes the first brushroll section 111, the second brushroll section 112, the connecting-shaft section 113, the first baffle 114 and the second baffle 115. The first baffle 114 and the second baffle 115 are disposed at left and right ends of the connecting-shaft section 113. Specifically, the first baffle 114 is disposed between the first brushroll section 111 and the connecting-shaft section 113, and the left side of the first baffle 114 is connected with the right end of the first brushroll section 111, the right side of the first baffle 114 is connected with the left end of the connecting-shaft section 113; the second baffle 115 is disposed between the connecting-shaft section 113 and the second brushroll section 112, and the left side of the second baffle 115 is connected with the right end of the connecting-shaft section 113, the right side of the second baffle 115 connected with the left end of the second brushroll section 112.

Consequently, the first baffle 114 and the second baffle 115 disposed at two ends of the connecting-shaft section 113 may serve for positioning, and prevent the drive belt 13 from slipping off from the connecting-shaft section 113, i.e. prevent the drive belt 13 sliding off to the first brushroll section 111 or the second brushroll section 112, which may affect the operation of the drive belt 13.

Further, the upright vacuum cleaner 1 further includes the brushroll casing 12. Referring to FIG. 9, the brushroll casing 12 is formed as the T shape, and defines the first air-suction channel 1221, the second air-suction channel 1222, and the drive-belt mounting chamber 123. The first brushroll section 111 is rotatably disposed in the first air-suction channel 1221, and the second brushroll section 112 is rotatably disposed in the second air-suction channel 1222, and the drive belt 13 is movably disposed in the drive-belt mounting chamber 123.

The first air-suction channel 1221 and the second air-suction channel 1222 may be spaced apart and disposed at the left and right sides of the drive-belt mounting chamber 123, such that the dirty air and dust sucked through the dust suction port of the brushroll casing 12 are delivered into the first air-suction channel 1221 and the second air-suction channel 1222 respectively, and then mixed together to flow into the dirt cup 37. Specifically, the first air-suction channel 1221 and the second air-suction channel 1222 may be defined by the part disposed in the brushroll casing 12 or by the inner wall of the brushroll casing 12. Of course, the present disclosure is not limited thereby—the first air-suction channel 1221 and the second air-suction channel 1222 may be communicated with each other. That is, the space in the brushroll casing 12 belongs to the first air-suction channel 1221 and the second air-suction channel 1222, except the drive-belt mounting chamber 123, and the dirty air and dust sucked through the dust suction port of the brushroll casing 12 are delivered into the dirt cup 37 via the drive-belt mounting chamber 123.

Therefore, by disposing the first baffle 114 and the second baffle 115 at two ends of the connecting-shaft section 113, it is convenient to dispose a baffle in the brushroll casing 12, such that the brushroll casing 12 may define the first air-suction channel 1221, the second air-suction channel 1222, and the drive-belt mounting chamber 123 spaced apart from each other, to prevent the dust and debris in the first air-suction channel 1221 and the second air-suction channel 1222 from winding upon the drive belt 13 and the motor shaft 221 and to guarantee the stability and reliability of the operation of the drive belt 13 and the motor shaft 221, so as to ensure the normal working of the upright vacuum cleaner 1. Furthermore, the first baffle 114 and the second baffle 115 may guarantee the sealing performance of the drive-belt mounting chamber 123 to prevent the dust from entering the drive-belt mounting chamber 123 and thus affecting the operation of the drive belt 13.

Specifically, according to an embodiment of the present disclosure, the first brushroll section 111 includes a first body 1111 and a first bristle 1112 disposed on the first body 1111; the second brushroll section 112 includes a second body 1121 and a second bristle 1122 disposed on the second body 1121. Referring to FIG. 49, the first body 1111 and the second body 1121 each are configured to be columns extending along the horizontal direction (i.e. the left and right direction shown in FIG. 49), and are disposed co-axially and connected with the left and right ends of the connecting-shaft section 113 respectively. The first bristle 1112 is disposed on a side wall of the first body 1111, and the second bristle 1122 is disposed on a side wall of the second body 1121. Two ends of the drive belt 13 are winded upon the motor shaft 221 of the motor 22 and the connecting-shaft section 113 of the brushroll 11. The motor 22 drives the rotation of the brushroll 11 around its own rotating axis by the drive belt 13, and the first bristle 1112 on the first body 1111 and the second bristle 1122 on the second body 1121 clean the ground along with the rotation of the brushroll 11. Preferably, the first body 1111 and the second body 1121 each are configured to be cylindrical, and the first body 1111 has the same radial size as the second body 1121, and the first bristle 1112 and the second bristle 1122 extend outwards along a radial direction of the first body 1111 and the second body 1121 respectively.

Alternatively, there is a plurality of first bristles 1112, and each first bristle 1112 is spirally winded upon the first body 1111 in the same direction; there is a plurality of second bristles 1122, and each second bristle 1122 is spirally winded upon the second body 1121 in the same direction. Referring to FIG. 49, the plurality of first bristles 1112 are spaced apart and disposed on the side wall of the first body 1111, and each first bristle 1112 is spirally winded upon the side peripheral wall of the first body 1111 in the axial direction of the first body 1111. Advantageously, the plurality of first bristles 1112 are spirally winded upon the first body 1111 in the same direction along the axial direction of the first body 1111. The plurality of second bristles 1122 are spaced apart and disposed on the side wall of the second body 1121, and each second bristle 1122 is spirally winded upon the side peripheral wall of the second body 1121 along the axial direction of the second body 1121. Advantageously, the plurality of second bristles 1122 are winded upon the second body 1121 in the same direction along the axial direction of the second body 1121. The coiling directions of the first bristles 1112 and the second bristles 1122 may be identical or different.

Thus, by disposing the first bristle 1112 on the first body 1111 and disposing the second bristle 1122 on the second body 1121, it is possible to realize the purpose of cleaning dust at two sides of the drive belt 13 simultaneously, which enlarges the dust sweeping area of the upright vacuum cleaner 1. In addition, each first bristle 1112 is spirally winded upon the first body 1111 in the same direction and each second bristle 1122 is spirally winded upon the second body 1121 in the same direction, which may improve the effect of sweeping dust of the brushroll 11 and guarantee the aesthetic outlook of the brushroll 11.

In some specific embodiments of the present disclosure, the coiling directions of the first bristles 1112 and the second bristles 1122 are reverse. Referring to FIG. 49, each first bristle 1112 on the first body 1111 is counterclockwise spirally winded upon the side peripheral wall of the first body 1111 along the axial direction of the first body 1111 from left to right; each second bristle 1122 on the second body 1121 is clockwise spirally winded upon the side peripheral wall of the second body 1121 along the axial direction of the second body 1121 from left to right; and bristles at left and right sides clean the ground from outside to inside to improve the effect of dust sweep. Preferably, the motor 22 drives the brushroll 11 rotating clockwise around its own rotating axis by the drive belt 13, which conforms to the usage habit and is easy to operate.

In some examples of the present disclosure, the second end of the drive belt 13 is fitted over the brushroll 11 and located in the middle part of the brushroll 11. The brushrolles 11 on two sides of the drive belt 13 sweep dust respectively, such that the dust and dirty air are sucked into the first air-suction channel 1221 and the second air-suction channel 1222 from the dust suction port, then into the dirt cup 37 for filtration, and finally the clean air is discharged from the air exhaust hole 213 of the motor housing 21. It shall be noted that the middle part is a relative term, and may refer to a part between the left and right ends of the brushroll 11 rather than be limited to the very central part. Specifically, the middle part may refer to a part between the very central part and the left end, or a part between the very central part and the right end.

Preferably, according to an embodiment of the present disclosure, a first brushroll 11 and a second brushroll 11 are disposed symmetrically with respect to the drive belt 13. That is, the first brushroll section 111 has the same length in the axial direction as the second brushroll section 112. The first brushroll section 111 and the second brushroll section 112 are disposed symmetrically relative to the central part of the connecting-shaft section 113. The second end of the drive belt 13 is winded upon the connecting-shaft section 113, and the first end thereof is winded upon the motor shaft 221 of the motor 22. That is, the drive belt 13 divides the brushroll 11 into the symmetric first brushroll section 111 and second brushroll section 112. Consequently, the first brushroll section 111 and the second brushroll section 112 are subjected to balanced resistance to guarantee the stability of the rotation of the brushroll 11, and the two sides of the drive belt 13 have the same cleaning scope.

According to an embodiment of the present disclosure, the respective central axes of the first brushroll section 111, the second brushroll section 112 and the connecting-shaft section 113 are located in the same line. That is, the first brushroll section 111, the second brushroll section 112 and the connecting-shaft section 113 are disposed co-axially. The motor 22 drives the first brushroll section 111, the second brushroll section 112 and the connecting-shaft section 113 rotating simultaneously, such that the motor 22 of the upright vacuum cleaner 1 may drive the fan, the first brushroll section 111, the second brushroll section 112 and the connecting-shaft section 113 rotating simultaneously, to implement the working mode of dust sweep and dust suction at both sides. Compared with the vacuum cleaner in the related art that realizes control over the rotation of the fan and the brushroll 11 respectively by two motors 22, the upright vacuum cleaner 1 has the simple structure and fewer parts, so it occupies the small space and is easy to assemble and disassemble, which improves the assembling efficiency, and may realize synchronous control over dust sweep and dust suction as well.

Alternatively, according to an embodiment of the present disclosure, the drive belt 13 is a flat, trapezoidal or cylindrical belt. If the drive belt 13 is flat, the flat belt is winded upon the side wall of the connecting-shaft section 113 to make the motor 22 drive the rotation of the brushroll 11. If the drive belt 13 is trapezoidal, a trapezoidal groove matching the trapezoidal belt may be disposed on the side wall of the connecting-shaft section 113, which serve to position and stabilize the drive belt 13, and enlarge the contact area between the drive belt 13 and the connecting-shaft section 113 to increase the friction therebetween to prevent the drive belt 13 from slipping off. If the drive belt 13 is cylindrical, an arc groove matching the cylindrical belt may be disposed on the side wall of the connecting-shaft section 113, to position the drive belt 13 and make the operation of the drive belt 13 stable and reliable. Of course, the drive belt 13 in the present disclosure is not limited to these types, as long as the purpose of transmitting motion and power can be realized.

The rotating axis of the motor 22 and that of the brushroll 11 are disposed in the non-parallel manner. Specifically, as shown in FIG. 11, the rotating axis of the brushroll 11 extends along the horizontal direction (i.e. the left-and-right direction shown in FIG. 11); the rotating axis of the motor 22 and the rotating axis of the brushroll 11 are disposed in the non-parallel manner. For example, the rotating axis of the motor 22 may be disposed along the vertical direction (i.e. the up-and-down direction shown in FIG. 10) or disposed obliquely relative to the vertical direction. The drive belt 13 is disposed between the motor 22 and the brushroll 11 and connected with the motor 22 and the brushroll 11 respectively, such that the motor 22 may realize driving the brushroll 11 by the drive belt 13.

Alternatively, the drive belt 13 is configured to be annular. The first end of the drive belt 13 is winded upon the motor shaft 221 of the motor 22 while a second end of the drive belt 13 is winded upon the brushroll 11. Since the rotating axis of the motor 22 (i.e. the rotating axis of the motor shaft 221 of the motor 22) and the rotating axis of the brushroll 11 are disposed in the non-parallel manner, two ends of the drive belt 13 are twisted. It shall be noted that when the drive belt 13 is configured to be annular, the upper half and the lower half of the drive belt 13 are respectively twisted between the brushroll 11 and the motor shaft 221 for one time, and the twist angles are equal.

In some specific embodiments of the present disclosure, the rotating axis of the brushroll 11 is disposed horizontally, and the rotating axis of the motor 22 is disposed vertically, so as to make the drive belt 13 disposed at the twist angle of 90°. Referring to FIG. 12, the second end of the annular drive belt 13 wraps at least a part of the side wall of the connecting-shaft section 113 of the brushroll 11, and the first end of the annular drive belt 13 wraps at least a part of the side wall of the motor shaft 221 of the motor 22. The surface of the drive belt 13 connected with the brushroll 11 extends axially along the brushroll 11, while the surface of the drive belt 13 connected with the motor shaft 221 of the motor 22 extends axially along the motor shaft 221. The brushroll 11 is disposed in the horizontal plane, and the rotating axis of the brushroll 11 extends along the horizontal direction; the motor 22 is disposed vertically within the motor housing 21 and the motor shaft 221 of the motor 22 is located in a vertical plane perpendicular to the rotating axis of the brushroll 11. That is, the rotating axis of the motor shaft 221 of the motor 22 and the rotating axis of the brushroll 11 are disposed in perpendicular to each other, so the upper half of the drive belt 13 and the lower half thereof are both twisted between the brushroll 11 and the motor shaft 221 for one time, and the twist angle of two ends of each section of the drive belt 13 is 90°.

Two wheels 38 (not shown) are disposed at two sides of the motor housing 21 and rotatably connected with the motor housing 21. Thus, when the user pushes a handle on the body 31, two wheels 38 rotate together, and drive the body assembly 300 and a brushroll assembly 100 moving forwards, so as to save efforts during the dust suction. Alternatively, a rotating axis of the wheel 38 is parallel to the rotating axis of the brushroll 11. For example, in this embodiment, the rotating axes of the two wheels 38 and the rotating axis of the brushroll 11 all extend along the horizontal direction, and the brushroll 11 sweeps the ground when the two wheels 38 roll forwards together, which may guarantee the stable and reliable operation and the aesthetic outlook in accordance with human visual aesthetics. Further, the body assembly 300 includes the body 31 and the bridging member 32 mounted on the body 31. The bridging member 32 includes a top plate 321 and two side plates 322 connected at both sides of the top plate 321. The two side plates 322 are clamped between two side walls of the motor housing 21 and the corresponding wheels 38 respectively and are rotatably connected with the motor housing 21.

Referring to FIG. 5, the body assembly 300 mainly includes the body 31, the bridging member 32 and the dirt cup 37. The dirt cup 37 may be detachably disposed on the body 31 and defines a separating chamber 371 therein, and the separating chamber 371 is communicated with the dirty air outlet 211 and the clean air inlet 212 on the motor housing 21 respectively. Specifically, dirty air and dust are introduced into the brushroll air-suction channel 122 via the dust suction port of the brushroll casing 12, then into the motor air-suction channel 216 in the motor housing 21, and discharged into the separating chamber 371 of the dirt cup 37 via the dirty air outlet 211 on the motor housing 21; clean air through filtration and processing of the dirt cup 37 enters the motor air-exhaust channel within the motor housing 21 via the clean air inlet 212 on the motor housing 21 and is discharged to the outside via the air exhaust hole 213 on the motor housing 21.

The bridging member 32 mainly includes the top plate 321 and two side plates 322, in which the two side plates 322 extend downwards along the vertical direction respectively. Upper ends of the two side plates 322 are fixed and connected with left and right ends of the top plate 321 respectively. When the motor housing 21, the bridging member 32 and the two wheels 38 are assembled, the bridging member 32 and the motor housing 21 are rotatably connected, and the two side plates 322 of the bridging member 32 are located between the wheel 38 at the corresponding position and the side wall of the motor housing 21 respectively. The bridging member 32 is rotatable with respect to the motor housing 21 and the wheels 38.

Therefore, in the upright vacuum cleaner 1 according to the present disclosure, the motor air-suction channel 216 and the motor air-exhaust channel are disposed in the motor housing 21 to facilitate the transmission of dirty air and clean air, which may not only utilize the space in the motor housing 21 effectively to improve the space utilization rate, but also reduce the number of pipes to save the cost and improve the efficiency of assembling or disassembling the upright vacuum cleaner 1 at the same time of guaranteeing the compact structure and aesthetic outlook of the upright vacuum cleaner 1. Additionally, the motor of the upright vacuum cleaner 1 is disposed vertically to reduce the occupation space of the upright vacuum cleaner 1 and facilitate diverse arrangements of various parts of the upright vacuum cleaner 1. In one word, the upright vacuum cleaner 1 has the simple and compact structure and is easy to assemble and disassemble with a high working efficiency.

Figure 53:
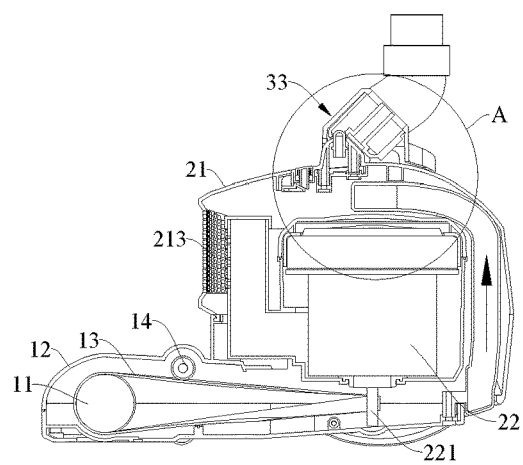
FIG. 53 is an assembly drawing of a motor assembly and a brushroll assembly of an upright vacuum cleaner according to an embodiment of the present disclosure.
Figure 54:
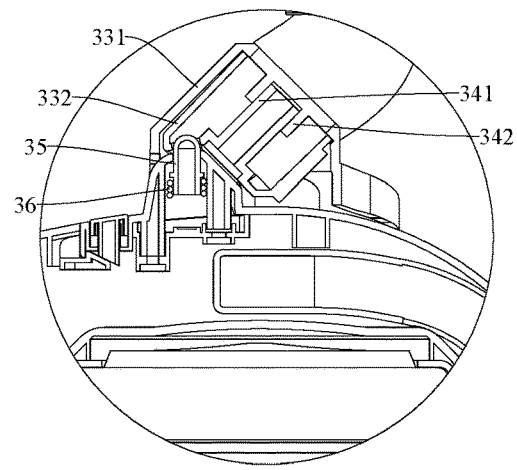
FIG. 54 is an enlarged view of part A of FIG. 53.

According to an embodiment of the present disclosure, the body 31 and the bridging member 32 are connected with each other by a connecting pipe assembly 33. Referring to FIG. 53 and FIG. 54, the motor 22 is disposed below the body 31 and the motor housing 21 is connected with the lower end of the body 31. The bridging member 32 is rotatably connected with the motor housing 21, and the top plate 321 of the bridging member 32 is connected with the lower end of the body 31 by the connecting pipe assembly 33.

Alternatively, the connecting pipe assembly 33 includes a first connecting pipe 331 and a second connecting pipe 332. Specifically, the first connecting pipe 331 is disposed on the top plate 321 of the bridging member 32 while the second connecting pipe 332 is disposed on the lower end of the body 31, in which the first connecting pipe 331 is fitted over the second connecting pipe 332.

That is, the connecting pipe assembly 33 mainly includes the first connecting pipe 331 and the second connecting pipe 332, in which the first connecting pipe 331 is connected with the top plate 321 of the bridging member 32; the second connecting pipe 332 is connected with the lower end of the body 31; the second connecting pipe 332 is inserted into the first connecting pipe 331 and is detachably connected with the first connecting pipe 331.

Further, the body 31 and the bridging member 32 are positioned and cooperated with each other by a positioning assembly 34, so as to guarantee mounting the first connecting pipe 331 and the second connecting pipe 332 accurately by positioning. Alternatively, according to an embodiment of the present disclosure, the positioning assembly 34 includes a first positioning piece 341 and a second positioning piece 342. Specifically, the first positioning piece 341 is disposed on the top plate 321 of the bridging member 32, and the second positioning piece 342 is disposed on the lower end of the body 31. One of the first positioning piece 341 and the second positioning piece 342 is a positioning column, and the other is a positioning cartridge.

In other words, the positioning assembly 34 mainly includes the first positioning piece 341 and the second positioning piece 342. Referring to FIG. 54, the first positioning piece 341 is disposed within the first connecting pipe 331 and is configured as the positioning column that extends axially along the first connecting pipe 331; the second positioning piece 342 is disposed on the lower end of the body 31 and is configured as the positioning cartridge cooperating with the positioning column; after the first connecting pipe 331 and the second connecting pipe 332 are assembled, the positioning column is inserted in the positioning cartridge. Thus, it is possible to mount the first connecting pipe 331 and the second connecting pipe 332 accurately.

The upright vacuum cleaner 1 further includes a limiting column 35 that is disposed on the motor housing 21 movably in the up-and-down direction. When the body 31 is at the upright position, the limiting column 35 is inserted into the bridging member 32 to limit and cooperate with the bridging member 32. When the body 31 moves from the upright position to the oblique position, the limiting column 35 is detached from the bridging member 32.

Referring to FIG. 54, the limiting column 35 is disposed on the top of the motor housing 21 and is movable in the up-and-down direction. When the upright vacuum cleaner 1 is in the working state, i.e. the body 31 is at the second oblique position, the limiting column 35 is located outside of the connecting pipe assembly 33, and abuts against with the external wall of the connecting pipe assembly 33 to guarantee the body 31 remaining the oblique state during work, such that the motor 22 may drive the rotation of the brushroll 11 to improve the reliability and continuity of the operation of the upright vacuum cleaner 1. When the upright vacuum cleaner 1 is in the non-working state, i.e. the body 31 at the second upright position, the limiting column 35 is inserted into the connecting pipe assembly 33 to guarantee the body 31 remaining the upright state when the body 31 is unused. Thus, the limiting column 35 disposed on the motor housing 21 may serve for limiting positions with a simple, stable and reliable structure which occupies small space.

The upright vacuum cleaner 1 further includes the elastic member 36 that is connected between the limiting column 35 and the motor housing 21 to make the limiting column 35 move up and down. Therefore, the elastic member 36 disposed on the limiting column 35 may serve as a cushion to avoid collision during the rotation of the body 31, so as to guarantee the stability and reliability of the swing of the body 31.

As shown in FIG. 53, in this embodiment, the top plate 321 of the bridging member 32 is provided with the first connecting pipe 331 that is internally provided with the positioning column; the lower end of the body 31 is provided with the second connecting pipe 332 that is internally provided with the positioning cartridge. After the second connecting pipe 332 is inserted into the first connecting pipe 331, the positioning cartridge is fitted over the positioning column.

Specifically, the first connecting pipe 331 is connected with the top plate 321 of the bridging member 32 and is internally provided with the first positioning piece 341 that is configured as the positioning column that extends axially along the first connecting pipe 331; the second connecting pipe 332 is connected with the lower end of the body 31 and is internally provided with the second positioning piece 342 that configured as the positioning cartridge cooperating with the positioning column. After the first connecting pipe 331 and the second connecting pipe 332 are assembled, the positioning column is inserted into the positioning cartridge, so as to mount the bridging member 32 and the body 31 accurately and guarantee the reliability of the connection therebetween.

Further, the motor housing 21 is provided with the limiting column 35 movable in the up-and-down direction. When the body 31 is in the upright state, the limiting column 35 passes through a bottom wall of a support sleeve and is inserted into the support sleeve to cooperate with the support sleeve for limitation. When the body 31 moves from the upright state to the oblique state, the limiting column 35 is detached from the support sleeve. Thus, it is convenient to mount the bridging member 32 and the motor housing 21, further to improve the reliability and accuracy of the connection therebetween.

According to an embodiment of the present disclosure, the air exhaust hole 213, a dirty air output pipe 214 and a clean air input pipe 215 are disposed on the motor housing 21; the motor air-suction channel 216 and the motor air-exhaust channel are disposed in the motor housing 21. The motor air-suction channel 216 is communicated between the dust suction port and the dirty air output pipe 214, while the motor air-exhaust channel is communicated between the clean air input pipe 215 and the air exhaust hole 213.

Figure 7:
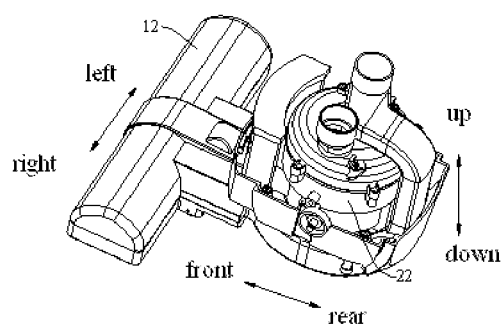
FIG. 7 is an assembly drawing of a brushroll assembly and a motor assembly of an upright vacuum cleaner according to an embodiment of the present disclosure.
Figure 8:
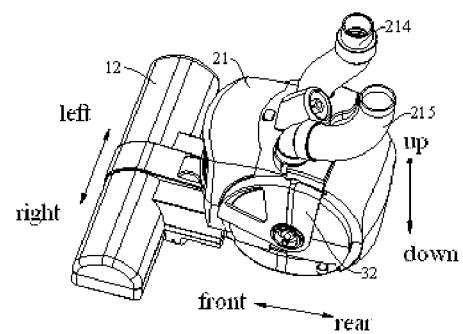
FIG. 8 is an assembly drawing of a brushroll assembly and a motor assembly of an upright vacuum cleaner according to another embodiment of the present disclosure.

Referring to FIG. 7 to FIG. 9, the motor housing 21 is provided with the dirty air output pipe 214 communicated with the dirty air outlet 211 and the clean air input pipe 215 communicated with the clean air inlet 212 on the top. That is, the dirty air output pipe 214 is communicated with the motor air-suction channel 216, and the clean air input pipe 215 is communicated with the motor air-exhaust channel. The air exhaust hole 213 communicated with the motor air-exhaust channel is disposed at the front side of the motor housing 21. Specifically, the dirty air and dust are introduced into the brushroll air-suction channel 122 via the dust suction port of the brushroll casing 12, then into a motor air-suction channel 216 in the motor housing 21, and discharged into the body assembly 300 via the dirty air output pipe 214 on the motor housing 21; clean air obtained by filtration of the body assembly 300 enters the motor air-exhaust channel within the motor housing 21 via the clean air input pipe 215 of the motor housing 21 and then is discharged to the outside via the air exhaust hole 213 on the motor housing 21.

Further, the bridging member 32 is provided with a first clearance groove 3211 for avoiding the dirty air output pipe 214 and a second clearance groove 3212 for avoiding the clean air input pipe 215. Referring to FIG. 55, the top plate 321 of the bridging member 32 is provided with the first clearance groove 3211 and the second clearance groove 3212 spaced apart and disposed along the left-and-right direction. When the body 31 is in the upright state, the dirty air output pipe 214 on the motor housing 21 is clamped in the first clearance groove 3211 of the bridging member 32, while the clean air input pipe 215 on the motor housing 21 is clamped in the second clearance groove 3212 of the bridging member 32. When the body 31 moves from the upright state to the oblique state, the bridging member 32 rotates with respect to the motor housing 21, so the dirty air output pipe 214 and the clean air input pipe 215 of the motor housing 21 are detached from the bridging member 32.

Preferably, the first clearance groove 3211 and the second clearance groove 3212 each are configured as semi-circular grooves. Thus, the first clearance groove 3211 and the second clearance groove 3212 cooperate with the respective side walls of the dirty air output pipe 214 and the clean air input pipe 215, to guarantee the compact structure and the aesthetic outlook.

Alternatively, the first clearance groove 3211 and the second clearance groove 3212 are symmetrically disposed along the longitudinal central axis. That is the dirty air output pipe 214 and the clean air input pipe 215 are spaced apart at left and right sides of the central line of the motor housing 21, and symmetrically disposed relative to the central line of the motor housing 21, which creates an aesthetic outlook in accordance with the human visual aesthetics with the reasonable arrangement, and facilitates diverse arrangements of various parts of the upright vacuum cleaner 1.

In some specific embodiments of the present disclosure, the dirty air outlet 211 is connected with the air inlet 372 of the dirt cup 37 via a directional control valve 600. The directional control valve 600 includes a first air hole 631, a second air hole 632 and a third air hole 633. The first air hole 631 is communicated with the brushroll air-suction channel 122; the second air hole 632 is connected with the air inlet 372 of the dirt cup 37; the third air hole 633 is communicated with the outside. The directional control valve 600 is configured to switch between a first state of communicating the first air hole 631 and the second air hole 632 and a second state of communicating the second air hole 632 and the third air hole 633.

Alternatively, the directional control valve 600 is detachably connected with the dirt cup 37 and the motor housing 21. The directional control valve 600 defines an airflow channel therein, and includes the first air hole 631, the second air hole 632 and the third air hole 633 communicated with the airflow channel respectively. The first air hole 631 of the directional control valve 600 is communicated with the brushroll air-suction channel 122 by the motor housing 21, the second air hole 632 thereof communicated with the dirt cup 37 and the third air hole 633 thereof communicated with the outside environment.

Figure 51:
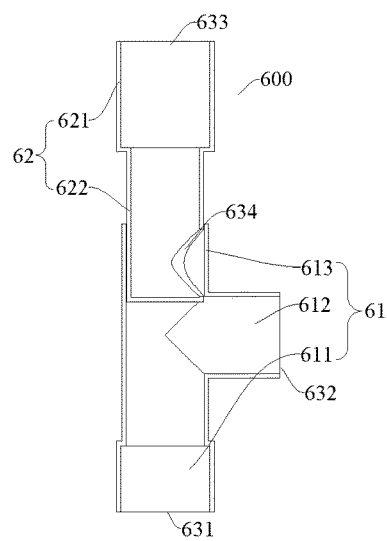
FIG. 51 is a schematic view of a directional control valve of an upright vacuum cleaner in a working state according to an embodiment of the present disclosure.
Figure 52:
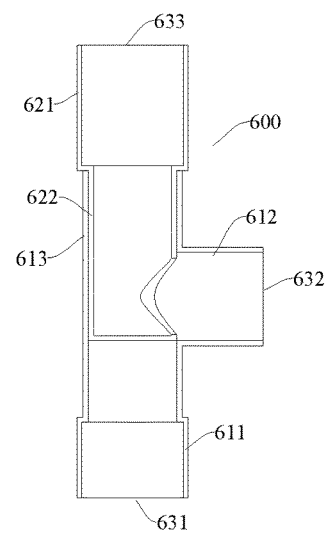
FIG. 52 is a schematic view of a directional control valve of an upright vacuum cleaner in another working state according to an embodiment of the present disclosure.

Referring to FIGS. 51 and 52, the directional control valve 600 may switch between two working conditions. When the directional control valve 600 is in the first state, the first air hole 631 of the directional control valve 600 is communicated with the second air hole 632. That is, the brushroll air-suction channel 122 is communicated with the dirt cup 37, such that the dirty air and dust sucked through the dust suction port of the brushroll casing 12 sequentially pass through the brushroll air-suction channel 122, the first air hole 631, the airflow channel of the directional control valve 600 and the second air hole 632, and then enter the dirt cup 37 for filtration. Finally the clean air obtained is discharged to the outside. When the directional control valve 600 is in the second state, the second air hole 632 is communicated with the third air hole 633. That is, the dirt cup 37 is communicated with the outside. Further, the third air hole 633 of the directional control valve 600 may be communicated with an external pipe to implement dust suction directly through the external pipe without using the brushroll 11. The dirty air and dust from the external pipe sequentially pass through the third air hole 633 of the directional control valve 600, the airflow channel of the directional control valve 600 and the second air hole 632, and then enter the dirt cup 37 for filtration. Finally the clean air obtained is discharged to the outside.

Consequently, the upright vacuum cleaner 1 according to the embodiments of the present disclosure may realize a switch between different dust suction modes by disposing the directional control valve 600 on the upright vacuum cleaner 1. The user may choose the suitable dust suction mode according to the specific working condition to improve the working efficiency of the upright vacuum cleaner 1 with simple operations and great user experience. Additionally, the motor of the upright vacuum cleaner 1 is vertically disposed to reduce the occupation space of the upright vacuum cleaner 1 and facilitate diverse arrangements of various parts of the upright vacuum cleaner 1, and is easy to assemble and disassemble due to the simple and compact structure.

Alternatively, according to an embodiment of the present disclosure, the directional control valve 600 includes a three-way pipe 61 and a two-way pipe 62. Specifically, the three-way pipe 61 includes a first pipe section 611, a second pipe section 612 and a third pipe section 613 communicated with each other. The first air hole 631 is defined by a free end of the first pipe section 611, and the second air hole 632 is defined by a free end of the second pipe section 612. The two-way pipe 62 includes a fourth pipe section 621 and a fifth pipe section 622 communicated with each other. The third air hole 633 is defined by a free end of the fourth pipe section 621 and a fourth air hole 634 is defined by a free end of the fifth pipe section 622, in which at least a part of the fifth pipe section 622 is inserted into the third pipe section 613 and is movable between a first position where the first air hole 631 is communicated with the second air hole 632 and a second position where the fourth air hole 634 is communicated with the second air hole 632.

In other words, the directional control valve 600 mainly includes the three-way pipe 61 and the two-way pipe 62. The three-way pipe 61 is mainly constituted by the first pipe section 611, the second pipe section 612 and the third pipe section 613. A first end of the first pipe section 611, a first end of the second pipe section 612 and a first end of the third pipe section 613 are communicated with each other. A second end of the first pipe section 611 is provided with the first air hole 631, a second end of the second pipe section 612 is provided with the second air hole 632. The two-way pipe 62 is mainly constituted by the fourth pipe section 621 and the fifth pipe section 622, in which a first end of the fourth pipe section 621 is connected with a first end of the fifth pipe section 622 and a second end of the fourth pipe section 621 is provided with the third air hole 633; a second end of the fifth pipe section 622 is provided with the fourth air hole 634.

Further, the second end of the fifth pipe section 622 is movably disposed in the third pipe section 613 of the three-way pipe 61. When the two-way pipe 62 is at the first position (i.e. the position shown in FIG. 51), the first air hole 631 of the three-way pipe 61 is only communicated with the second air hole 632, such that the dirty air and dust sucked through the dust suction port of the brushroll casing 12 enter the dirt cup 37 for filtration sequentially through the brushroll air-suction channel 122, the first air hole 631 and the second air hole 632 of the three-way pipe 61. Finally the clean air obtained is discharged to the outside.

When the two-way pipe 62 is at the second position (i.e. the position shown in FIG. 52), the fourth air hole 634 of the two-way pipe 62 is communicated with the second air hole 632 of the three-way pipe 61. Further, the third air hole 633 of the fourth pipe section 621 may be communicated with the external pipe, then to implement dust suction directly through the external pipe without using the brushroll 11. The dirty air and dust from the external pipe sequentially pass through the third air hole 633 of the two-way pipe 62 and the second air hole 632 of the three-way pipe 61 and enter the dirt cup 37 for filtration. Finally the clean air obtained is discharged to the outside.

Consequently, since the detachable two-way pipe 62 and three-way pipe 61 are disposed between the dirt cup 37 and the motor housing 21, and the two-way pipe 62 may switch between the first position and the second position, it is possible to switch between the two working states of the directional control valve 600, so as to realize two different dust suction modes of the upright vacuum cleaner 1 that has the simple structure and is easy to assemble, disassemble and operate.

According to an embodiment of the present disclosure, the first end of the fifth pipe section 622 is connected with the fourth pipe section 621, and an end wall of the second end of the fifth pipe section 622 is enclosed, the fourth air hole 634 formed in a side wall of the second end of the fifth pipe section 622. Referring to FIG. 51, the fourth pipe section 621 is configured as a straight pipe section with two ends thereof communicated, and the fifth pipe section 622 may be configured as a straight pipe section, as well. The first end of the fifth pipe section 622 is communicated with the fourth pipe section 621, and the second end of the fifth pipe section 622 is enclosed; the fourth air hole 634 communicated with the first end of the fifth pipe section 622 is disposed in the side wall of the second end of the fifth pipe section 622.

When the fifth pipe section 622 is inserted in the third pipe section 613 of the three-way pipe 61, the fifth pipe section 622 may move reciprocally along the length direction of the third pipe section 613. If the two-way pipe 62 is in the first position, the second end of the fifth pipe section 622 seals the end of the third pipe section 613, while the side wall of the third pipe section 613 blocks the fourth air hole 634 of the fifth pipe section 622, so as to communicate the first air hole 631 with the second air hole 632 alone, i.e. realizing the first state of the directional control valve 600. If the two-way pipe 62 is in the second position, the second end of the fifth pipe section 622 seals the first air hole 631 of the first pipe section 611, while the second air hole 632 of the second pipe section 612 is communicated with the fourth air hole 634 of the fifth pipe section 622, so as to communicate the third air hole 633 of the fourth pipe section 621 with the second air hole 632 of the second pipe section 612, i.e. realizing the second state of the directional control valve 600.

Therefore, the fifth pipe section 622 has a structure where the first end is communicated while the second end is sealed, and is provided with the fourth air hole 634 in the side wall of the second end, so it is achievable to switch between two communication states of the directional control valve 600, so as to realize two different dust suction modes of the upright vacuum cleaner 1 that has the simple structure and is easy to assemble, disassemble and operate.

Further, when the two-way pipe 62 moves to the second position, the end of the fourth pipe section 621 communicated with the fifth pipe section 622 abuts against the free end of the third pipe section 613. Referring to FIG. 52, the fourth pipe section 621 has an external diameter greater than the fifth pipe section 622 to form a boss between the fourth pipe section 621 and the fifth pipe section 622. When the two-way pipe 62 is at the second position, the boss between the fourth pipe section 621 and the fifth pipe section 622 abuts against and is connected with the end of the third pipe section 613. Consequently, the boss formed between the fourth pipe section 621 and the fifth pipe section 622 may serve for positioning and guarantee the communication between the fourth air hole 634 of the fifth pipe section 622 and the second air hole 632 of the second pipe section 612, so as to communicate the second air hole 632 with the third air hole 633, which is easy to manufacture and process due to the simple structure, and may realize accurate positioning.

Further, the first air hole 631 is connected to the dirty air outlet 211, and the air outlet 373 of the dirt cup 37 is communicated with the clean air inlet 212. That is, when the two-way pipe 62 is at the first position (i.e. the position shown in FIG. 51), the first air hole 631 of the three-way pipe 61 is communicated with the second air hole 632 alone, such that the dirty air and dust sucked through the dust suction port of the brushroll casing 12 sequentially pass through the brushroll air-suction channel 122, the motor air-suction channel 216 of the motor housing 21, the dirty air outlet 211 of the motor housing 21, the first air hole 631 and the second air hole 632 of the three-way pipe 61 to enter the dirt cup 37 for filtration. Finally the clean air obtained is discharged to the motor air-exhaust channel of the motor housing 21 from the air outlet 373 of the dirt cup 37, and then discharged from the air exhaust hole 213 of the motor housing 21.

Consequently, by disposing the motor air-suction channel 216 and the motor air-exhaust channel in the motor housing 21, it is convenient to transmit the dirty air and the clean air, which may not only utilize the space in the motor housing 21 effectively to improve the space utilization rate, but also reduce the number of pipes to guarantee the compact structure and the aesthetic outlook of the upright vacuum cleaner 1.

The clutching device 400 of the upright vacuum cleaner 1 according to a plurality of embodiments of the present disclosure will be described with reference to FIG. 14 to FIG. 48.

Embodiment 1

Figure 15:
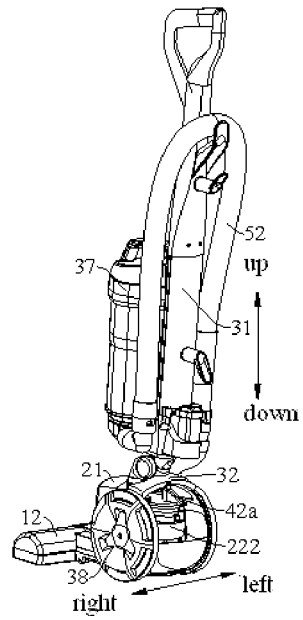
FIG. 15 is a partial assembly drawing of the upright vacuum cleaner of FIG. 14.

As shown from FIG. 14 to FIG. 20, the clutching device 400 of the upright vacuum cleaner 1 according to embodiments of the present disclosure is disposed between the motor assembly 200 and the body assembly 300 of the upright vacuum cleaner 1. The motor assembly 200 includes the motor housing 21 and the motor 22 disposed in the motor housing 21. Referring to FIG. 14 and FIG. 15, the motor assembly 200 mainly includes the motor 22 and the motor housing 21. The motor housing 21 defines the accommodating chamber for mounting the motor 22 that is movably disposed in the accommodating chamber and may pivot relative to the motor housing 21. The motor 22 may drive the rotation of the fan to generate the dust suction flow to provide the vacuuming power for the upright vacuum cleaner 1. The motor 22 may further drive the brushroll 11 rotating around its own axis to achieve the purpose of cleaning the ground. Specifically, the drive belt 13 is disposed between the motor 22 and the brushroll 11 and is connected with the motor 22 and the brushroll 11 respectively. The motor 22 drives the brushroll 11 by the drive belt 13.

The body assembly 300 includes the body 31 and the bridging member 32 mounted on the body 31, in which the bridging member 32 is rotatably connected with the motor housing 21. Referring to FIG. 14, the body assembly 300 mainly includes the body 31 and the bridging member 32. The body 31 is arranged along the vertical direction, and the bridging member 32 is disposed below the body 31 and connected with the lower end of the body 31. The bridging member 32 is mounted on the motor housing 21 and may pivot relative to the motor housing 21. When the handle of the body 31 is manipulated, for example, moving the body 31 from the second upright position to the second oblique position, the bridging member 32 rotates with respect to the motor housing 21 to push the motor 22 from the first oblique position to the first upright position.

Further, the clutching device 400 includes a slide chute 41a and a triggering member 42a. The slide chute 41a is formed in the bridging member 32, and the triggering member 42a is rotatably supported on the motor housing 21 and defines a first end with a sliding column 4211a slidably cooperating with the slide chute 41a and a second end having a toggling rod 4221a adapted for stirring the movement of the motor 22. When the bridging member 32 drives the movement of the slide chute 41a, the sliding column 4211a slides along the slide chute 41a to make the triggering member 42a rotate; and the toggling rod 4221a stirs the rotation of the motor 22 relative to the motor housing 21 when the triggering member 42a rotates.

Referring to FIG. 16 to FIG. 19, the clutching device 400 mainly includes the slide chute 41a and the triggering member 42a. The slide chute 41a is disposed at a side of the bridging member 32 opposite to the motor housing 21, and the triggering member 42a is rotatably supported on the motor housing 21. The first end of the triggering member 42a cooperates with the slide chute 41a of the bridging member 32, and the second end thereof passes through the motor housing 21 and cooperates with the motor casing 222 of the motor 22.

Specifically, the sliding column 4211a is disposed on the first end of the triggering member 42a, such that the triggering member 42a cooperates with the slide chute 41a of the bridging member 32 by the sliding column 4211a; the toggling rod 4221a is disposed on the second end of the triggering member 42a, such that the triggering member 42a cooperates with the motor casing 222 by the toggling rod 4221a. Specifically, when the body is manually turned from the second upright position to the second oblique position, the bridging member 32 on the motor housing 21 rotates with respect to the motor housing 21 and the bridging member 32 drives the rotation of the triggering member 42a with respect to the motor housing 21. The toggling rod 4221a on the second end of the triggering member 42a makes the motor 22 to rotate from the first oblique position to the first upright position. In this process, the lower end of the motor shaft 221 moves backwards gradually, so as to increase the distance between the lower end of the motor shaft 221 and the brushroll 11, so as to tension the drive belt 13 to implement the operations of dust sweep and dust suction.

Consequently, the clutching device 400 of the upright vacuum cleaner 1 according to embodiments of the present disclosure has a simple structure and is easy to manufacture and process. Since the triggering member 42a of the clutching device 400 is rotatably disposed on the motor housing 21, and two ends of the triggering member 42a cooperate with the bridging member 32 and the motor 22 respectively, it is possible to make the motor 22 to rotate, so as to adjust the degree of tightness of the drive belt 13 to guarantee the normal working of dust sweep and dust suction. Moreover, it is easy to assemble or disassemble the clutching device 400 that guarantees the stable and reliable operation with a high working efficiency.

According to an embodiment of the present disclosure, the triggering member 42a includes a first triggering part 421a, a second triggering part 422a and a pivot section 423a. Specifically, the sliding column 4211a is formed on the first triggering part 421a; the toggling rod 4221a is formed on the second triggering part 422a; the pivot section 423a is connected between the first triggering part 421a and the second triggering part 422a, and rotatably passes through the motor housing 21. That is, the triggering member 42a mainly includes the first triggering part 421a, the second triggering part 422a and the pivot section 423a. The two ends of the pivot section 423a are connected with the first triggering part 421a and the second triggering part 422a respectively. A free end of the first triggering part 421a is provided with the sliding column 4211a in cooperation with the bridging member 32, and a free end of the second triggering part 422a is provided with the toggling rod 4221a in cooperation with the motor casing 222.

Figure 18:
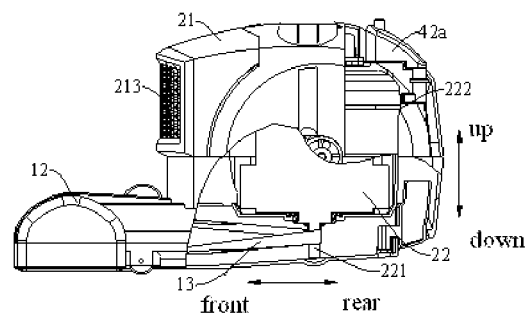
FIG. 18 is a side view of the structure shown in FIG. 16.

Referring to FIG. 18, the triggering member 42a is rotatably disposed on the top wall of the motor housing 21. Specifically, the pivot section 423a passes through the top wall of the motor housing 21; the first triggering part 421a is connected with an upper end of the pivot section 423a and located above the top wall of the motor housing 21, while the second triggering part 422a is connected with a lower end of the pivot section 423a and located below the top wall of the motor housing 21. When the body 31 is turned manually from the second upright position to the second oblique position, the bridging member 32 on the motor housing 21 rotates clockwise relative to the motor housing 21 and drives the sliding column 4211a of the triggering member 42a sliding in the slide chute 41a to make the triggering member 42a rotate around its rotating axis. Then the toggling rod 4221a stirs the rotation of the motor 22 from the first oblique position to the first upright position. In this process, the lower end of the motor shaft 221 moves backwards gradually, which increases the distance between the lower end of the motor shaft 221 and the brushroll 11, so as to tension the drive belt 13 to implement the operations of dust sweep and dust suction.

In some specific embodiments of the present disclosure, the pivot section 423a is disposed vertically, and the first triggering part 421a is disposed perpendicular to the pivot section 423a. The vertical height of the first triggering part 421a is decreased gradually along a direction from a first end of the first triggering part 421 adjacent to the sliding column 4211a to a second end thereof adjacent to the pivot section 423a. Specifically, the pivot section 423a is configured as a column extending along the vertical direction (i.e. the up-and-down direction shown in FIG. 18). The second end of the first triggering part 421a is connected with the upper end of the pivot section 423a, and the first end thereof extends along a direction perpendicular to the axis of the pivot section 423a. The first end of the second triggering part 422a is connected with the lower end of the pivot section 423a, and the second end thereof extends along a direction perpendicular to the axis of the pivot section 423a. The first triggering part 421a and the second triggering part 422a may rotate around the central axis of the pivot section 423a, i.e. rotatable in the horizontal plane respectively. Further, the sliding column 4211a is disposed at the free end of the first triggering part 421a and extends along the vertical direction; the vertical height of the first triggering part 421a is increased gradually along a direction from the central axis of the pivot section 423a to the central axis of the sliding column 4211a.

Figure 20:
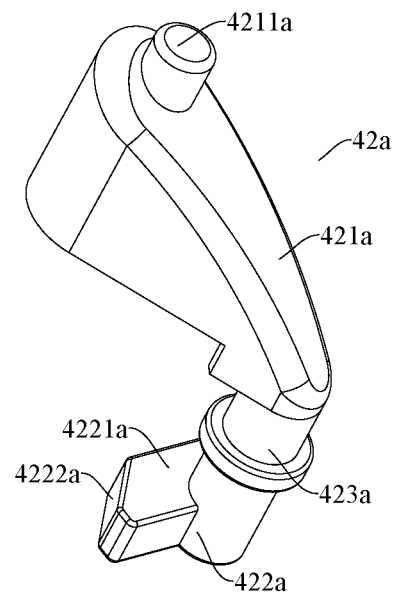
FIG. 20 is a schematic view of a triggering member of an upright vacuum cleaner according to an embodiment of the present disclosure.

As shown in FIG. 20, an upper surface of the first triggering part 421a is configured as an arc surface corresponding to the shape of the bridging member 32. Thus, it is possible to avoid the top wall of the bridging member 32 by configuring the upper surface of the first triggering part 421a as the arc surface, which may guarantee the compact structure, and avoid collision between the upper surface of the first triggering part 421a and the top wall of the bridging member 32 to guarantee continuity and reliability of transmitting motion and power.

According to an embodiment of the present disclosure, the motor housing 21 is formed with an accommodating space for accommodating the first triggering part 421a and for rotation of the first triggering part 421a. Referring to FIG. 14, the top wall of the motor housing 21 is provided with the accommodating space for mounting the first triggering part 421a; the pivot section 423a of the triggering member 42a is rotatably connected with the bottom wall of the accommodating space; and the first triggering part 421a of the triggering member 42a may rotate in the accommodating space. Hence, the operation of the triggering member 42a may be benefitted by disposing the accommodating space for accommodating the first triggering part 421a on the motor housing 21.

In addition, the first triggering part 421a and the pivot section 423a are detachably connected. In the process of assembling the clutching device 400 with the body assembly 300 and the motor assembly 200, the second triggering part 422a and the pivot section 423a of the triggering member 42a may be mounted in the motor housing 21 first, and make the second triggering part 422a cooperate with the motor casing 222; then the first triggering part 421a is connected with the pivot section 423a from the outside of the motor housing 21 to realize the assembling of the triggering member 42a and the motor housing 21. Therefore, since the first triggering part 421a and the pivot section 423a are detachably connected, it is convenient to assemble or disassemble the triggering member 42a and the motor housing 21 due to the simple structure, which is easy to manufacture and process.

Alternatively, the pivot section 423a is disposed vertically; the first triggering part 421a and the toggling rod 4221a are disposed in perpendicular to the pivot section 423a respectively, in which an angle between an extension direction of length of the toggling rod 4221a and an extension direction of length of the first triggering part 421a ranges from 0° to 90°. Thus, it is possible to realize the purpose that the bridging member 32 drives the rotation of the triggering member 42*a*, while the triggering member 42*a* realizes the rotation of the motor 22, and to guarantee continuity and reliability of transmitting motion and power. Further, the toggling rod 4221*a* includes an oblique surface 4222*a* for pushing the motor casing 222 at an end of the toggling rod 4221*a*, which facilitates pushing the motor 22 by the toggling rod 4221*a*.

Figure 19:
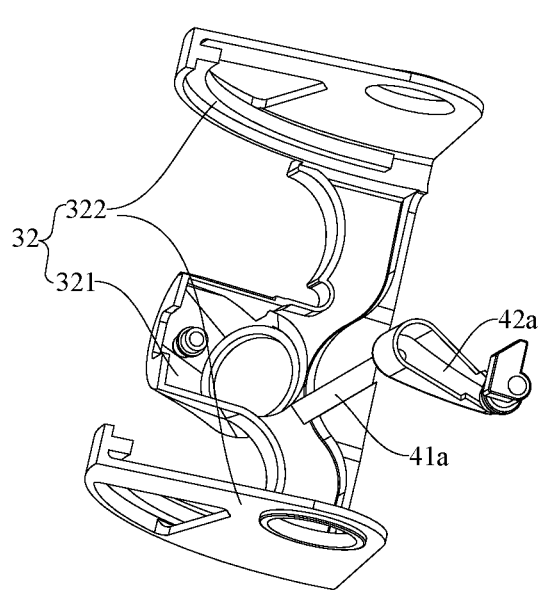
FIG. 19 is an assembly drawing of a bridging member and a triggering member of an upright vacuum cleaner according to an embodiment of the present disclosure.

Alternatively, according to an embodiment of the present disclosure, the slide chute 41*a* is linear and extends obliquely with respect to the front-and-rear direction. Referring to FIG. 19, an internal surface of the top plate 321 of the bridging member 32 is provided with a linear slide chute 41*a* disposed obliquely with respect to the symmetric axis of the bridging member 32. When the bridging member 32 rotates, the linear slide chute 41*a* of the bridging member 32 cooperates with the sliding column 4211*a* of the triggering member 42*a*, such that the bridging member 32 drives the rotation of the triggering member 42*a* around its rotating axis and then the toggling rod 4221*a* makes the motor 22 to rotate from the first oblique position to the first upright position. In some specific embodiments of the present disclosure, the triggering member 42*a* is rotatably supported on the longitudinal central line of the motor housing 21 to guarantee sufficient space for rotation of the triggering member 42*a*, so as to improve the driving power to stir the motor 22.

Embodiment 2

As shown in FIGS. 21 to 28, the upright vacuum cleaner 1 according to embodiments of the present disclosure includes the brushroll 11, the motor assembly 200, the body assembly 300 and a lever cam member 41*b*. Specifically, the motor assembly 200 includes the motor housing 21 and the motor 22 disposed in the motor housing 21. The motor 22 drives the brushroll 11 rolling by the drive belt 13 and is rotatable between the first upright position of tensioning the drive belt 13 and the first oblique position of loosening the drive belt 13.

Figure 21:
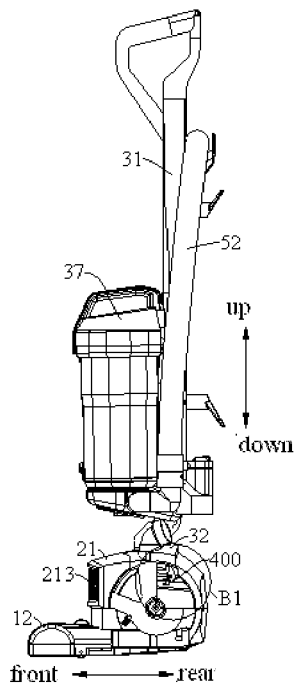
FIG. 21 is a schematic view of an upright vacuum cleaner when a body is located at a second upright position according to an embodiment of the present disclosure.

In other words, the upright vacuum cleaner 1 mainly includes the brushroll 11, the motor assembly 200, the body assembly 300 and the lever cam member 41*b*, in which the motor assembly 200 is connected with the brushroll 11, the body assembly 300 and the lever cam member 41*b* respectively. Referring to FIG. 21, the motor assembly 200 mainly includes the motor 22 and the motor housing 21. The motor housing 21 defines the accommodating chamber for mounting the motor 22 that is movably disposed in the accommodating chamber and may pivot relative to the motor housing 21. The motor 22 may drive the rotation of the fan to generate the dust suction flow to provide the vacuuming power for the upright vacuum cleaner 1. The motor 22 may further drive the brushroll 11 rotating around its own axis to achieve the purpose of cleaning the ground. Specifically, the drive belt 13 is disposed between the motor 22 and the brushroll 11 and is connected with the motor 22 and the brushroll 11 respectively. The motor 22 drives the brushroll 11 by the drive belt 13.

The body assembly 300 includes the body 31 and the bridging member 32 mounted on the body 31, in which the bridging member 32 is rotatably connected with the motor housing 21 to make the body 31 rotatable between the second upright position and the second oblique position. Referring to FIG. 21, the body assembly 300 mainly includes the body 31 and the bridging member 32. The body 31 is arranged along the vertical direction, and the bridging member 32 is disposed below the body 31 and connected with the lower end of the body 31. The bridging member 32 is mounted on the motor housing 21 and may pivot relative to the motor housing 21. When the handle of the body 31 is manipulated, for example, moving the body 31 from the second upright position to the second oblique position, the bridging member 32 rotates with respect to the motor housing 21 to push the motor 22 from the first oblique position to the first upright position.

Figure 23:
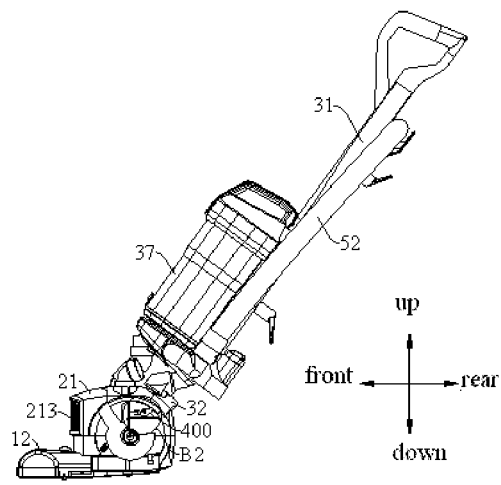
FIG. 23 is a schematic view of the upright vacuum cleaner of FIG. 21 when the body is located at a second oblique position.

Further, the lever cam member 41*b* is rotatably disposed on the motor housing 21 and two ends of the lever cam member 41*b* cooperate with the bridging member 32 and the motor 22 respectively. When the body 31 moves from the second upright position to the second oblique position, the bridging member 32 makes the motor 22 to move from the first oblique position to the first upright position by the lever cam member 41*b*. Referring to FIG. 21 and FIG. 23, the lever cam member 41*b* is connected with the bridging member 32 and the motor casing 222 of the motor 22 respectively. When the body 31 is located at the second upright position, the axis of the motor shaft 221 of the motor 22 is disposed obliquely backwards with respect to the axis of the motor housing 21. That is, the motor 22 is at the first oblique position. In such a case, two ends of the drive belt 13 are fitted over the brushroll 11 and the motor shaft 221 respectively, but the drive belt 13 is in the loosening state. When the body 31 is located at the second oblique position, the axis of the motor 22 extends along the vertical direction. That is, the motor 22 is at the first upright position, in which case the drive belt 13 is tensioned.

Specifically, when the body 31 is turned manually from the second upright position to the second oblique position, the bridging member 32 on the motor housing 21 rotates relative to the motor housing 21 and makes the motor 22 to rotate from the first oblique position to the first upright position by the lever cam member 41*b*. In this process, a lower end of the motor shaft 221 is moved backwards gradually, to increase the distance between the lower end of the motor shaft 221 and the brushroll 11, so as to tension the drive belt 13 to implement the operations of dust sweep and dust suction.

In this embodiment, when the body 31 is manipulated from the second upright position to the second oblique position at the predetermined angle, the motor 22 may rotate synchronously along with the body 31. When the motor 22 rotates to the predetermined angle, the user may manipulate the body 31 freely without any impact on the tensioned state of the drive belt 13. That is, when the motor 22 rotates from the first oblique position to the first upright position, the body 31 may be manipulated freely without affecting the dust sweep and dust suction of the upright vacuum cleaner 1. Of course, the present disclosure is not limited thereby. The rotation angle of the body 31 may be directly associated with that of the motor 22, i.e. adjusting the position of the motor 22 by adjusting the oblique angle of the body 31 manually so as to adjust the tension degree of the drive belt 13.

Consequently, in the upright vacuum cleaner 1 according to embodiments of the present disclosure, since the lever cam member 41*b* is disposed on the motor housing 21 and two ends of the lever cam member 41*b* cooperate with the bridging member 32 and the motor 22 respectively, it is achievable to realize the rotation of the motor 22 and adjust the tension degree of the drive belt 13, so as to guarantee the normal working of dust sweep and dust suction. Moreover, the upright vacuum cleaner 1 is easy to assemble and disassemble, and may operate stably and reliably with a high working efficiency. Additionally, the motor 22 of the upright vacuum cleaner 1 is disposed vertically to reduce the occupation space of the upright vacuum cleaner and facilitate diverse arrangements of various parts of the upright vacuum cleaner 1.

There are two lever cam members 41b that are symmetrically disposed on two side walls of the motor housing 21. Referring to FIG. 25 and FIG. 27, the two lever cam members 41b are spaced apart and disposed on opposite inner side walls of the motor housing 21 respectively, each lever cam member 41b is rotatable in the corresponding vertical plane, and the two lever cam members 41b rotate around the same rotating axis.

According to an embodiment of the present disclosure, the lever cam member 41b includes a rotary joint 411b, a first toggling part 412b and a second toggling part 413b. Specifically, the rotary joint 411b is rotatably connected to the motor housing 21; the first toggling part 412b and the second toggling part 413b are disposed at two sides of a same axial section of the rotary joint 411b respectively and extend towards a first direction and a second direction away from each other, the first toggling part 412b in cooperation with the motor 22, and the second toggling part 413b in cooperation with the bridging member 32.

In other words, the lever cam member 41b mainly includes the rotary joint 411b, the first toggling part 412b and the second toggling part 413b. The first toggling part 412b and the second toggling part 413b are disposed at two sides of the rotary joint 411b respectively, and connected with the opposite side walls of the rotary joint 411b respectively. The rotary joint 411b of the lever cam member 41b is rotatably disposed on the motor housing 21; the first toggling part 412b of the lever cam member 41b cooperates with the motor casing 222 of the motor 22, and the second toggling part 413b of the lever cam member 41b cooperates with the inner wall of the bridging member 32. When the body 31 is turned manually from the second upright position to the second oblique position, the bridging member 32 on the motor housing 21 rotates relative to the motor housing 21 and drives the rotation of the lever cam member 41b around its rotating axis by driving the second toggling part 413b, and then the first toggling part 412b of the lever cam member 41b pushes the motor 22 rotating from the first oblique position to the first upright position. In this process, a lower end of the motor shaft 221 is moved backwards gradually, to increase the distance between the lower end of the motor shaft 221 and the brushroll 11, so as to tension the drive belt 13 to implement the operations of dust sweep and dust suction.

Alternatively, the maximum distance between the second toggling part 413b and the center of the rotary joint 411b is greater than the maximum distance between the first toggling part 412b and the center of the rotary joint 411b. That is, the distance between a free end of the second toggling part 413b and a rotating center of the lever cam member 41b is greater than the distance between a free end of the first toggling part 412b and the rotating center of the lever cam member 41b. When the bridging member 32 rotates, the free end of the second toggling part 413b abuts against and is connected with the bridging member 32, so as to drive the lever cam member 41b rotating around the center of the rotary joint 411b. Thus, it is attainable that the first toggling part 412b makes the rotation of the motor 22 from the first oblique position to the first upright position, thereby tensioning the drive belt 13. The widths of the first toggling part 412b and the second toggling part 413b are both decreased gradually along a first direction and a second direction away from the rotary joint 411b, and the contours of the respective free ends of the first toggling part 412b and the second toggling part 413b are configured to be arc. Thus, it is convenient that the first toggling part 412b and the second toggling part 413b cooperate with the motor 22 and the bridging member 32 respectively, so as to guarantee the stable and reliable operation.

Further, one of the motor housing 21 and the rotary joint 411b is provided with a first rotating shaft 44b, and the other thereof is provided with a first rotational axle hole in cooperation with the first rotating shaft. Referring to FIG. 27 and FIG. 28, the opposite inner side walls of the motor housing 21 are provided with the first rotational shaft 44b respectively, while the rotary joint 411b of the lever cam member 41b is provided with the first rotational axle hole in cooperation with the first rotational shaft 44b, so as to connect the lever cam member 41b with the motor housing 21 rotatably through a simple structure which has low cost and is easy to assemble or disassemble.

Figure 22:
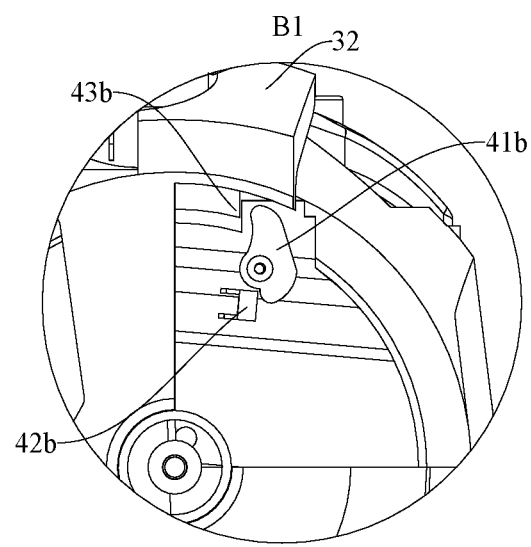
FIG. 22 is an enlarged view of part B1 of FIG. 21.
Figure 34:
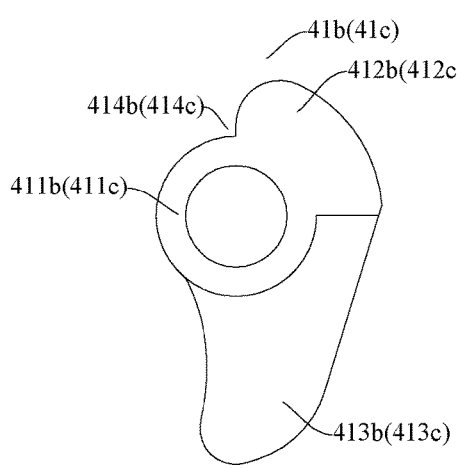
FIG. 34 is a front view of a lever cam member of an upright vacuum cleaner according to an embodiment of the present disclosure.
Figure 35:
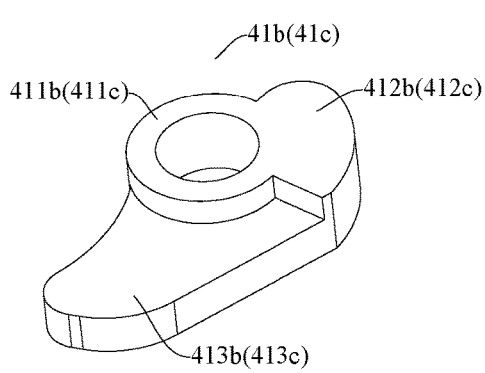
FIG. 35 is a perspective view of the lever cam member of the upright vacuum cleaner of FIG. 34.

According to an embodiment of the present disclosure, the motor 22 is provided with a first toggling block 42b in cooperation with the first toggling part 412b. Alternatively, the first toggling block 42b is configured to be a rectangular block in the vertical plane; there are two first toggling blocks 42b disposed on left and right side walls of the motor casing 222 of the motor 22; the first toggling parts 412b of two lever cam member 41b abut against and are connected with the first toggling blocks 42b at corresponding positions respectively. Advantageously, according to an embodiment of the present disclosure, the lever cam member 41b is provided with a retaining groove 414b; when the motor 22 is at the first oblique position, the first toggling blocks 42b cooperates in the retaining groove 414b. Referring to FIG. 22 and FIG. 34, the retaining groove 414b is disposed at a side of the first toggling parts 412b of the lever cam member 41b facing the first toggling block 42b, and an end of the first toggling blocks 42b cooperates with the retaining groove 414b. Therefore, by disposing the retaining groove 414b on the lever cam member 41b, it is advantageous for the first toggling part 412b of the lever cam member 41b to drive the first toggling block 42b, which may guarantee the reliable connection between the lever cam member 41b and the motor 22, so as to further improve the reliability of using the upright vacuum cleaner 1.

According to an embodiment of the present disclosure, the bridging member 32 is provided with a second toggling block 43b in cooperation with the second toggling part 413b. Referring to FIG. 25, the toggling block 43b is fixed on the opposite inner side walls of the bridging member 32, and the second toggling parts 413b of two lever cam members 41b abut against and are connected with the second toggling blocks 43b at corresponding positions, such that the bridging member 32 pushes the rotation of the lever cam member 41b to make the motor 22 rotate from the first oblique position to the first upright position, so as to tension the drive belt 13. Alternatively, the second toggling block 43b is configured as an arc block, and extends along the circumference of the rotary joint 411b to guarantee the reliable connection between the bridging member 32 and the second toggling blocks 43b.

Embodiment 3

As shown in FIGS. 21 to 33, the upright vacuum cleaner 1 according to embodiments of the present disclosure includes the brushroll 11, the motor assembly 200, the body assembly 300 and a lever cam member 41c. Specifically, the motor assembly 200 includes the motor housing 21 and the motor 22 disposed in the motor housing 21. The motor 22 drives the brushroll 11 rolling by the drive belt 13 and is rotatable between the first upright position of tensioning the drive belt 13 and the first oblique position of loosening the drive belt 13.

In other words, the upright vacuum cleaner 1 mainly includes the brushroll 11, the motor assembly 200, the body assembly 300 and the lever cam member 41c, in which the motor assembly 200 is connected with the brushroll 11, the body assembly 300 and the lever cam member 41c respectively. Referring to FIG. 21, the motor assembly 200 mainly includes the motor 22 and the motor housing 21. The motor housing 21 defines the accommodating chamber for mounting the motor 22 that is movably disposed in the accommodating chamber and may pivot relative to the motor housing 21. The motor 22 may drive the rotation of the fan to generate the dust suction flow to provide the vacuuming power for the upright vacuum cleaner 1. The motor 22 may further drive the brushroll 11 rotating around its own axis to achieve the purpose of cleaning the ground. Specifically, the drive belt 13 is disposed between the motor 22 and the brushroll 11 and is connected with the motor 22 and the brushroll 11 respectively. The motor 22 drives the brushroll 11 by the drive belt 13.

The body assembly 300 includes the body 31 and the bridging member 32 mounted on the body 31, in which the bridging member 32 is rotatably connected with the motor housing 21 to make the body 31 rotatable between the second upright position and the second oblique position. Referring to FIG. 21, the body assembly 300 mainly includes the body 31 and the bridging member 32. The body 31 is arranged along the vertical direction, and the bridging member 32 is disposed below the body 31 and connected with the lower end of the body 31. The bridging member 32 is mounted on the motor housing 21 and may pivot relative to the motor housing 21. When the handle of the body 31 is manipulated, for example, moving the body 31 from the second upright position to the second oblique position, the bridging member 32 rotates with respect to the motor housing 21 to push the motor 22 from the first oblique position to the first upright position.

Further, the lever cam member 41c is rotatably disposed on the motor housing 21 by a first rotating shaft 44c and two ends of the lever cam member 41c cooperate with the bridging member 32 and the motor 22 respectively. When the body 31 moves from the second upright position to the second oblique position, the bridging member 32 makes the motor 22 to move from the first oblique position to the first upright position by the lever cam member 41c. Referring to FIG. 29, the lever cam member 41c is connected with the bridging member 32 and the motor casing 222 of the motor 22 respectively. When the body 31 is located at the second upright position, the axis of the motor shaft 221 of the motor 22 is disposed obliquely backwards with respect to the axis of the motor housing 21. That is, the motor 22 is at the first oblique position. In such a case, two ends of the drive belt 13 are fitted over the brushroll 11 and the motor shaft 221 respectively, but the drive belt 13 is in the loosening state. When the body 31 is located at the second oblique position, the axis of the motor 22 extends along the vertical direction. That is, the motor 22 is at the first upright position, in which case the drive belt 13 is tensioned.

Specifically, when the body 31 is turned manually from the second upright position to the second oblique position, the bridging member 32 on the motor housing 21 rotates relative to the motor housing 21 and makes the motor 22 to rotate from the first oblique position to the first upright position by the lever cam member 41c. In this process, a lower end of the motor shaft 221 is moved backwards gradually, to increase the distance between the lower end of the motor shaft 221 and the brushroll 11, so as to tension the drive belt 13 to implement the operations of dust sweep and dust suction.

In this embodiment, when the body 31 is manipulated from the second upright position to the second oblique position at the predetermined angle, the motor 22 may rotate synchronously along with the body 31. When the body 31 rotates to the predetermined angle, the user may manipulate the body 31 freely without any impact on the tensioned state of the drive belt 13. That is, when the motor 22 rotates from the first oblique position to the first upright position, the body 31 may be manipulated freely without affecting the dust sweep and dust suction of the upright vacuum cleaner 1. Of course, the present disclosure is not limited thereby. The rotation angle of the body 31 may be directly associated with that of the motor 22, i.e. adjusting the position of the motor 22 by adjusting the oblique angle of the body 31 manually so as to adjust the tension degree of the drive belt 13.

Consequently, in the upright vacuum cleaner 1 according to embodiments of the present disclosure, since the lever cam member 41c is disposed on the motor housing 21 and two ends of the lever cam member 41c cooperate with the bridging member 32 and the motor 22 respectively, it is achievable to realize the rotation of the motor 22 and adjust the tension degree of the drive belt 13, so as to guarantee the normal working of dust sweep and dust suction. Moreover, the upright vacuum cleaner 1 is easy to assemble and disassemble, and may operate stably and reliably with a high working efficiency. Additionally, the motor 22 of the upright vacuum cleaner 1 is disposed vertically to reduce the occupation space of the upright vacuum cleaner and facilitate diverse arrangements of various parts of the upright vacuum cleaner 1.

Figure 30:
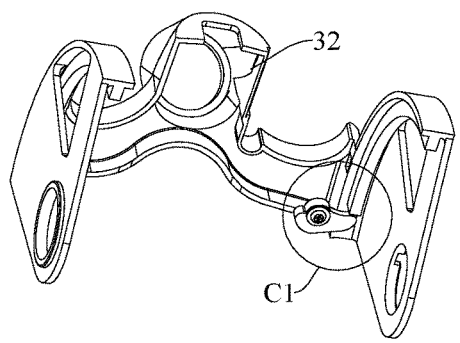
FIG. 30 is an assembly drawing of a bridging member and a lever cam member of the upright vacuum cleaner of FIG. 29.
Figure 31:
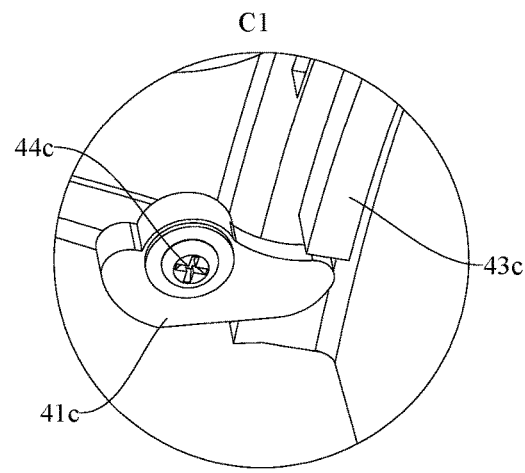
FIG. 31 is an enlarged view of part C1 of FIG. 30.

There are two lever cam members 41c that are spaced apart and disposed on the top wall of the motor housing 21. Referring to FIG. 29 to FIG. 31, the first toggling block 42c is fixed on the top wall of the motor casing 222 of the motor 22; the second toggling block 43c is fixed on a side wall of the bridging member 32 opposite to the motor housing 21; the lever cam member 41c is rotatably disposed on the top wall of the motor housing 21 and located between the first toggling block 42c and the second toggling block 43c; the first toggling part 412c of the lever cam member 41c and the first toggling block 42c cooperate with each other, while the second toggling part 413c of the lever cam member 41c and the second toggling block 43c cooperate with each other. When the body 31 is turned manually from the second upright position to the second oblique position, the bridging member 32 on the motor housing 21 rotates clockwise relative to the motor housing 21, and the second toggling block 43c on the bridging member 32 moves backwards relative to the lever cam member 41c to push the second toggling part 413c of the lever cam member 41c, such that the lever cam member 41c rotates counterclockwise in the horizontal plane. Meanwhile, the first toggling part 412c of the lever cam member 41c pushes the first toggling block 42c forwards to make the motor 22 rotate from the first oblique position to the first upright position. In this process, the lower end of the motor shaft 221 moves backwards gradually, which increases the distance between the lower end of the motor shaft 221 and the brushroll 11, so as to tension the drive belt 13 to implement the operations of dust sweep and dust suction.

Figure 32:
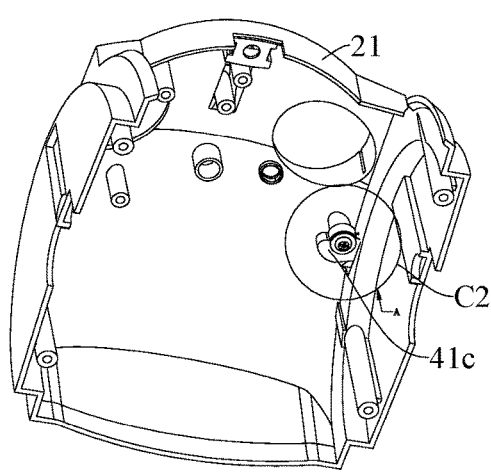
FIG. 32 is an assembly drawing of a motor housing and a lever cam member of the upright vacuum cleaner of FIG. 29.
Figure 33:
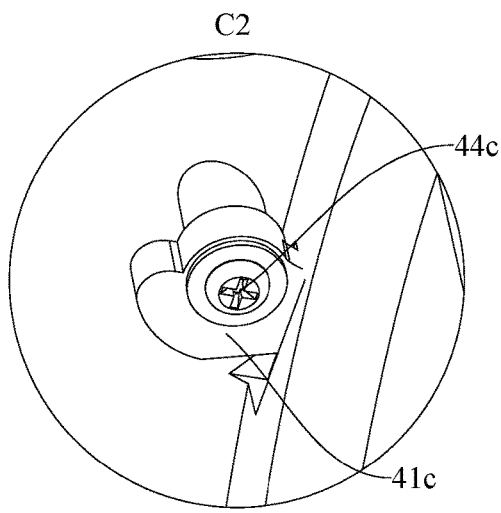
FIG. 33 is an enlarged view of part C2 of FIG. 32.

Alternatively, according to an embodiment of the present disclosure, the lever cam member 41c is rotatably connected to the inner top wall of the motor housing 21, and the second toggling part 413c of the lever cam member 41c passes through the side wall of the motor housing 21. Referring to FIG. 32 and FIG. 33, the lever cam member 41c is rotatably disposed at the inner surface of the top wall of the motor housing 21 and adjacent to the side wall of the motor housing 21. The motor 22 is located below the lever cam member 41c; the first toggling block 42c on the motor casing 222 of the motor 22 is disposed opposite the first toggling part 412c of the lever cam member 41c to make the first toggling part 412c clamped in the retaining groove 414c of the lever cam member 41c, while the second toggling part 413c of the lever cam member 41c passes through the side wall of the motor housing 21 and cooperates with the second toggling block 43c on the bridging member 32.

Therefore, by disposing two lever cam members 41c on the top wall of the motor housing 21, it is possible to provide sufficient power to move the motor 22 with balanced forces, and to guarantee the stability of the structure to improve the reliability of using the upright vacuum cleaner 1. Of course, the present disclosure is not limited thereby. There may be one or more lever cam members 41c; the lever cam member 41c may be arranged at other positions except the top wall and side wall of the motor housing 21; and the first toggling block 42c and the second toggling block 43c may be formed as another structure that cooperates with two ends of the lever cam member 41c respectively.

Embodiment 4

As shown in FIGS. 36 to 43, the clutching device 400 of the upright vacuum cleaner 1 according to embodiments of the present disclosure is disposed between the motor assembly 200 and the body assembly 300 of the upright vacuum cleaner 1. The motor assembly 200 includes the motor housing 21 and the motor 22 disposed in the motor housing 21. Referring to FIG. 14 and FIG. 15, the motor assembly 200 mainly includes the motor 22 and the motor housing 21. The motor housing 21 defines the accommodating chamber for mounting the motor 22 that is movably disposed in the accommodating chamber and may pivot relative to the motor housing 21. The motor 22 may drive the rotation of the fan to generate the dust suction flow to provide the vacuuming power for the upright vacuum cleaner 1. The motor 22 may further drive the brushroll 11 rotating around its own axis to achieve the purpose of cleaning the ground. Specifically, the drive belt 13 is disposed between the motor 22 and the brushroll 11 and is connected with the motor 22 and the brushroll 11 respectively. The motor 22 drives the brushroll 11 by the drive belt 13. The body assembly 300 includes the body 31 and the bridging member 32 mounted on the body 31, and the bridging member 32 is rotatably connected with the motor housing 21 to make the body 31 rotatable between the second upright position and the second oblique position.

Further, the clutching device 400 includes the second sliding rail 41d, a toggling tongue 42d and a lever member 43d.Specifically, the second sliding rail 41d is driven by the body assembly 300; the toggling tongue 42d is fixed on the motor 22 and rotatable relative to the motor housing 21; a first end of the lever member 43d slidably cooperates with the second sliding rail 41d and a second end thereof cooperates with an end of the toggling tongue 42d. Referring to FIG. 38 and FIG. 39, the clutching device 400 is disposed between the motor assembly 200 and the body assembly 300, and is movably connected with the motor assembly 200 and the body assembly 300 respectively; the lever member 43d of the clutching device 400 is rotatably disposed on the motor housing 21 while the second sliding rail 41d of the clutching device 400 is disposed on the body assembly 300; the toggling tongue 42d is fixed on the motor casing 222 of the motor 22; and the first end of the lever member 43d cooperates with the toggling tongue 42d and the second end thereof cooperates with the second sliding rail 41d.

Figure 40:
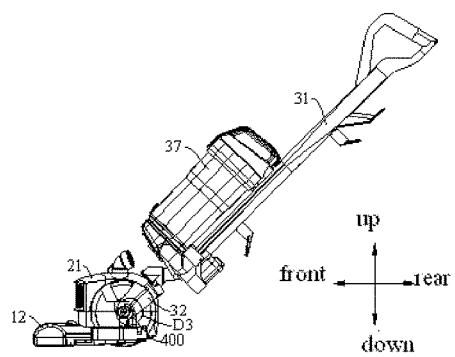
FIG. 40 is a schematic view of an upright vacuum cleaner when a body is located at a second oblique position according to an embodiment of the present disclosure.

When the body assembly 300 drives the second sliding rail 41d moving, the second sliding rail 41d drives the rotation of the lever member 43d; when the lever member 43d rotates, the toggling tongue 42d is stirred to make the motor 22 rotate with respect to the motor housing 21. Specifically, when the body 31 is manipulated from the upright position to the oblique position (i.e. inclining backwards as shown in FIG. 40), the bridging member 32 on the motor housing 21 rotates clockwise relative to the motor housing 21, and hence the second sliding rail 41d on the bridging member 32 rotates clockwise relative to the lever member 43d. Since the second sliding rail 41d keeps cooperation with the second end of the lever member 43d, in this process, the lever member 43d rotates clockwise around its rotational center, which makes it possible that the lever member 43d drives the toggling tongue 42d counterclockwise rotating around a pivotal axis, thereby making the motor 22 to rotate from the oblique state to the upright state. In this process, the lower end of the motor shaft 221 moves backwards gradually, which increases the distance between the lower end of the motor shaft 221 and the brushroll 11 so as to tension the drive belt 13.

Therefore, the clutching device 400 of the upright vacuum cleaner 1 according to embodiments of the present disclosure is easy to manufacture and process with low cost due to the simple structure. Since the lever member 43d of the clutching device 400 is rotatably disposed on the motor housing 21, and two ends of the lever member 43d cooperate with the bridging member 32 and the motor 22 respectively, it is possible to move the motor 22, so as to adjust the degree of tightness of the drive belt 13 to guarantee the normal working of dust sweep and dust suction. Moreover, it is easy to assemble or disassemble the clutching device 400 that guarantees the stable and reliable operation with a high working efficiency.

Figure 41:
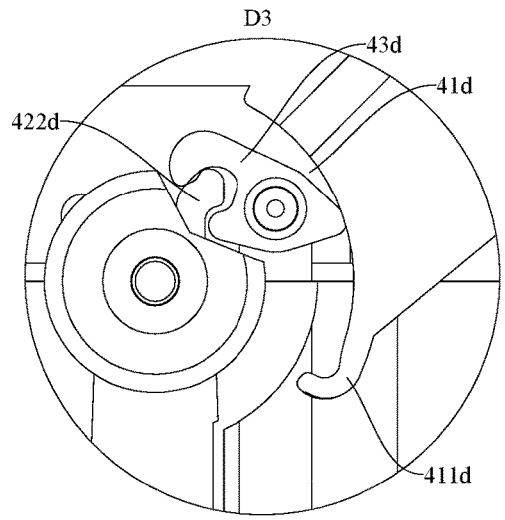
FIG. 41 is an enlarged view of part D3 of FIG. 40.

Advantageously, a stopping block 411d is disposed at a lower end of the second sliding rail 41d to prevent the first end of the lever member 43d from slipping off from the lower end of the second sliding rail 41d. Referring to FIG. 37 and FIG. 41, the second end of the lever member 43 is movably disposed in the second sliding rail 41d, and the lower end of the second sliding rail 41d is provided with the stopping block 411d extending inwards along the radial direction of the second sliding rail 41d. When the second end of the lever member 43 slides to the end part of the sliding groove, the lever member 43 abuts against and is connected with the stopping block 411d. Consequently, the stopping block 411d disposed at the lower end of the second sliding rail 41d may prevent the second end of the lever member 43d from slipping off from the second sliding rail 41d, which guarantees the reliable connection with the triggering assembly and further improves the reliability of using the upright vacuum cleaner 1. Preferably, the stopping block 411d may be disposed at the two ends of the second sliding rail 41d respectively to prevent the second end of the lever member 43d from slipping off from two ends of the second sliding rail 41d.

The second sliding rail 41d extends along a curve line. In other words, the second sliding rail 41d is a curve second sliding rail 41d, and the second end of the lever member 43d slides reciprocally along the arc of the second sliding rail 41d, such that the bridging member 32 may drive the rotation of the lever member 43*d* and the lever member 43*d* may makes the rotation of the motor 22. Preferably, the second sliding rail 41*d* extends along the arc line with the rotating axis of the body assembly 300 as the central axis. Referring to FIG. 39, the contour of the second sliding rail 41*d* is configured to be an arc shape extending circumferentially along the rotational center of the lever member 43*d*. When the bridging member 32 of the body assembly 300 rotates around its rotational center, the second end of the lever member 43*d* is maintained in the second sliding rail 41*d*. Hence, the bridging member 32 drives the rotation of the lever member 43*d* around its rotational center by the second sliding rail 41*d* thereon to make the first end of the lever member 43*d* drive the toggling tongue 42*d* to realize the purpose of realizing the rotation of the motor 22.

Figure 42:
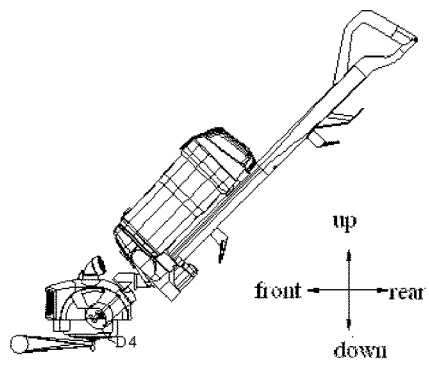
FIG. 42 is a partial assembly drawing of the upright vacuum cleaner of FIG. 40.

Alternatively, the second end of the lever member 43*d* is configured as a hook 431*d*, and an end of the toggling tongue 42*d* is engaged in the hook 431*d*. Referring to FIG. 39, the first end of the lever member 43*d* is configured as the hook 431*d* with an opening facing the toggling tongue 42*d*. When the body 31 is manipulated from the second upright position to the second oblique position (i.e. inclining backwards as shown in FIG. 42), the second sliding rail 41*d* on the bridging member 32 rotates clockwise relative to the lever member 43*d*. Since the second sliding rail 41*d* keeps cooperation with the second end of the lever member 43*d*, in this process, the lever member 43*d* rotates clockwise around the rotational center, and the hook 431*d* on the lever member 43*d* is engaged with the toggling tongue 42*d* to drive the toggling tongue 42*d* counterclockwise rotating around the pivotal axis and thus to make the motor 22 to rotate from the first oblique state to the first upright state, thereby tensioning the drive belt 13.

Specifically, according to an embodiment of the present disclosure, the toggling tongue 42 includes a rotational part 421*d* and a tongue part 422*d*. One of the rotational part 421*d* and the motor housing 21 is provided with a second rotating shaft 44*d*, and the other thereof is provided with a second rotational axle hole in cooperation with the second rotating shaft 44*d*. A first end of the tongue part 422*d* is connected with the rotational part 421*d*, while a second end thereof extends along the curve line in a direction away from the rotational part 421*d*. The second end of the tongue part 422*d* cooperates with the first end of the lever member 43*d*.

Figure 43:
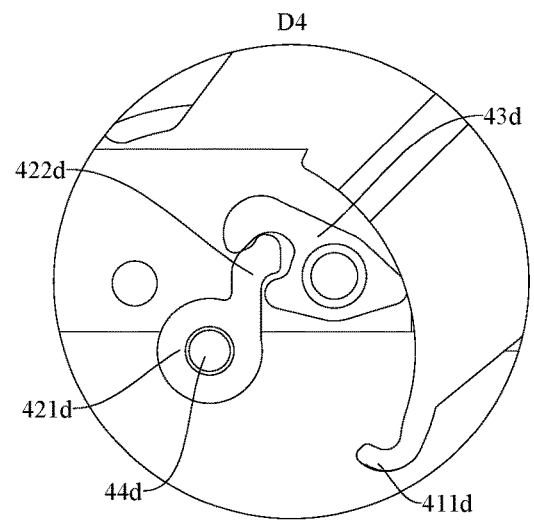
FIG. 43 is an enlarged view of part D4 of FIG. 42.
Figure 44:
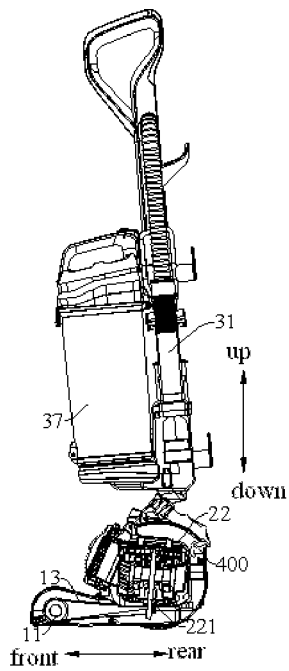
FIG. 44 is a side view of an upright vacuum cleaner when a motor is located at a first oblique position according to an embodiment of the present disclosure.
Figure 46:
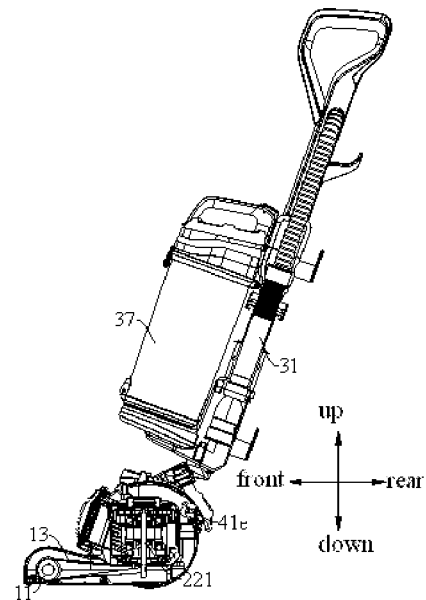
FIG. 46 is a side view of an upright vacuum cleaner when a motor is located at a first upright position according to an embodiment of the present disclosure.

Referring to FIG. 43, the toggling tongue 42 mainly includes the rotational part 421*d* and the tongue part 422*d*. The first end of the tongue part 422*d* is connected with a side wall of the rotational part 421*d*, while the second end of the tongue part 422*d* extends in the direction away from the rotational part 421*d*. The toggling tongue 42*d* is fixed on the motor casing 222 of the motor 22. Further, the second rotating shaft 44*d* is disposed in an inner wall of the motor housing 21 opposite to the motor casing 222; the rotational part 421*d* is provided with the second rotational axle hole in cooperation with the second rotating shaft 44*d*. When the motor assembly 200, the body assembly 300 and the lever member 43*d* are assembled, the free end of the tongue part 422*d* is engaged in the hook 431*d* of the lever member 43*d*. Therefore, due to the cooperation of the hook 431*d* of the lever member 43*d* with the tongue part 422*d* of the toggling tongue 42*d*, the reliability of connecting the lever member 43*d* with the toggling tongue 42*d* may be enhanced to guarantee the stability and reliability of transmitting the motion and power, so as to guarantee the normal working of the clutching device 400.

Preferably, according to an embodiment of the present disclosure, the toggling tongue 42 and the motor casing 222 of the motor 22 are molded integrally. Thus, the structure formed integrally cannot only guarantee the stability of the structure and performance of the upright vacuum cleaner 1, but also save redundant parts and connecting procedures due to simple molding and manufacturing, so as to improve the assembling efficiency of the upright vacuum cleaner 1 considerably and guarantee the reliability of connecting the toggling tongue 42*d* with the motor casing 222. Moreover, this structure has high overall strength and stability and long service life, and is easy to assemble.

Alternatively, the lever member 43*d* is rotatably connected to the side wall of the motor housing 21. Referring to FIGS. 14 to 21, the side wall of the motor housing 21 extends along the vertical direction (i.e. the up-and-down direction shown in FIG. 14); the lever member 43*d* is disposed on the side wall of the motor housing 21 and is rotatable in the vertical side wall surface of the motor housing 21. That is, the rotating axis of the lever member 43*d* is perpendicular to the vertical plane of the lever member 43*d*.

Specifically, as shown in FIG. 38, the toggling tongue 42*d* is fixed on the motor casing 222 of the motor 22. For example, a bracket extending along the vertical direction is disposed on the motor casing 222 of the motor 22, and the toggling tongue 42*d* is fixed on the bracket. The second rotating shaft 44*d* for mounting the toggling tongue 42*d* is disposed on a side of the motor housing 21 opposite to the motor casing 222 of the motor 22. The toggling tongue 42*d* on the motor casing 222 of the motor 22 is fitted over the second rotating shaft 44*d* on the motor housing 21 and is rotatable relative to the motor housing 21. That is, the motor 22 may be rotatably connected with the motor housing 21 through the cooperation between the toggling tongue 42*d* and the second rotating shaft 44*d*. The second sliding rail 41*d* is fixed on the side wall of the bridging member 32; the first end of the lever member 43*d* cooperates with the toggling tongue 42*d* while the second end thereof cooperates with the second sliding rail 41*d*.

When the body 31 is manipulated from the second upright position to the second oblique position (i.e. inclining backwards as shown in FIG. 40), the bridging member 32 on the motor housing 21 rotates clockwise relative to the motor housing 21, and hence the second sliding rail 41*d* on the bridging member 32 rotates clockwise relative to the lever member 43*d*. Since the second sliding rail 41*d* keeps cooperation with the second end of the lever member 43*d*, in this process, the lever member 43*d* rotates clockwise around its rotational center, which makes it possible that the lever member 43*d* drives the toggling tongue 42*d* counterclockwise rotating around a pivotal axis, thereby make the motor 22 to rotate from the first oblique state to the first upright state. In this process, the lower end of the motor shaft 221 moves backwards gradually, which increases the distance between the lower end of the motor shaft 221 and the brushroll 11, so as to tension the drive belt 13.

Advantageously, there are two lever members 43*d* that are disposed symmetrically at both sides of the motor housing 21. That is, two lever members 43*d* disposed symmetrically are arranged on the opposite inner walls of the motor housing 21, and each lever member 43*d* is pivotal in the vertical plane. Two toggling tongues 42*d* disposed symmetrically are arranged on the motor casing 222 of the motor 22, while two second sliding rails 41*d* disposed symmetrically are arranged on the bridging member 32. Each lever member 43*d* cooperates with the toggling tongue 42*d* and the second sliding rail 41d at the corresponding position so as to realize the rotation of the motor 22 in the motor housing 21.

Of course, the present disclosure is not limited thereby. Two lever members 43d may be rotatably connected on the top wall of the motor housing 21 and may be pivotal in the horizontal plane; two toggling tongues 42d and two second sliding rails 41d keep abutting against and the connection with the lever member 43d at the corresponding position, so as to realize the transmission of motion and power. Therefore, by disposing the clutching device 400 arranged axially symmetrically at two sides of the central line of the motor assembly 200, it is possible to provide the system with sufficient power for driving the motor 22, to reduce the force imposing on the individual lever member 43d to enhance the reliability of using the lever member 43d, and to guarantee the balanced force and the stable structure during the rotation of the motor 22, so as to strengthen the reliability of using the upright vacuum cleaner 1.

Embodiment 5

As shown in FIGS. 44 to 49, the clutching device 400 of the upright vacuum cleaner 1 according to embodiments of the present disclosure includes a first sliding rail 3213 and a lever rotating member 41e. The first sliding rail 3213 is formed in the bridging member 32 and a tail end of the first sliding rail 3213 has a first sliding rail tail groove 3214 formed by a recess in a surface of the tail end of the first sliding rail 3213; and the lever rotating member 41e is rotatably disposed on the motor housing 21 and two ends of the lever rotating member 41e cooperate with the first sliding rail 3213 and the motor 22 respectively. When the body 31 moves from the second upright position to the second oblique position, a first end of the lever rotating member 41e slides from the first sliding rail tail groove 3214 to the first sliding rail 3213, and a second end of the lever rotating member 41e makes the motor 22 to move from the first oblique position to the first upright position.

Specifically, the motor housing 21 is provided with a mounting part (not shown) for mounting the lever rotating member 41e. The lever rotating member 41e is rotatably mounted on the mounting part of the motor housing 21, in which the first end of the lever rotating member 41e cooperates with the bridging member 32 and the second end thereof cooperates with the motor casing 222 of the motor 22. When the body 31 moves from the second upright position (i.e. the position of the body 31 shown in FIG. 44) to the second oblique position (i.e. the position of the body 31 shown in FIG. 46), the bridging member 32 rotates along with the movement of the body 31. In such a way, the bridging member 32 drives the rotation of the lever rotating member 41e by pushing a first end of the lever rotating member 41e in cooperation with the bridging member 32, and meanwhile, a second end of the lever rotating member 41e in cooperation with the motor casing 222 makes the motor 22 to rotate from the first oblique position (i.e. the position of the motor 22 shown in FIG. 45) to the first upright position (i.e. the position of the motor 22 shown in FIG. 48).

Therefore, in the upright vacuum cleaner 1 according to embodiments of the present disclosure, the lever rotating member 41e is disposed on the motor housing 21 and two ends of the lever rotating member 41e cooperate with the bridging member 32 and the motor 22, it is achievable to realize the rotation of the motor 22 and adjust the tension degree of the drive belt 13, so as to guarantee the normal working of dust sweep and dust suction. Moreover, the upright vacuum cleaner 1 is easy to assemble and disassemble, and may operate stably and reliably with a high working efficiency. Additionally, the motor 22 of the upright vacuum cleaner 1 is disposed vertically to reduce the occupation space of the upright vacuum cleaner and facilitate diverse arrangements of various parts of the upright vacuum cleaner 1.

Preferably, according to an embodiment of the present disclosure, the first sliding rail 3213 is configured to be an arc sliding rail with the rotating axis of the bridging member 32 as the central axis.

Referring to FIG. 7 to FIG. 9, the motor 22 may be pivotally disposed on the motor housing 21, while the bridging member 32 is erected outside the motor housing 21 and pivotally connected with the motor housing 21. The rotating axis of the motor 22 and that of the bridging member 32 extend along the left-and-right direction. The motor 22 and the bridging member 32 incline forwards or backwards along the front-and-rear direction during rotation. Advantageously, the contour of the inner wall of the bridging member 32 is configured to be an arc shape with the rotating axis of the bridging member 32 as the central axis, while the first sliding rail 3213 of the bridging member 32 is configured to be an arc shape with the rotating axis of the bridging member 32 as the central axis.

When the body 31 moves from the second upright position to the second oblique position, the bridging member 32 rotates along with the movement of the body 31. In such a way, the arc first sliding rail 3213 on the bridging member 32 rotates around the rotating axis of the bridging member 32. In this process, the bridging member 32 drives the rotation of the lever rotating member 41e by pushing a first end of the lever rotating member 41e in cooperation with the bridging member 32, and meanwhile, a second end of the lever rotating member 41e in cooperation with the motor casing 222 makes the motor 22 to rotate from the first oblique position to the first upright position.

Since the first sliding rail 3213 of the bridging member 32 is configured as an arc first sliding rail 3213 with the rotating axis of the bridging member 32 as the central axis, it is possible to drive the rotation of the lever rotating member 41e by utilizing the rotation of the bridging member 32, so as to realize the purpose of pushing the movement of the motor 22. Therefore, the drive belt 13 is tensioned to guarantee the normal working of the upright vacuum cleaner 1.

Preferably, according to an embodiment of the present disclosure, the first sliding rail 3213 and the first sliding rail tail groove 3214 are connected smoothly via a guide surface.

Specifically, when the body 31 is at the second upright position, the motor 22 is at the first oblique position. At this moment, the first end of the lever rotating member 41e is located at the tail of the first sliding rail 3213 of the bridging member 32, i.e. located in the first sliding rail tail groove 3214. When the body 31 moves from the second upright position to the second oblique position, the bridging member 32 rotates clockwise, such that the first end of the lever rotating member 41e slides from the first sliding rail tail groove 3214 to the first sliding rail 3213 to drive the lever rotating member 41e, while the second end of the lever rotating member 41e makes the motor 22 to rotate from the first oblique position to the first upright position.

Consequently, since the first sliding rail 3213 and the first sliding rail tail groove 3214 are connected smoothly via the guide surface, it is possible to guarantee the stable rotation of the lever rotating member 41e to guarantee the stable rotation of the motor 22, and slow down abrasion of the lever rotating member 41e and prolong the service life of the lever rotating member 41e.

Figure 47:
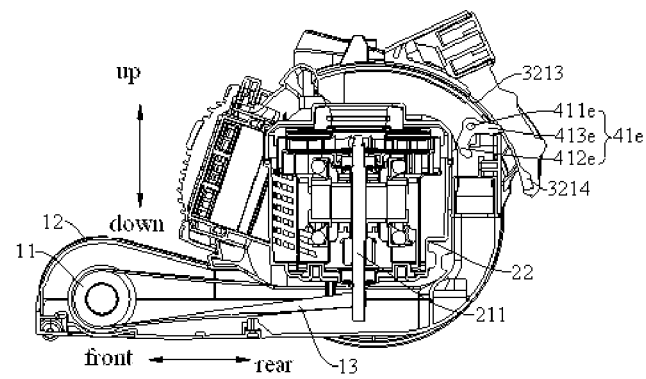
FIG. 47 is a partial view of the upright vacuum cleaner of FIG. 46.
Figure 48:
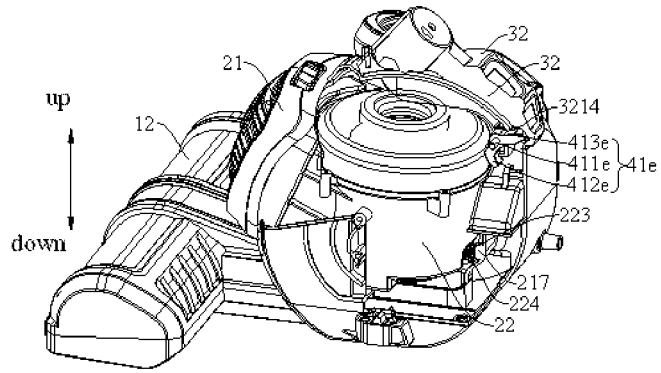
FIG. 48 is an assembly drawing of a brushroll, a motor assembly and a clutching device of the upright vacuum cleaner of FIG. 44.

In some specific embodiments of the present disclosure, the first sliding rail 3213 is formed on the inner top wall of the bridging member 32. Referring to FIG. 47 and FIG. 48, the inner top wall of the bridging member 32 has the arc first sliding rail 3213 with the rotating axis of the bridging member 32 as the central axis; the arc first sliding rail 3213 extends along the front-and-rear direction. The first sliding rail tail groove 3214 is located at the rear end of the arc first sliding rail 3213, and the lever rotating member 41e is mounted on the motor housing 21 and located behind the motor 22. The first end of the lever rotating member 41e extends beyond the motor housing 21 to realize cooperation with the first sliding rail 3213 of the bridging member 32, and the second end thereof is located behind the motor 22 and cooperates with the motor casing 222 to realize the rotation of the motor 22.

Alternatively, there is one lever rotating member 41e, and is opposite to a top center of a side of the motor 22 away from the brushroll 11. That is, the lever rotating member 41e is located right behind the motor 22; when the bridging member 32 rotates, the lever rotating member 41e may provide sufficient power to make the motor 22 to rotate from the first oblique position to the first upright position.

According to an example of the present disclosure, the lever rotating member 41e includes a rotational mounting part 411e, a third toggling part 412e and a fourth toggling part 413e. The rotational mounting part 411e is rotatably connected to the motor housing 21. The third toggling part 412e and the fourth toggling part 413e are fixed at both sides of the same axial section of the rotational mounting part 411e and extend in a direction away from each other. The third toggling part 412e cooperates with the motor 22, while the fourth toggling part 413e cooperates with the first sliding rail 3213.

In other words, the lever rotating member 41e mainly includes the rotational mounting part 411e, the third toggling part 412e and the fourth toggling part 413e. The third toggling part 412e and the fourth toggling part 413e are connected with two sides of the rotational mounting part 411e respectively. The rotational mounting part 411e is rotatably disposed on the mounting part of the motor housing 21. The third toggling part 412e extends towards the motor 22 and cooperates with the motor casing 222; the fourth toggling part 413e extends beyond the motor housing 21 towards the bridging member 32 to cooperate with the first sliding rail 3213 of the bridging member 32.

When the body 31 moves from the second upright position to the second oblique position, the bridging member 32 rotates along with the movement of the body 31. In such a way, the arc first sliding rail 3213 on the bridging member 32 rotates around the rotating axis of the bridging member 32. In this process, the fourth toggling part 413e slides from the first sliding rail tail groove 3214 to the first sliding rail 3213 to drive the lever rotating member 41e, and meanwhile the third toggling part 412e of the lever rotating member 41e makes the motor 22 to rotate from the first oblique position to the first upright position.

Therefore, the lever rotating member 41e is easy to process, manufacture, assemble and disassemble due to the simple structure. By mounting the lever rotating member 41e on the motor housing 21, it is possible to realize cooperation between the bridging member 32 and the motor 22 to transmit motion and power, so as to guarantee the continuity and stability of the motion.

Preferably, according to an embodiment of the present disclosure, a surface of the fourth toggling part 413e in cooperation with the first sliding rail 3213 is configured as a first smooth curved surface, while a surface of the third toggling part 412e in cooperation with the motor 22 is configured as a second smooth curved surface.

Since the surface of the fourth toggling part 413e in cooperation with the first sliding rail 3213 is configured as the first smooth curved surface, while the surface of the third toggling part 412e in cooperation with the motor 22 is configured as the second smooth curved surface, it is possible to guarantee the continuity and stability of the motion, so as to guarantee the stable rotation of the motor 22, and slow down abrasion of the lever rotating member 41e to prolong the service life of the lever rotating member 41e.

Figure 45:
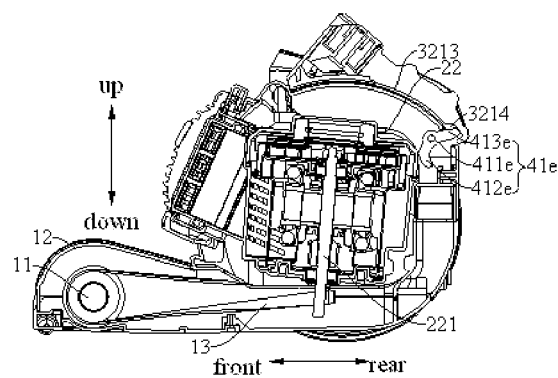
FIG. 45 is a partial view of the upright vacuum cleaner of FIG. 44.

As shown in FIG. 45, in some specific examples of the present disclosure, the elastic member is disposed between the motor 22 and the motor housing 21. The elastic member is configured to push the motor 22 rotating from the first oblique position to the first upright position when the body 31 moves from the second upright position to the second oblique position.

Therefore, by disposing the elastic member between the motor housing 21 and the motor 22, it is possible to make the motor 22 to rotate from the first oblique position to the first upright position to implement position regulation, and reduce mechanical vibration of the motor 22 during rotation to avoid heavy collision and reduce the noise generated by motion.

Alternatively, the motor 22 includes a first column 223, and the motor housing 21 includes a second column 217; the elastic member is a spring 224 and two ends of the spring 224 are fitted over the first column 223 and the second column 217 to push the motor 22 to the first oblique position.

Referring to FIG. 45, the first column 223 extending backwards is disposed on the outer side wall of the motor 22, and the second column 217 extending forwards is disposed on the inner side wall of the motor housing 21; two ends of the spring 224 are fitted over the first column 223 and the second column 217, which forms a simple structure and is easy to assemble or disassemble, so as to slow down vibration, reduce noise and improve the reliability and quality of the upright vacuum cleaner 1.

The structure and the working process of the upright vacuum cleaner 1 will be described with reference to the accompanying drawings.

Figure 55:
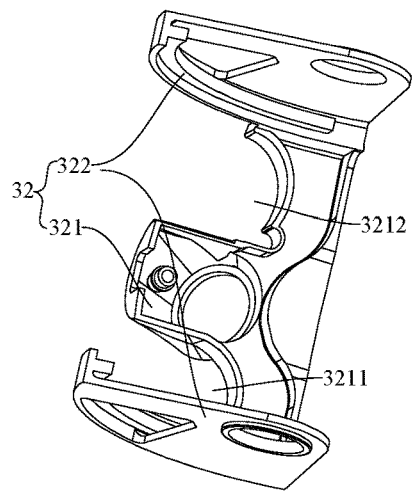
FIG. 55 is a schematic view of a bridging member of an upright vacuum cleaner according to an embodiment of the present disclosure.

As shown in FIGS. 1 to 55, the upright vacuum cleaner mainly includes the brush assembly 100, the motor assembly 200, the body assembly 300, the clutching device 400 and the wheel 38.

The brush assembly 100 includes the brushroll 11 and the brushroll casing 12 that includes an upper casing 124 and a lower casing 125. The brushroll casing 12 defines the drive-belt mounting chamber 123, and the first air-suction channel 1221 and the second air-suction channel 1222 located at both sides of the drive-belt mounting chamber 123. The brushroll 11 is rotatably disposed in the brushroll casing 12, and the drive belt 13 is rotatably disposed within the drive-belt mounting chamber 123. Further, an end of the drive belt 13 is winded upon the middle part of the brushroll 11. Referring to FIG. 49 and FIG. 50, the brushroll 11 mainly includes the first brushroll section 111, the second brushroll section 112 and the connecting-shaft section 113 disposed coaxially. The first brushroll section 111 and the second brushroll section 112 are connected with two ends of the connecting-shaft section 113 respectively. The first brushroll section 111 includes the first body 1111 and the first bristle 1112 disposed on the first body 1111; the second brushroll section 112 includes the second body 1121 and the second bristle 1122 disposed on the second body 1121. The end of the drive belt 13 is winded upon the connecting-shaft section 113 of the brushroll 11. Further, the tensioning wheel 14 is disposed on the brushroll casing 12 to tension the drive belt 13.

The motor assembly 200 includes the motor housing 21, the motor 22 and the fan (not shown). The motor housing 21 defines the motor air-suction channel 216 and the motor air-exhaust channel spaced apart. The motor housing 21 has the dirty air outlet 211 communicated with the motor air-suction channel 216, and the clean air inlet 212 communicated with the motor air-exhaust channel. The motor 22 is disposed upright inside the motor housing 21 and is rotatable with respect to the motor housing 21. That is, the motor shaft 221 of the upright vacuum cleaner 1 is arranged along the vertical direction, and the motor 22 is disposed in rear of the brushroll 11 and connected with the brushroll 11 via the drive belt 13. Specifically, the first end of the drive belt 13 is fitted over the motor shaft 221 of the motor 22 while the second end of the drive belt 13 is fitted over the brushroll 11. When the motor shaft 221 of the motor 22 rotates, the motor shaft 221 drives the rotation of the drive belt 13, and the drive belt 13 drives the brushroll 11 rotating around its own rotating axis, so as to make the motor 22 to drive the rotation of the brushroll 11. Referring to FIG. 10, since the axis of the motor shaft 221 of the motor 22 and that of the brushroll 11 are disposed in the non-parallel manner, the drive belt 13 between the brushroll 11 and the motor shaft 221 is twisted for one time with an angle of 30° to 90°. Further, the motor 22 may drive the rotation of the fan to generate an air flow to provide a vacuuming power; and the motor 22 may drive the rotation of the brushroll 11 around its own axis to realize the purpose of cleaning the ground.

The body assembly 300 includes the body 31, the bridging member 32 and the dirt cup 37, in which the dirt cup 37 and the bridging member 32 are mounted on the body 31 respectively; the bridging member 32 is connected with the lower end of the body 31. Two side plates 322 of the bridging member 32 are disposed outside the side wall of the motor housing 21 respectively and rotatably connected with the motor housing 21. Meanwhile, the rotatable wheel 38 is disposed outside the two side plates 322 of the bridging member 32 to make it easier for the user to push the upright vacuum cleaner 1. The dirt cup 37 defines the separating chamber 371 therein, and includes the air inlet 372 and the air outlet 373 communicated with the separating chamber 371 respectively. The body 31 defines the body air-exhaust channel 311 therein. The dust and debris sucked through the dust suction port of the brushroll casing 12 are delivered into the motor air-suction channel 216 of the motor housing 21 sequentially through the first air-suction channel 1221 and the second air-suction channel 1222, and then into the separating chamber 371 of the dirt cup 37 for filtration. The clean air obtained is discharged to the motor air-exhaust channel of the motor housing 21 from the air outlet 373 of the dirt cup 37, and finally discharged to the outside from the air exhaust hole 213 of the motor housing 21.

The triggering member of the clutching device 400 is rotatably disposed on the motor housing 21, and cooperates with the bridging member 32 and the motor casing 222 of the motor 22, such that the bridging member 32 drives the rotation of the clutching device 400, and the clutching device 400 realizes the rotation of the motor 22.

Referring to FIG. 1, when it is in the non-working state, the upright vacuum cleaner 1 may be placed upright on the ground, i.e. the body 31 being at the second upright position, which occupies small space. If the user needs to use the upright vacuum cleaner 1, the user may hold the handle of the body 31 to push the upright vacuum cleaner 1 to work. First, the user may turn on the switch of the upright vacuum cleaner 1, in which case the drive belt 13 is in the loosening state, and the motor 22 cannot drive the rotation of the brushroll 11. That is, the upright vacuum cleaner 1 is in a stand-by state where the brushroll 11 does not sweep dust. Then, the body 31 is turned manually from the second upright position to the second oblique position, the bridging member 32 on the motor housing 21 rotates clockwise along with the body 31 relative to the motor housing 21, such that the bridging member 32 realizes the rotation of the motor 22 in the motor housing 21 by driving the clutching device on the motor housing 21. That is, the motor 22 rotates from the first oblique position to the first upright position. In this process, the lower end of the motor shaft 221 moves backwards gradually, which increases the distance between the lower end of the motor shaft 221 and the brushroll 11, so as to tension the drive belt 13. The motor 22 may drive the rotation of the brushroll 11 by the drive belt 13 to implement the operations of dust sweep and dust suction. Of course, the present disclosure is not limited thereby. The user may rotate the body 31 from the second upright position to the second oblique position directly, in which process the drive belt 13 is tensioned; and then the switch of the upright vacuum cleaner 1 is turned on to implement the operations of dust sweep and dust suction simultaneously.

That is, the user just needs to turn on the switch to start or stop dust sweep by manipulating the direction of the handle of the body 31, with simple operations instead of operation control keys. Alternatively, the switch may be disposed on the handle of the body 31 to facilitate manual operations, or may be disposed on the brushroll casing 12 or the motor housing 21 below the body 31 to make it convenient to turn on the switch by foot. The motor 22 may be disposed near the ground. That is, the gravity of the motor 22 is lower than that of the motor 22 of the vacuum cleaner in the related art, such that the upright vacuum cleaner 1 having the body 31 of the same length in the present disclosure is easier to operate with less effort.

When the upright vacuum cleaner 1 is in the working state, the dirty air and dust are introduced into the brushroll air-suction channel 122 via the dust suction port of the brushroll casing 12, then into a motor air-suction channel 216 in the motor housing 21, and discharged into the body assembly 300 via the dirty air output pipe 214 on the motor housing 21; clean air obtained by filtration of the body assembly 300 enters the motor air-exhaust channel within the motor housing 21 via the clean air input pipe 215 of the motor housing 21. The air exhaust pipe 39 is disposed between the body 31 and the motor housing 21; two ends of the air exhaust pipe 39 are communicated with the body air-exhaust channel 311 of the body 31 and the clean air inlet 212 of the motor housing 21 respectively. The clean air obtained after filtration and processing of the dirt cup 37 is introduced into the motor air-exhaust channel in the motor housing 21 sequentially through the body air-exhaust channel 311, the air exhaust pipe 39 and the clean air inlet 212, and finally discharged to the outside from the air exhaust hole 213 of the motor housing 21.

It shall be noted that when the body 31 is manipulated from the second upright position to the second oblique position at the predetermined angle, the motor 22 may rotate synchronously along with the body 31. When the body 31 rotates to the predetermined angle, the user may manipulate the body 31 freely without any impact on the tensioned state of the drive belt 13. That is, when the motor 22 rotates from the first oblique position to the first upright position, the body 31 may be manipulated freely without affecting the dust sweep and dust suction of the upright vacuum cleaner 1. Of course, the present disclosure is not limited thereby. The rotation angle of the body 31 may be directly associated with that of the motor 22, i.e. adjusting the position of the motor 22 by adjusting the oblique angle of the body 31 manually so as to adjust the tension degree of the drive belt 13.

The other configurations and operations of the upright vacuum cleaner 1 according to embodiments of the present disclosure are known to those skilled in the art, which will not be elaborated herein.

Reference throughout this specification to "an embodiment," "some embodiments," "an example," "specific examples" or "some examples" means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples. Those skilled in the art can integrate and combine different embodiments or examples and the features in different embodiments or examples in the specification.

Although embodiments of the present disclosure have been shown and illustrated, it shall be understood by those skilled in the art that various changes, modifications, alternatives and variants without departing from the principle and spirit of the present disclosure are acceptable. The scope of the present disclosure is defined by the claims or the like.

What is claimed is:

1. An upright vacuum cleaner, comprising:
   a brushroll;
   a motor assembly comprising a motor housing and a motor disposed within the motor housing, wherein a rotating axis of the motor and a rotating axis of the brushroll are disposed in a non-parallel manner, and the motor drives the brushroll to roll via a drive belt and is rotatable between a first upright position wherein the drive belt is tensioned and a first oblique position wherein the drive belt is released;
   a body assembly comprising a body, a bridging member mounted to the body and rotatably connected with the motor housing to make the body rotatable between a second upright position and a second oblique position, and a dirt cup mounted to the body;
   wherein the motor is moved from the first oblique position to the first upright position by the bridging member when the body moves from the second upright position to the second oblique position.

2. The upright vacuum cleaner according to claim 1, further comprising:
   a clutching device disposed between the bridging member and the motor, wherein the motor is moved from the first oblique position to the first upright position by the bridging member via the clutching device, when the body moves from the second upright position to the second oblique position; and
   wherein the clutching device comprises:
   a first block fixed to the motor;
   a second block disposed to the bridging member; and
   a lever cam member rotatably disposed to the motor housing and having a first end and a second end configured to cooperate with the first toggling block and the second toggling block respectively.

3. The upright vacuum cleaner according to claim 2, wherein the lever cam member comprises: lever cam member comprises: a rotary joint rotatably connected to the motor housing; a first toggling part fixed at a first side of an axial section of the rotary joint and cooperated with the first toggling block; and a second toggling part fixed at a second side of the axial section opposite to the first side, cooperated with the second toggling block, wherein the first and second toggling parts are extended in directions away from each other.

4. The upright vacuum cleaner according to claim 3, wherein a maximum distance between the second toggling part and a center of the rotary joint is greater than a maximum distance between the first toggling part and the center of the rotary joint, and widths of the first toggling part and the second toggling part are both decreased gradually along a first direction and a second direction away from the rotary joint.

5. The upright vacuum cleaner according to claim 2, wherein the lever cam member is provided with a retaining groove, and the first toggling block is fitted within the retaining groove when the motor is moved to the first upright position.

6. The upright vacuum cleaner according to claim 2, wherein the clutching device comprises:
   a first sliding rail formed in the bridging member and comprising a tail end having a first sliding rail tail groove formed by a recess in a surface of the tail end of the first sliding rail; and
   a lever rotating member rotatably disposed to the motor housing and comprising a first and second ends configured to cooperate with the first sliding rail and the motor respectively,
   wherein when the body is moved from the second upright position to the second oblique position, the first end of the lever rotating member slides from the first sliding rail tail groove to the first sliding rail, and the motor is moved by the second end of the lever rotating member from the first oblique position to the first upright position.

7. The upright vacuum cleaner according to claim 6, wherein the first sliding rail is configured as an arc sliding rail with a rotating axis of the bridging member as a central axis thereof;
   wherein the first sliding rail and the first sliding rail tail groove are connected by means of a smooth transition via a guide surface; and
   wherein the first sliding rail is formed in an inner top wall of the bridging member, and one lever rotating member is opposite to a top center of a side of the motor away from the brushroll.

8. The upright vacuum cleaner according to claim 2, wherein the clutching device comprises:
   a second sliding rail disposed to the bridging member;
   a toggling tongue fixed to the motor and rotatable relative to the motor housing; and
   a lever member having a first end configured to slidably cooperate with the second sliding rail and a second end configured to cooperate with an end of the toggling tongue.

9. The upright vacuum cleaner according to claim 8, wherein a stopping block is disposed at a lower end of the second sliding rail to prevent the first end of the lever member from slipping off from the lower end of the second sliding rail.

10. The upright vacuum cleaner according to claim 8, wherein the second end of the lever member is configured as a hook, and the end of the toggling tongue is configured to be engaged in the hook.

11. The upright vacuum cleaner according to claim 8, wherein the toggling tongue comprises:
   a rotational part, wherein one of the rotational part and the motor housing is provided with a rotating shaft, and the other thereof is provided with a rotating shaft hole configured to rotarily cooperate with the rotating shaft; and
   a tongue part having a first end connected with the rotational part and a second end extending along a curve in a direction away from the rotational part, wherein the second end of the tongue part is configured to cooperate with the second end of the lever member.

12. The upright vacuum cleaner according to claim 8, wherein the second sliding rail extends along an arc with the rotating axis of the bridging member as a central axis thereof.

13. The upright vacuum cleaner according to claim 2, wherein the clutching device comprises:
   a slide chute formed in the bridging member;
   a triggering member rotatably supported at the motor housing and having a first end with a sliding column configured to enter the slide chute and slidably cooperate with the slide chute and a second end having a toggling rod configured to prod the motor to move;
   wherein the sliding column slides along the slide chute to make the triggering member rotate when the bridging member makes the slide chute move, and the toggling rod prod the motor to rotate relative to the motor housing when the triggering member rotates;
   wherein the triggering member comprises:
   a first triggering part in which the sliding column is formed;
   a second triggering part to which the toggling rod is formed; and
   a pivot section connected between the first triggering part and the second triggering part and rotatably passing through the motor housing;
   wherein the pivot section is disposed vertically; the first triggering part is disposed in perpendicular to the pivot section; along a direction from a first end of the first triggering part adjacent to the sliding column to a second end of the first triggering part adjacent to the pivot section, a vertical height of the first triggering part is decreased gradually and an upper surface of the first triggering part is configured as an arc surface corresponding to a shape of the bridging member,
   wherein the motor housing is provided with an accommodating space for accommodating the first triggering part and for rotation of the first triggering part;
   wherein the pivot section is disposed vertically; the first triggering part and the toggling rod are disposed in perpendicular to the pivot section; an angle between an extension direction of length of the toggling rod and an extension direction of length of the first triggering part ranges from 0° to 90°;
   wherein the toggling rod comprises an oblique surface for pushing the motor housing at an end of the toggling rod;
   wherein the slide chute is linear and extends obliquely with respect to a front-and-rear direction.

14. The upright vacuum cleaner according to claim 1, wherein an elastic member is disposed between the motor and the motor housing and is configured to push the motor to move from the first upright position to the first oblique position when the body is moved from the second oblique position to the second upright position.

15. The upright vacuum cleaner according to claim 14, wherein the motor comprises a first column and the motor housing comprises a second column; the elastic member is a spring and defines a first end and a second end fitted over the first column and the second column respectively to push the motor to the first oblique position;
   wherein the drive belt is winded upon a central part in a direction of the axis of the brushroll;
   a brushroll casing disposed outside the brushroll and comprising a brushroll air suction channel and a drive-belt mounting chamber for the drive belt, wherein the brushroll air suction channel comprises a first air suction channel and a second air suction channel located at both sides of the drive-belt mounting chamber;
   wherein the first air suction channel and the second air suction channel are disposed symmetrically with respect to the drive belt;
   wherein the motor housing comprises an air exhaust hole, a dirty air outlet and a clean air inlet, and defines a motor air suction channel and a motor air-exhaust channel therein, the motor air suction channel communicated between the brushroll air suction channel and the dirty air outlet, and the motor air-exhaust channel communicated between the clean air inlet and the air exhaust hole;
   wherein the motor air suction channel comprises a first branch channel communicated to the first air suction channel and a second branch channel communicated to the second air suction channel;
   wherein the first branch channel and the second branch channel are defined by a motor casing of the motor and the motor housing, and constitute a stereoscopic space with a substantially annular cross section;
   wherein the dirty air outlet is connected to an air inlet of the dirt cup via an air-inlet pipe assembly, wherein the air-inlet pipe assembly comprises: an air-inlet pipe disposed to the motor housing and having a first end connected to the dirty air outlet, and a hose connected between a second end of the air-inlet pipe and the air inlet of the dirt cup;
   wherein the dirty air outlet is connected to the air inlet of the dirt cup via a directional control valve that comprises a first ventilating hole, a second ventilatingl hole and a third ventilating hole; and
   wherein the first ventilating hole is communicated to the brushroll air suction channel, the second ventilating hole to the air inlet of the dirt cup, the third ventilating hole to the outside, and the directional control valve is configured to switch between a first state of communicating the first ventilating hole and the second ventilating hole and a second state of communicating the third ventilating hole and the second ventilating hole.

16. The upright vacuum cleaner according to claim 15, wherein the directional control valve comprises:
   a three-way pipe comprising a first pipe section, a second pipe section and a third pipe section communicated with one another, the first ventilating hole defined by a free end of the first pipe section and the second ventilating hole defined by a free end of the second pipe section; and a two-way pipe comprising a fourth pipe section and a fifth pipe section communicated with each other, the third ventilating hole defined by a free end of the fourth pipe section, wherein a fourth ventilating hole is defined by the fifth pipe section, and at least a part of the fifth pipe section extends into the third pipe section and is movable between a first position where the first ventilating hole is communicated with the second ventilating hole and a second position where the fourth ventilating hole is communicated with the second ventilating hole.

17. The upright vacuum cleaner according to claim 16, wherein the body defines a body air-exhaust channel therein, a first end of the body air-exhaust channel connected to an air outlet of the dirt cup and a second end thereof communicated with the clean air inlet.

18. The upright vacuum cleaner according to claim 1, further comprising two wheels disposed at two sides of the motor housing respectively and rotatably connected with the motor housing, wherein the bridging member comprises a top plate and two side plates connected at both sides of the top plate, the two side plates clamped between two side walls of the motor housing and the corresponding wheels respectively and rotatably connected with the motor housing.

19. The upright vacuum cleaner according to claim 18, wherein the top plate of the bridging member is provided with a first connecting pipe in which a positioning column is provided; the body is provided with a second connecting pipe at a lower end; and a baffle is provided with a positioning cartridge that is fitted over the positioning column after the second connecting pipe is inserted into the first connecting pipe.

20. The upright vacuum cleaner according to claim 18, further comprising:
 a tensioning wheel opposite to a part of the drive belt adjacent to the brushroll to tension the drive belt;
 wherein a rotating axis of the wheel is paralleled to the rotating axis of the brushroll; and
 wherein the motor rotates from the first oblique position to the first upright position at an angle of 1° to 10°.

* * * * *